US011392974B2

(12) United States Patent
Boccardi et al.

(10) Patent No.: US 11,392,974 B2
(45) Date of Patent: Jul. 19, 2022

(54) INTELLIGENT SYSTEM AND METHOD OF PAYMENT, FINANCE, AND SOCIAL COMMERCE

(71) Applicant: ASTRADYNE, INC. (ASTRAL DYNAMIC NETWORKS), Las Vegas, NV (US)

(72) Inventors: Fabrizio Boccardi, Las Vegas, NV (US); Michael Smith, Las Vegas, NV (US)

(73) Assignee: ASTRADYNE, INC. (ASTRAL DYNAMIC NETWORKS), Las Vegas, NV (US)

(*) Notice: Subject to any disclaimer, the term of this patent is extended or adjusted under 35 U.S.C. 154(b) by 418 days.

(21) Appl. No.: 15/961,524

(22) Filed: Apr. 24, 2018

(65) Prior Publication Data

US 2018/0240142 A1 Aug. 23, 2018

Related U.S. Application Data

(63) Continuation of application No. 14/678,983, filed on Apr. 4, 2015, now abandoned.
(Continued)

(51) Int. Cl.
*G06Q 30/00* (2012.01)
*G06Q 30/02* (2012.01)
*G06Q 20/02* (2012.01)
*G06Q 20/12* (2012.01)
*G06Q 20/32* (2012.01)

(52) U.S. Cl.
CPC ....... *G06Q 30/0226* (2013.01); *G06Q 20/027* (2013.01); *G06Q 20/12* (2013.01); *G06Q 20/32* (2013.01); *G06Q 30/0234* (2013.01)

(58) Field of Classification Search
CPC .......... G06Q 30/0226; G06Q 30/0234; G06Q 20/027; G06Q 20/12; G06Q 20/32; G06Q 30/0242; G06Q 30/0273; G06Q 30/0214; G06Q 30/0207; G06Q 30/02; G06Q 50/01
See application file for complete search history.

(56) References Cited

U.S. PATENT DOCUMENTS 8,651,375 B1 * 2/2014 Gouldd .............. G06Q 30/0207
235/380
2005/0077349 A1 4/2005 Bonalle et al.
(Continued)

OTHER PUBLICATIONS

Fawcett et al., Combining Data Mining and Machine Learning for Effective User Profiling, 1996, KDD-96 Proceedings. Copyright© 1996, AAAI—www.aaai.org—6 pages (Year: 1996).*
(Continued)

*Primary Examiner* — Michael W Schmucker
(74) *Attorney, Agent, or Firm* — Michael Best & Friedrich LLP

(57) ABSTRACT

A method, device, system, and computer program product relating to ecommerce, mcommerce, finance, community building, and social media is provided. A payment and social media commerce GobblinQ™ system provides substantial discounts and cash backs to users from merchants, manufacturers, and others. In an embodiment, a Merchant and/or Manufacturer can connect through the GobblinQ™ server to modify the database field regarding the amount of percentages payable and number of Gobbles™ available to Gobblers.

19 Claims, 30 Drawing Sheets

Related U.S. Application Data

(60) Provisional application No. 62/141,255, filed on Mar. 31, 2015, provisional application No. 62/094,947, filed on Dec. 19, 2014.

(56) References Cited

U.S. PATENT DOCUMENTS

| | | | | |
|---|---|---|---|---|
| 2008/0208688 | A1* | 8/2008 | Byerley | H04M 15/8083 |
| | | | | 705/14.39 |
| 2012/0209771 | A1* | 8/2012 | Winner | G06Q 30/02 |
| | | | | 705/44 |
| 2012/0253986 | A1* | 10/2012 | Chang | G06Q 30/00 |
| | | | | 705/27.1 |
| 2012/0316941 | A1* | 12/2012 | Moshfeghi | G06Q 30/02 |
| | | | | 705/14.16 |
| 2013/0041733 | A1* | 2/2013 | Officer | G06Q 50/01 |
| | | | | 705/14.16 |
| 2013/0254004 | A1 | 9/2013 | Cervenka et al. | |
| 2014/0222548 | A1* | 8/2014 | Fagalde | G06Q 30/0242 |
| | | | | 705/14.41 |
| 2014/0244389 | A1* | 8/2014 | Konig | G06Q 30/0255 |
| | | | | 705/14.53 |
| 2016/0180386 | A1* | 6/2016 | Konig | G06Q 30/0255 |
| | | | | 705/14.55 |

OTHER PUBLICATIONS

International Search Report dated Jul. 14, 2016, in International Application No. PCT/IB2015/002558 (2 pages).

* cited by examiner

Create Gobble

| | |
|---|---|
| Title | 902 |
| 1st Tier Cashback Amount (min 5%) | 904 |
| Description | 906 |
| Number of 1st Tier Gobbles to Release | 908 |
| Start Date | 910 |
| Expiration Date | 912 |

○ Use of 1st Tier Gobble produces 3 2nd Tier Gobbles  914
○ Use of 1st Tier Gobble produces 5 2nd Tier Gobbles  916

900

If unused a Gobble expires after one year.

Exposure Projection: 920
Average Purchase Amount: $100.00
1st Tier Revenue: $1M
1st Tier Cashback: $100,000
2nd Tier Revenue: $3M
2nd Tier Cashback: $150,000
Originator Earnings: $50,000
3rd Tier Revenue: $1M
3rd Tier Cashback: $200,000

Total Revenue: $4M
Total Cost: $500,000

Create Offer

Title — 1002
Cashback Amount — 1004
Description — 1006
Number of Gobbles to Release — 1008
Expiration Date — 1010

Based on the segmentation options, the campaign will be posted to matching user's walls Segment Offer
Start Date — 1012
Limit Audience — 1014
○ Everywhere ○ By State ○ By City
Add Languages — 1016
Age [18] – [65+] Gender [All] [Male] [Female]
More Demographics — 1018

Options:
Relationship
Education
Work
Financial
Life Events

Add Merchants (purchase history) — 1020
Interests — 1022

Connections: ○ Only people connected to "my brand"
1024          ○ Only people NOT connected to "my brand"
              ○ Only people who have NOT done business with "my brand" for [6] months

INTELLIGENT SYSTEM AND METHOD OF PAYMENT, FINANCE, AND SOCIAL COMMERCE

CROSS-REFERENCE TO RELATED APPLICATIONS

The present application is a continuation of U.S. patent application Ser. No. 14/678,983, filed Apr. 4, 2015, which claims priority from U.S. Provisional Patent Application Ser. No. 62/141,255, filed Mar. 31, 2015, and from U.S. Provisional Patent Application Ser. No. 62/094,947, filed Dec. 19, 2014, each of which is expressly incorporated herein in its entirety by reference thereto.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyrights whatsoever.

FIELD

A method, device, system, and computer program product that generally relates to ecommerce, mcommerce, finance, and social media; and more particularly relates to a payment method, device, system, and computer program product.

SUMMARY

Embodiments of the present invention provide for a novel ecommerce and community building system, method, and computer program product. Embodiments of the present invention provide for a GobblinQ™ system which provides substantial cash backs or other benefits to its users, i.e., Gobblers™. Such cash backs or other benefits can be adjusted dynamically or automatically by the Merchants based on minimum cash back percentages payable to the Users set by GobblinQ™ and an amount of Tier 2 Gobbles™ which can also be determined by the Merchant (not less than 3 and not more than 5) for each Tier 1 Gobbles™ issued. The number of Gobbles™ issued and the Tiers will be determined by each Merchant and/or Manufacturer based on its respective campaign, and the amount of cash back percentages payable by each Tier of Gobbles™. In an embodiment, a Merchant and/or Manufacturer can connect through the GobblinQ™ server to modify the database field regarding the amount of percentages payable and number of Gobbles™ available to Gobblers after certain events.

BRIEF DESCRIPTION OF THE DRAWINGS

FIG. 9 illustrates an example form 900 that is populated by the Merchant when creating a Gobble campaign according to an example embodiment.
FIG. 10 illustrates an example form 1000 that is populated by a third party or a conglomerate when creating an offer that implements Gobble campaigns to target Gobble customers according to an example embodiment.

DETAILED DESCRIPTION

Example embodiments of the present invention provide a payment method, device, system, and computer program product for ecommerce, mcommerce, finance, social commerce, and social media/community building.

Several example embodiments are described herein, but are not meant to limit the scope of the invention. For example, a discussion of a certain percentage cashback is meant for example purposes here.

An embodiment of the present invention provides for a GobblinQ™ system. That is, at a point-of-sale (POS), based on the availability of Gobbles, a Gobbler (i.e., a Gobble User) can receive an available Gobble™ through the GobblinQ™ system. In an embodiment, before and/or at the point of sale, a Gobbler will be informed or notified if any Gobbles are available for a specific Merchant of interest to the Gobbler.

In embodiments of the present invention, payment can be made using an NFC (near field communication) transmitter and receiver or by physical card.

Figure 1:
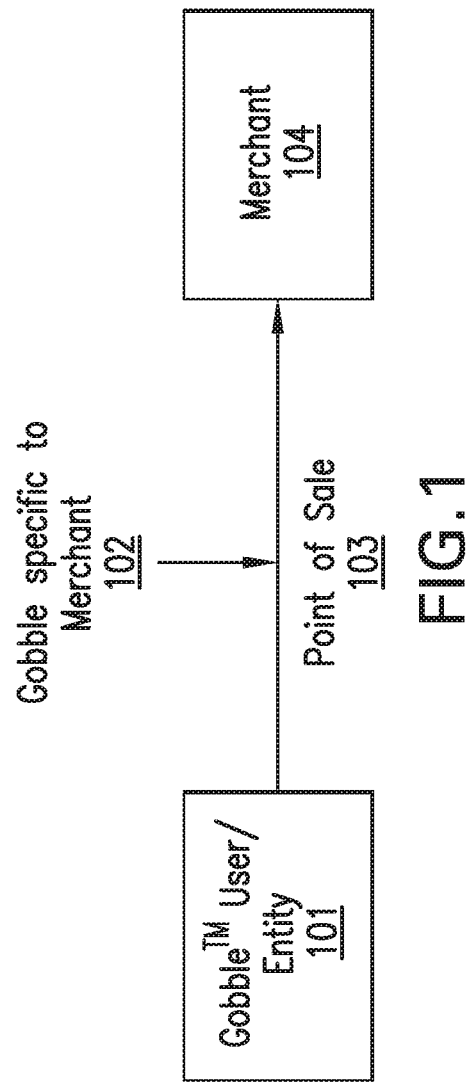
FIG. 1 illustrates an embodiment of the present invention.

FIG. 1 illustrates an example GobblinQ™ structure according to an embodiment of the present invention.

Figure 2:
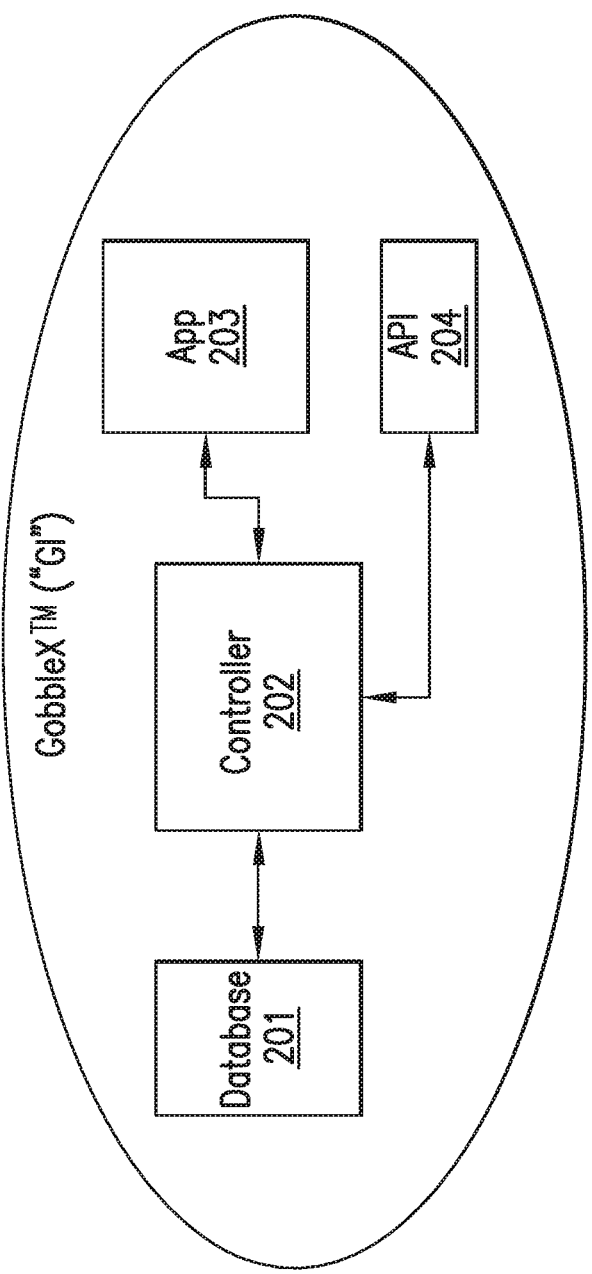
FIG. 2 illustrates an embodiment of the present invention.

FIG. 2 illustrates an example high-level representation of the GobbleX™ or GI™ structure according to an embodiment of the present invention. The GobbleX Intelligence™ ("GI") serves, for example, as the brain or central operating system of the system, method, and computer product and process. In an embodiment, the GI includes at least one database, application, API, and controller. A controller 202 is in communication with a database 201, a mobile/online app 203, and an API 204. Any purchase made with a Gobble or via the GobbleX™ can be made while present in store or online. The controller serves to control what data is pushed and pulled across the API, what information is obtained via the application and stored in the database, and analyzes the information and causes various events to occur as explained herein through example embodiments. Further, the GI keeps track of such events, user information and user information updates in order to create an AI system (artificial intelligence). This continual re-feeding of information and user/merchant behavior allows for a more directed marketing function, social media connection (e.g., as described in the "Partners" example embodiments below), and improved user experience. The controller accesses and causes the execution of the various algorithms provided by the GI. Such algorithms include, but are not limited to, lifestyle algorithm, user to merchant relationship algorithm, merchant to user relationship algorithm, user to user algorithm, user to possible partner algorithm, and partner to partner algorithm. In embodiments, the GI serves essentially as a matchmaker between user to user, user to merchant, and/or merchant to user. Such system as the ("GI") in addition can also be used with manufacturers creating therefore a direct link between the manufacturers and their customers and providing specific consumer data which can be used in numerous ways to the advantage of both Manufacturers and Users alike.

In the GI, a security module is provided which provides for encryption of user and merchant data, as well as secure connection with any bank or credit card entity. In the GI, an account deletion module is provided to either delete a user and/or merchant account, or to disable use of such account information. In the GI, the at least one app provides for different views to the user and/or merchant and/or other entity. The controller accesses the data from the at least one database and provides such information to the app to present different views to the user.

In an embodiment, the GI communicates with the user via electronic or digital means, e.g., SMS, email, push notifications, mobile app interfaces, IM messaging, telephone, or simply via the App, or which like Facebook/Twitter/Other is connected to mobile phone and or computer of the user, etc. In an embodiment, the transactional data and user personal data are kept in one of the same or different storage locations.

In an embodiment, the GI handles user/merchant/bank entity's: registration, notifications, cash backs, campaigns, user's preferences, user's specific requests, policies, user's profiles, user's life style, locations, purchase activity and history, etc. The GI is a system that can operate in the cloud, or serve as a local system. Further, the GI can be accessed via a mobile or handheld processor connected to a network, or via online, desktop processor.

In the GI, a user, hereinafter referred also as Gobble User and Gobbler, is registered and all user-related activity is stored in a database. The database can be one or more databases, stored on one or more secured systems, and can be located on the same physical location or may be dispersed over a network of interconnected servers. Information regarding the user can include, but is not limited to, credit card information, checking account information, temporary and permanent location information, email address, purchase activity and history (e.g., every transaction, every Gobble used or distributed, date/time/purchase amount/merchant, purchase items, etc.), preferences, friends, Partners, requirements, restrictions, status of account, product preferences, user's requests, services used and/or of interest, etc. The GI keeps track of merchants, manufacturers, retailers, and others offering the Gobbles. Such information can include the merchant's contact information, Gobbles promotions and deals, type of products carried in store, merchant's thresholds regarding advertisements of promotions, available Gobbles in each location, type of Gobbles with respective cash back amounts (appreciating the advertising philosophy of the store), etc. The GI also keeps track of and controls access to and use of other data such as GPS locations of users and merchants, cashback incentives run by other systems in an effort to update marketing campaign opportunities (e.g., cashbacks, exchanges, etc.) to merchants, other expenditures made possible by access through user, merchant, credit card or bank check card or purchase card entity.

In an embodiment, to match merchants (deals, offers) to users we would compare profiles and user's requirements to determine probability of purchase (PoP). We would first look for profiles that have purchased from that merchant in the past and then do a deep dive into their profile. We would find similarities (preferences, requests, purchase history, age, gender, lifestyle, location, and more—these would be weighted and their relationships evaluated. Weighting will self-evolve) among all those who have converted in the past to create our Influencer profile base (the algorithm to determine that will get complex and ever evolving—self learning). We will then compare the profile of the user to each merchant's (or their offer). If it match score is over a certain threshold, say 0.8, we show the offer. For example, Influencer×Delta=PoP.

In an embodiment, an algorithm is provided to associate a user's products purchased, Gobbles used and/or Gobbles initially accepted in order to determine what type of products would be of interest to the user. For example, for a user having purchased from a specific merchant at a frequency x, then advertisements and/or Gobbles will be promoted to the user, by providing "intelligence" about best available cash backs on similar stores selling similar products. This algorithm will also "consider" User's purchases, User's preferences, and the systems "GI" shall also ask to the User after a purchase is made, to specify what was purchased specifically in order for the "GI" to better identify deals with cash back gobbles targeting User's needs or even specific requirements, and/or suggests partners to build communities. A system administrator or any merchant can determine the threshold of the frequency when taking a chance on whether or not to promote certain Gobbles. For example, if a user purchases at least $500 from a merchant each month of a year, an advertisement or Gobble for a cash back (which can be substantially superior to others, based on User's attendance/spending at such Merchant which could be a chain of stores) at that merchant and similar type merchants can be pushed to the user, based on the specific purchases made and preferences/needs of User available to the "GI". In addition If a User's has not been visiting the merchant for a Period of time, the "GI" will notify User with an "invitation Gobble" based on a cash back "predetermined" by the Merchant in its Gobbles campaign. The amount of cash backs and TIER TYPE of Gobbles, as well as the amount of months of absence of the User at merchant location in order to be granted an "Invitation Gobble" shall be "predetermined" by the merchant in its Gobbles campaign. However, a directed Gobble for a specific type of product or brand that is carried by that Merchant might not be pushed to the user since the possibility of it being relevant to the user is low, unless predetermined by the "GI" according to User's preferences and or specific requests. User's preferences can be determined by the "GI" based on specific requests posted by the User on the "GI" (which can be updated on the "GI" by User at any time) or determined by the "GI" algorithm as defined above, based on User's life style, expenditures, locations, requests and or preferences of the User. Or, for example, if a user purchases at least $30 a week from a coffee shop that offers limited items, then the system will more likely push advertisement or Gobble notifications regarding specific coffee products and that store to the user. A user's pre-indicated preferences are taken into account and given a heavier weighting in such advertising/Gobbles push notifications to a user. Further, for example, after use or determined non-use of a Gobbles, the GI can send a request for update of preferences from the user to indicate why and/or what the Gobble was or was not used for by the user. In an embodiment, Gobbles placements are made automatically, (unless, for example, in an embodiment, placed by the Gobble user to Partners and or Friends), by the GI based on a queue at the POS (point of sale=when the user is checking out at the Merchant in person or online). On any Gobble placed directly by User and not claimed, it will after a preset time go back to the "GI" for placement through the "GI" matching algorism and or on a queue at the POS (method determined by the GI based on demand/activity). This continual update of preferences by both the user's activity and by the user's input creates a more directed and useful system for the user and the merchant. Merchant to user matching, user to merchant matching and user to user matching will factor in the user's purchasing activity and preferences and will weight user purchases over all else. Other factors used will include 'likes' from other social media platforms (such as Facebook) and Friend purchases.

In an embodiment, a Gobble user spends $100 at any merchants. The GI matches the user with another user who also purchases at the same merchant. In an embodiment, the GI matches the Gobble user with other users who do not shop at the same merchant but share one or more preferences and/or have a related request. In these instances, cross-marketing is accomplished by the Merchants in reaching a larger audience than just its current shopper-base. Further, in these instances, the Gobble user is provided additional opportunities and capabilities for obtaining greater cashbacks and other discounts on products and/or services. Further, in these instances, the Gobble user is provided with products and/or services requested (i.e., "requests") by the Gobble user and better cashback "sharing" opportunities, based on the Gobbles tier/type, price, and product/service requested by the Gobble user. Such requests by a Gobble user are defined in the user's preferences, product/service requests, and/or purchase history, saved in a location associated with the Gobble user's profile and/or identification. For example, such requests are also defined by the Gobble user's preferences, product/service requests, and/or purchase history and at least one of the following factors of: a similar frequency, a similar purchase amount, a similar preferences or requests, and/or similar purchases made based on information requested by the "GI" to the USER and or provided by the User to the "GI" after the purchase in order for the "GI" to better target the Gobble user's needs in the future and provide greater cash backs and or discounts to the Gobble user, including, e.g., a similar geographical location, etc. Such similarities are given a weighting when the GI looks to see whom to "introduce Partners" to each other via Gobble notifications and/or connections as possible Partners, as well as used by merchants to target type of customers and rate them based on credibility status, among other things. In an embodiment, the Gobble user is asked to rate the user's experience at and interest in any Merchant. This feedback from the Gobble user is then at least one of updates the stored user's preferences, and provides a weighting in the GI algorithm(s) for Gobble notifications, Partner introductions, etc. As a user provides more information to the GI, then the Gobble user receives more directed, i.e., better, results from the GI in the form of more directed Gobbles and marketing campaigns that would be of interest to the user. As a merchant provides more information to the GI, then the merchant will receive better results from the GI in the form of users who are interested in the merchant's products, better price for the product and/or service, better cask backs, and better tier/type of gobbles (sharing cash backs mechanism) as issued by each merchant based on merchant's predetermined campaign with the "GI", etc. Such information from a merchant can be information regarding users past purchased items from the merchant, products offered by the merchant, etc. And, as this information is continually fed back into the GI, the algorithms will provide more intelligent solutions.

In an embodiment, cross marketing and/or cross selling is available to merchants via the marketing campaigns employed and/or the various relationships (merchant to user, partner to partner, user to merchant, etc.).

In an embodiment, the GI provides intelligence to the Merchant based on a Gobble user's preferences, specific requests, status/credibility, past purchases at Merchant or similar type of Merchant, lifestyle, requirements, frequency of attendance at Merchant's store, etc.

In an embodiment, a predetermined, i.e., set, campaign can be preset by a Merchant on GobblinQ™ via the GobbleX™ ("GI"). The Merchant can invite back "inactive shopper" users with invitation Gobbles. The Merchant will define whether the Gobbles are Tier 1/Tier 2/Tier 3. The Merchant will define the specific cashbacks associated with the Tiers, and the number of Gobbles available. For example, the specific cashback will not be less than as defined by the GobblinQ™ system threshold for each specific industry.

In an embodiment, the Gobbles are placed automatically by the GI™ using the algorithm(s) defined by lifestyle, expenditures, preferences, past purchases, location, requests, etc. In an embodiment, Gobbles are placed by the GI automatically in a queue at the point of sale (POS) or by the GI based on the above mentioned algorithm(s) (based on demand, since the GI's™ intelligence and service primary task is to create wealth for the users and new and/or repeat business for the merchant), or by the Gobble user to his/her friends and/or partners on GobblinQ.

In an embodiment, any Gobbles made available by a user/merchant/GobbleX can be placed by the GI automatically in a queue at the POS or by the GI based on the above mentioned algorithms or by the user to his/her friends and/or partners on GobblinQ. In an embodiment, any Gobbles placed but not claimed by a third party within a preset time will be automatically placed by the GI in a queue at the POS or sent to other user(s) based on the intelligence of the GI and depending upon the activity level and demand.

In an embodiment, cashbacks and discounts can both be made available for obtainment via the GobblinQ system. In an embodiment, the GobblinQ system will create wealth among its users by providing substantial cashbacks, discount deals, and targeted, specific intelligence to both Gobble users and Merchants and Manufacturers or other entity involved in the system. In an embodiment, an extended payment option is provided in which a Gobble user is provided credit with no interest on purchases via GobblinQ over a period of up to 18 months (or other period of time, depending upon the marketing campaign, requests by user, etc.). The GobblinQ system can develop a rating system for each Gobble user based on the user's history of payment.

In an embodiment, Gobble user buys a Louis Vuitton bag for $800. The Gobble user's rating on GobblinQ is A+, thus, no need to pay at least up to 50% upfront of the $800, depending upon the Gobble user's rating and credibility. In an embodiment, the Gobble user decides the monthly payment installments with no interest. For example, the user would pay $80 over 10 months via GobblinQ. In an embodiment, the Gobble user receives Tier 2 and Tier 3 gobbles, depending upon the merchant's campaign, and any cashbacks will be released to the user upon fulfilling payment installments. Merchant shall have the opportunity to rate user on GobblinQ™.

In an embodiment, the "GI" Intelligence is determined by various algorithms based some of the following components, rated from 1 to 7 (with 1 being weighted more in the relationship):

USER'S
1. Requests
2. Location/s (Locations can also be preset by user to the GI)
3. Preferences and/or Specific Request
4. Purchases
5. Lifestyle
6. Financial status (e.g., does user need an Extended Payment Option)
7. Rating In an embodiment, the GI intelligence is built by the continual receipt of data regarding user preferences, locations, lifestyle, specific requests of the user, needs of the user, purchases, which can also be determined by the GI. In an embodiment, a user is questioned by the GI UI (user interface) regarding the user's preferences and requests.

In an embodiment, various algorithms are developed to address the situation of when a Gobble is sent and to whom, if sent before a POS moment. For example, in the situation that Entity X requests Handbag A, but is in another state, prefers handbag, and buys handbags, that garners the following relationship:

$$5\text{Request} + 3\text{Location} + 4\text{Preferences} + 3\text{Purchases} = \text{relative ranking}$$

$$5 \times 1 + 3 \times 0 + 4 \times 1 + 3 \times 1 = 12 \text{ relative ranking for Entity } X$$

Entity Y does not request Handbag A, but is nearby, prefers handbag, and buys handbags, so that garners the following relationship: $5 \times 0 + 3 \times 1 + 4 \times 1 + 3 \times 1 = 10$ relative ranking for Entity Y. The ranking of Entity X was 12 which is greater than the Entity Y ranking of 10. Accordingly, in this situation, Entity X would get first chance to accept the Gobble. However, if upon the time limit that Entity X has not accepted or used the Gobble, then the Gobble is returned to the GI or whomever sent the Gobble, and the next in the queue. Using a computer and multiple databases of information, additional data can be taken into consideration. And, as the system gains more information regarding preferences, requests, locations, and other factors, the ranking system will become more sensitive to all of those factors, and so the above relationship can change in weighting and the various additional types of factors taken into consideration according to the incoming data over time.

In an embodiment, the user can post on the GI or on a user's partner community on GobblinQ as pictures of items/services/other purchased requested.

In an embodiment, if at the POS there are no Tier 1 gobbles, then the user shall receive a gobble invitation (e.g. Tier 1 or tier 2) from a merchant provided by the GI based on the user's preferences and/or requests and/or lifestyle, etc. In an embodiment, each time a user makes a purchase, the user gets cashbacks and if receiving cashbacks on a Tier 2 gobble, then the user also received a gobble from another merchant based on preferences, requests, and/or lifestyle, location of user, etc. This allows for further cross marketing and allowing a user to have a more directed marketing campaign targeted. This can also occur in the situation where at the POS there are no gobbles available.

In an embodiment, the GI provides a Gobble to a Gobble user based on the user's requests, preferences, lifestyle, location, status, and rating.

In an embodiment, the GI places Gobbles with users in order to generate sales for a merchant and/or build profit for a user. For example, placing Gobbles by the GI will be based on requests and availability with the queue at a point of sale (POS). In an embodiment, the GI works by placing Gobbles. In an embodiment, a merchant can invite absentee customers by inviting them back with a Gobble which represents cashback. In an embodiment, a merchant or any Gobble user can initialize a campaign or Legion Buying Splash™ event. In an embodiment, GobblinQ™ will inform user of participating merchants and dates for Legion Buying Splash events launched by user/s or to join by user/s in locations of user/s or in other locations as requested by user/s.

In an embodiment, the GI works by placing Gobbles, whether in a queue at a merchant or placed to a user based on the factors described herein (e.g., preferences, requests, lifestyle). In an embodiment, a merchant can invite absentee customers (e.g., as set in its campaign on GobblinQ™) by inviting them back with a gobble which will represent a cashback and/or great deals.

AI components of the present invention are provided by the information obtained and then fed back into the GobbleX regarding preferences, locations, lifestyle, specific requests of user, specific needs of user, purchases, purchase frequency, etc. This information could also be based on answers provided by the Gobble user to GobblinQ™ requests regarding what product was purchased in each instance by the Gobble user in order to provide more directed Gobbles for the user, and better target Gobble users' needs.

In an embodiment, a Legion Buying Splash event can be launched by a user or merchant, and one can join/be invited based on user needs and/or requests.

In an embodiment, GobblinQ™ offers substantial cash backs among other proprietary and valuable things provided by the GI. Such cash backs can be adjusted by the Merchants based on minimum cash back percentages payable to the Users set by GobblinQ™ and an amount of Tier 2 Gobbles™ which can also be determined by the Merchant (not less than 3 and not more than 5) for each Tier 1. Gobble™ issues. The amount of Gobbles can be determined by each Merchant and or Manufacturer based on its campaign, as well as the amount of cash back percentages payable by each Tier of Gobbles™

In an embodiment, GobblinQ™ will set the minimum amount of percentages payable to Users but each Merchant and or Manufacturer shall have the ability to put what ever greater amount based on its needs. In an embodiment, the amount of gobbles issued by Merchants for any Tier is not limited or set. And, the percentages of cash backs that each Gobble™ shall offer, other than Pre-Set "only' the "Minimum amount" in order to accept a Merchant/Manufacturer in GobblinQ™ is not limited.

In an embodiment, each industry sees a "branded and tailored" type of GobblinQ™ which offerings and service is tailored specifically for each industry based on the industry requirements and parameters.

For example, Fashion may pay cash backs up to 70% while "energy" most likely may not exceed 10% or 15%.

In an embodiment, the present invention can be used for any industry or merchant and the percentages shall be modifiable by the merchant/GI/other entity.

FIG. 1 illustrates an example high-level representation of the GobblinQ™ system. A Gobble user 101 is approached with a Gobble specific 102 to the Merchant 104 at the point of sale 103 (online or in store). Any purchase can be made in store or online.

FIG. 2 illustrates an example high-level representation of the GobbleX™ structure, where a controller 202 is in communication with a database 201, a mobile/online app 203, and an API 204. Any purchase can be made when present in the store or online.

Figure 3:
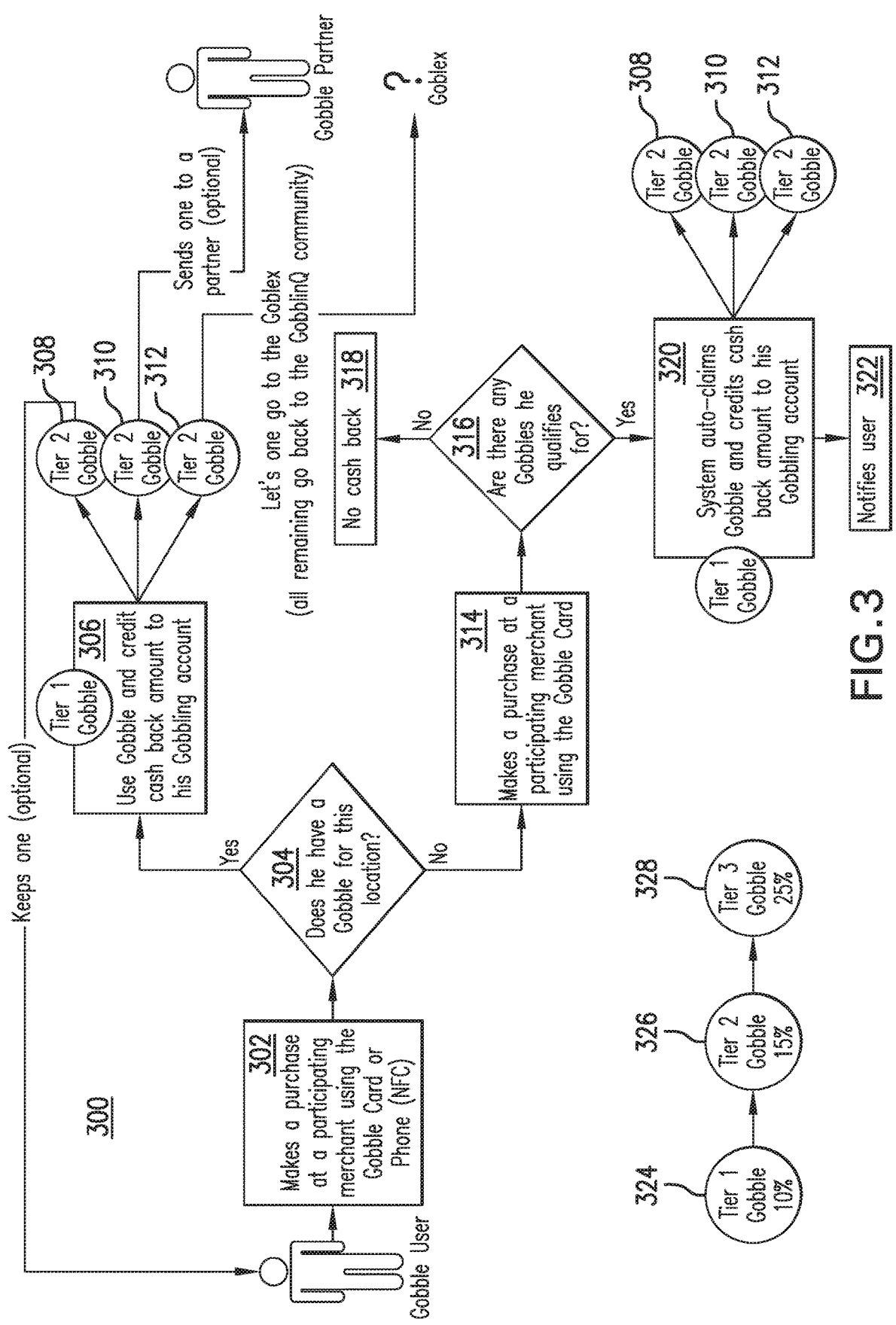
FIG. 3 illustrates a purchase method 300 for a Gobble User using a Gobble Card or Phone according to an example embodiment.

FIG. 3 illustrates a purchase embodiment 300 for a Gobble User using a Gobble Card or Phone via NFC technology (near field communications). According to the method, at step 302, a Gobble User makes a purchase at a participating merchant using the Gobble Card or mobile device. At step 304, it is queried as to whether or not the Gobble User has available Gobble(s) or receives automatically at the point of sale Gobble(s) for the particular location where the purchase is being made. If the Gobble User does have or receives automatically a Gobble for the particular location, then the embodiment proceeds to step 306. If the Gobble User does not have and does not receive automatically a Gobble for the particular location, then the embodiment proceeds to step 316. Accordingly, a Gobble User that does have a Gobble for the particular location, under step 306 uses the Gobble and credit on the purchase is provided in the form of cashback that is deposited directly into the Gobble User's GobblinQ account. In an example embodiment, a Gobble User's Gobble Card classifies the Gobble User as at least one of the following: a Tier 1 Gobble User (item 324), a Tier 2 Gobble User (item 326), and a Tier 3 Gobble User (item 328). A Tier 1 Gobble User receives 10% cashback benefits plus 5% cashback on any Tier 2 Gobble placed by the GI or directly to any third party, a Tier 2 Gobble User receives 15% cashback benefits, and a Tier 3 Gobble User receives 25% cashback benefits. Although a specific example is described herein, the values of cashback benefits can be implemented in a variety of tiered structures modeled on certain industries in accordance with the above described method within the knowledge of one of ordinary skill in the art.

In an example embodiment, a queue is established by the GI when all Tier 1 Gobbles have been taken. That is, the GI keeps track of which users have requested a Tier 1 Gobble or could have used a Tier 1 Gobble at the point of sale. Tier 1 Gobbles are released by users who choose to not use them, or released by the GI because their "time to use" by a specific Gobble user expired, or additional Gobbles are released by the Merchant as per a preexisting planned event or per the Merchant addressing the demand. The GI keeps track of all users and their requests for Tier 1/Tier 2/Tier 3 or any other level Gobble. Further, the GI can place Gobbles™ through its "intelligence" depending on what is more efficient or based on demand.

In an example embodiment of a tiered Gobble campaign structure, a merchant can choose how many Gobbles of Tier 1, Tier 2, and any subsequent Tiers to release in the campaign. In an example embodiment, a Merchant can set up his campaign with a minimum of 3 and up to 5 Tier 2 Gobbles for each Gobble issued. In an example embodiment, a Merchant sets up a campaign to release 10 Tier 1 Gobbles, and for every Tier 1 Gobble, three Tier 2 Gobbles will be released. Gobble user X spends $100 at a Merchant. At the point of sale (POS), the Merchant alerts Gobble user X that a Tier 1 Gobble is available. Alternatively or in addition, the Gobble user X is notified by the GI that a Tier 1 Gobble is available. The Tier 1 Gobble provides for a 10% discount. Gobble user X receives the discount, hence a $10 credit since the purchase already took place immediately prior to the Tier 1 Gobble being released. This effectively $10 discount can be provided by the merchant directly to Gobble user X (depending upon how the campaign was set up) or this $10 discount will be credited back to Gobble user X's GobblinQ™ account. In an embodiment, Gobble user X is notified electronically (via the app, SMS, email, other) of the discount and credit to the GobblinQ™ account of Gobble user X. Further, Gobble user X is notified by the GI™ that the Gobble user now has received three Tier 2 Gobbles™.

In an embodiment, upon the GI™ placing the Tier 2 Gobbles™ at the point of sale in a queue, or by the GI™ intelligence based on demand, Gobble user X receives a preset cash back, e.g., 5% cashback, for each Tier 2 Gobble™ placed by the GI™ and used by a Gobbler™ as follows:

Gobble user X uses one Tier 1 Gobble. The GI had a preset of three Tier 2 Gobbles for every Tier 1 Gobble. Here, Tier 1 Gobble provides a 10% discount on merchandise X. Tier 2 Gobble provides a 15% discount on merchandise for the user of the Tier 2 Gobble and a 5% cashback for the user of the Tier 1 Gobble that effectively spawned, or caused it to be released, the Tier 2 Gobble.

For example, Gobbler X uses Tier 1 Gobble™ and gets 10% discount on her $100 purchase. Effectively, Gobbler X gets $10 back (e.g., on GobblinQ™ account or other way). Three Tier 2 Gobbles are now available.

Gobbler™ X gives Gobbler™ Y a Tier 2 Gobble™ via GobblinQ™ Gobbler Y gets a discount of 15% using the Tier 2 Gobble™ on her purchase. For example, Gobbler Y spends $100 and gets effectively a $15 discount. Upon usage of the Tier 2 Gobble, Gobbler X benefited by getting 5% cashback, which is effectively $5. Further, Gobbler X can decide to keep one or more of the Tier 2 Gobbles and get both the discount and the cashback.

Accordingly, following the above example, Gobbler X could benefit:

Gobbler X spent $100, got $10 credit with Tier 1 Gobble.
Gobbler Y spent $100, got $15 credit with Tier 2 Gobble. Gobbler X got $5 cashback.
Gobbler Z spent $100, got $15 credit with Tier 2 Gobble. Gobbler X got $5 cashback.
Gobbler M spent $100, got $15 credit with Tier 2 Gobble. Gobbler X got $5 cashback.

In tallying, Gobbler X received a $10 credit plus $15 cashback. Gobbler Y received a $15 credit. Gobbler Z received a $15 credit. Gobbler M received a $15 credit.

If Gobbler X kept one of the Tier 2 Gobbles to use, and spent $100 using the Tier 2 Gobble, then Gobbler X would have 15% discount ($15) and $5 cashback.

Then, in tallying, Gobbler X received $25 credit plus $10 cashback. Gobbler Y received a $15 credit. Gobbler X received a $15 credit.

In a further embodiment, once all three (or however many are released) of the Tier 2 Gobbles™ have been used, a Tier 3 Gobble™ is released to Gobbler X providing an additional discount and/or cashback available for Gobbler X.

Each of the Tier 1, Tier 2, et al. Gobbles represents at least one of a discount, a cashback, and the like. In an embodiment, the discounts, cashbacks, and the like are preset by a Manager or other entity. In an embodiment, the controller of the system sets and/or decides the discounts, cashbacks etc. In an alternative embodiment, the discounts, cashbacks, and the like are set by an entity as they are released in order to account for, e.g., current demand, market, drive up demand, etc.

In an example embodiment, the GI™ helps the Gobbler™ build his/her community of Partners based on numerous intelligence factors below (e.g., user request, user preferences, user lifestyle, etc.) and using those factors to place Tier 2 and Tier 3 Gobble™.

Embodiments of the present invention provide for mechanisms for sharing profit.

In an example embodiment of a tiered Gobble campaign structure, step 308 is implemented for Gobble Users subscribed to a Tier 1 Gobble. A Gobble User subscribed to a Tier 2 Gobble instead, or in addition to step 306, would be provided an option of proceeding to at least one of steps 308, 310, and 312. In step 308, the Gobble User subscribed to a Tier 2 Gobble keeps one. In step 310, the Gobble User subscribed to a Tier 2 Gobble sends one to a Gobble Partner. In step 312, the Gobble User subscribed to a Tier 2 Gobble lets one go to the GobbleX, meaning that all remaining go back to the GobblinQ community. If the Gobble User does not have a Gobble for the particular location, then the method proceeds to step 314 and the Gobble User makes a purchase at the participating merchant using the Gobble Card or via phone (NFC technology, barcode, QR code (quick response code), et al.). In a following step, step 316, it is checked whether the Gobble User qualifies for any Gobbles. If no, then the Gobble User is not provided with any cashback according to step 318. (In an embodiment, the GI™ provides a Gobble invitation (Tier 1 or Tier 2, etc.) depending upon the merchant describing cash backs generated by another merchant based on the profile of a Gobble user.) If yes, then the system auto claims the Gobble and credits the cashback amount to the Gobble User's GobblinQ account according to step 320 if he is a Tier 1 Gobble. Following the crediting of the cashback, the Gobble User is notified of the auto-claim and crediting in step 322. A Gobble User that is a Tier 2 Gobble could instead, or in addition to step 320, be provided with an option of proceeding to at least one of steps 308, 310, and 312.

In an embodiment, the merchant determines how many Tier 1 Gobbles can be available and issued for a marketing campaign. At the point of sale, users receive Tier 1 Gobbles until they are all used. Then, in a queue, at the point of sale, users receive Tier 2 Gobbles. Or, a Gobble user can receive a Tier 2 Gobble from the GobbleX based on suggestion or invitation.

In an example embodiment of a tiered Gobble campaign structure, step 308 is implemented for Gobble Users subscribed to a Tier 1 Gobble. A Gobble User receives a Tier 1 Gobble at the point of sale automatically or received the Tier 1 Gobble earlier from the GobbleX™. Upon using the Tier 1 Gobble, the Gobble user—depending upon the marketing campaign set by the Merchant—receives one or more (e.g., 3 or 4 or 5 Tier 2 Gobbles) Tier 2 Gobbles to disperse, of which the Gobble user can keep one or more. The Merchant or GI or other entity can set restriction to allow the Gobble user allowance to use up to one Tier 2 Gobble™ or none Tier 2 Gobbles™. The Gobble user can direct the Tier 2 Gobbles to friends, partners, and/or specific person. Or, the Gobble user can return one or more of the Tier 2 Gobbles to the GobbleX. The GobbleX can then disperse the Tier 2 Gobbles or discard the Tier 2 Gobbles. In step 308, the Gobble user obtained a Tier 2 Gobble keeps one, for example. In step 310, for example, the Tier 1 using Gobble user sends a Tier 2 Gobble to a Gobble Partner. In step 312, the Gobble User subscribed to a Tier 2 Gobble lets one go to the GobbleX, meaning that all remaining go back to the GobblinQ community, assuming, for example, that the user wanted to send a Gobble to a Friend/Partner/other. If the Gobble User does not have a Gobble for the particular location, then the method proceeds to step 314 and the Gobble User makes a purchase at the participating merchant using the Gobble Card or by mobile device (NFC). In a following step, step 316, it is checked whether the Gobble User qualifies for any Gobbles. In an embodiment, there is no qualification requirement. The GobbleX will inform prior upon the Gobble user asking regarding how many Tier 1, Tier 2, and Tier 3 Gobbles are available at a point of sale. Or, for example, a Gobble user at the point of sale can just receive Tier 1 or Tier 2 Gobble based on availability. In an embodiment, upon the use of a Tier 2 Gobble, the Tier 1 Gobble user that generated the Tier 2 Gobble is notified regarding use by GobbleX™. If no, then the Gobble User is not provided with any cashback according to step 318, but receives from the GI™ an invitation Gobble from another merchant based on the profile of the user or requests by the user for a specific item/service. For example, this can happen if there are no Gobbles available upon making a purchase. In an embodiment, a Gobble user can reserve a Gobble for a short period of time and be notified by the GobbleX™ about the amount and type of Gobbles available at a certain location. If yes, then the system auto claims the Gobble and credits the cashback amount to the Gobble User's GobblinQ account according to step 320 if he is a Tier 1 Gobble. Following the crediting of the cashback, the Gobble User is notified of the auto-claim and crediting in step 322. A Gobble User that is a Tier 2 Gobble could instead, or in addition to step 320, be provided with an option of proceeding to at least one of steps 308, 310, and 312.

In an embodiment, Gobbler X purchases $100 from Merchant X. At the point of sale, Merchant X or Gobbler X's smartphone or another device communicates to Gobbler X that a Gobble representing a 10% discount is available. Gobbler X accepts the offer and receives the $10 credit on Gobbler X's GobblinQ payment card. On the backend of this transaction, upon acceptance of the 10% discount, the transaction hits the bank associated with Gobbler X's account. The Gobble has a unique identifier. The Merchant also has a unique identifier. And, Gobbler X has a unique identifier. The bank uses the unique identifiers of at least one of the Merchant, Gobble, and Gobbler X, in order to determine what discount should be placed in what account. The Merchant's unique identifier can be included in the Merchant's access to the GobbleX upon the POS. Or the Merchant's unique identifier can be included in the information (including the unique identifier of the Gobble) of the Gobble. Gobbler X's unique identifier can be obtained from Gobbler X's GobblinQ™ payment card or from Gobbler X's GobblinQ™ membership or identification card or Gobbler X's smartphone (e.g., using barcode technology, image technology, NFC technology, etc.). This card can be a chip card, magnetic swipe card, image card, an electronic file, and/or a printed card. At least one or more of the unique identifier codes are then transmitted by the computer server of the Merchant to the Bank or payment entity which then resolves which identifier belongs to which information via a lookup table or other mechanism. In an embodiment, the resulting information is sent to the GobbleX™ controller for information and maintenance purposes.

Figure 4:
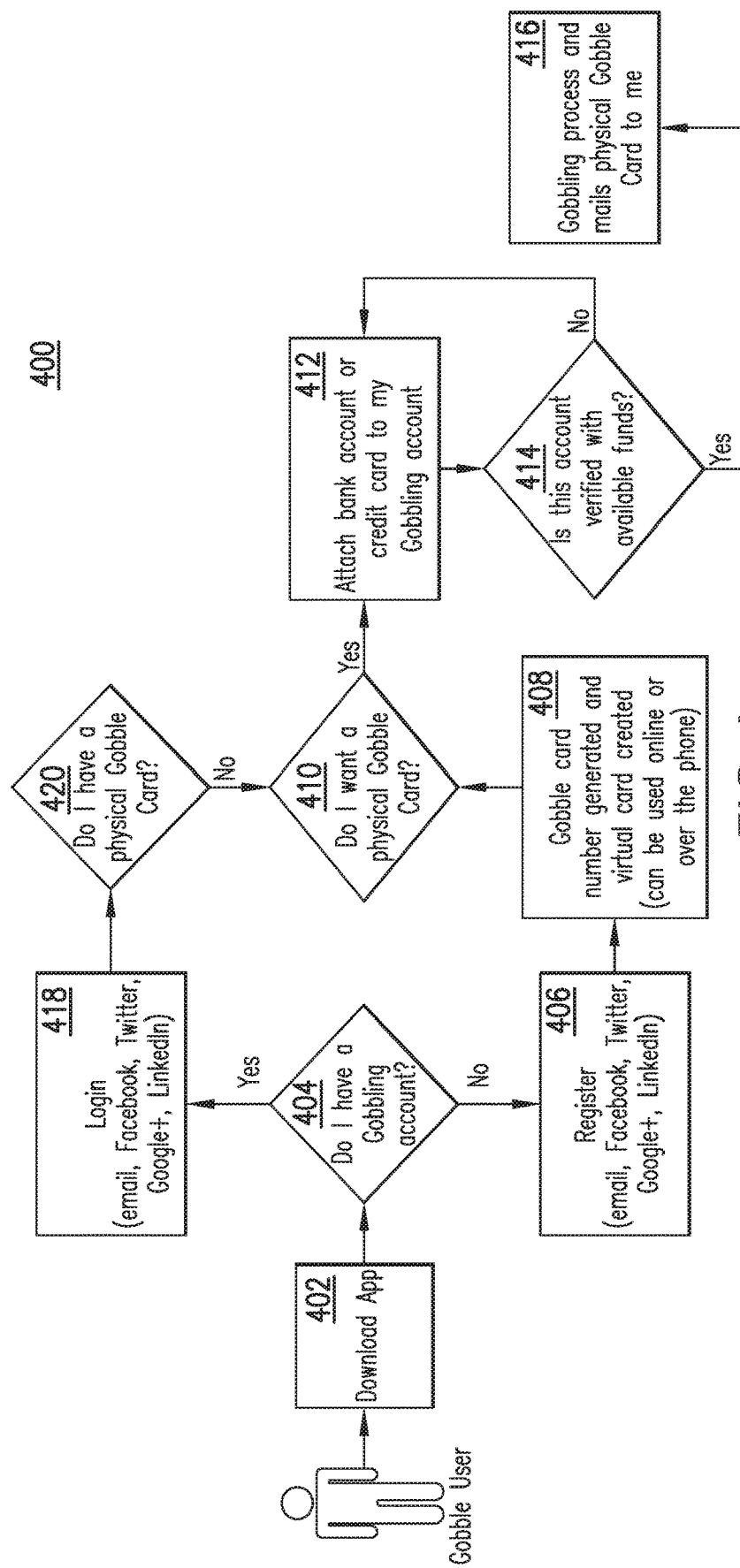
FIG. 4 illustrates a method 400 for registering a prospective User as a Gobble User and/or providing a Gobble User with a Gobble Card according to an example embodiment.

FIG. 4 illustrates a method 400 for registering a prospective User as a Gobble User and/or providing a Gobble User with a Gobble Card. According to a first step of the method, a Gobble User downloads an application associated with GobblinQ to a device in step 402. A device hosting the application can be any device having a processor and a User interface, such as a tablet, a smartphone, a mobile device, a personal computer, and any other similar device. Following the download of the application, the method determines whether or not the Gobble User has a GobblinQ account in step 404. If the Gobble User does not have a GobblinQ account, then according to step 406 the Gobble User is prompted to register a sort of identifying criteria. According to an example embodiment, the Gobble User could register to a GobblinQ account by providing information via at least one of an email account, a Facebook account, a Twitter account, a LinkedIn account, or an account hosted by another social media website.

After having registered, the Gobble User is provided in step 408 with a Gobble Card Number. A Gobble Card number is generated and a virtual card is created which is made available to the registered Gobble User. The Gobble Card number is, at this particular point in time, eligible to be used online or over the phone. Following the provision of the Gobble Card Number, the method requests that the Gobble User identify whether or not a physical Gobble Card should be manufactured and supplied to the Gobble User, according to step 410. If the Gobble User does not want a physical Gobble Card, no physical Gobble Card is generated and the Gobble User still maintains the Gobble Card Number. If the Gobble User does identify an interest in a physical Gobble card, then according to step 412, one of a Bank account and a credit card is attached to the GobblinQ account for the Gobble User. Following the attempted linking of accounts, it is determined in step 414 whether the Bank account provided has verifiably been determined to have funds. If not, then step 412 is reinitiated and the Gobble User is presented with an opportunity to identify a different one of a Bank account or a credit card to link to the GobblinQ account. If the Bank account provided has verifiably been determined to have funds, then according to step 416, GobblinQ processes the request and the linking of the accounts, and then proceeds to mail a physical Gobble Card to the Gobble User.

If the result of the step 404 determination is that the Gobble User does have a GobblinQ account, then the User is prompted in step 418 to log into at least one of a Facebook account, a Twitter account, a LinkedIn account, or an account hosted by another social media website. Following the logging into the social media account, the User is prompted according to step 420 to identify whether or not the Gobble User has a physical Gobble Card. If the Gobble User identifies that he does not have a physical Gobble Card, then the method proceeds according to step 410 and requests that the Gobble User identify whether or not a physical Gobble Card should be manufactured and supplied to the Gobble User.

Figure 5:
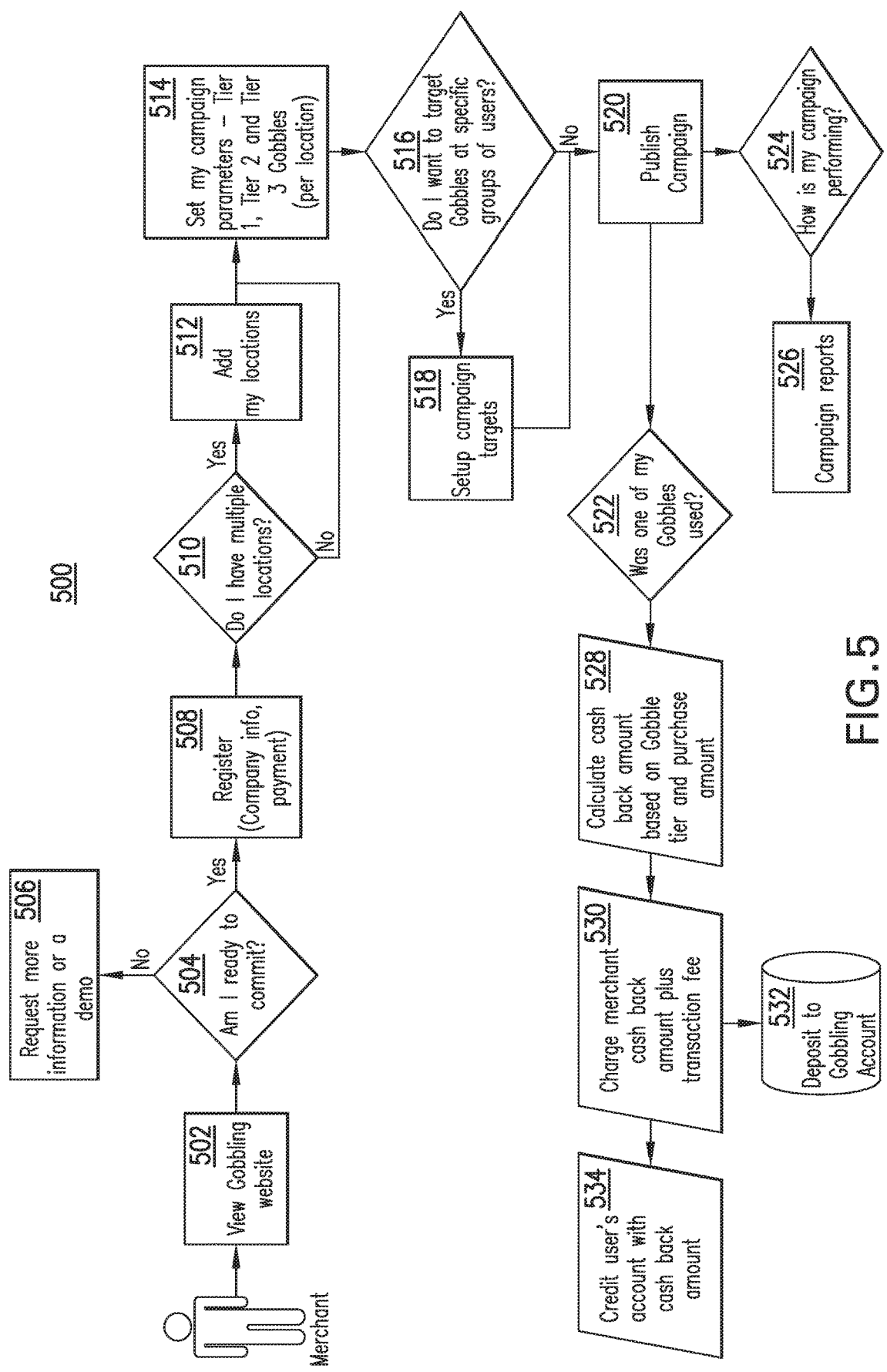
FIG. 5 illustrates a method 500 by which a Merchant can register and publish a campaign through GobblinQ according to an example embodiment.

FIG. 5 illustrates a method 500 by which a Merchant can register and publish a campaign through GobblinQ. An interested Merchant in step 502 views the GobblinQ website. According to a step 504, the website requests that the Merchant identify whether or not the Merchant would like to commit to register the Merchant's business with GobblinQ. If the Merchant responds in the negative to step 504, the GobblinQ website provides the Merchant in step 506 with options to request more information regarding GobblinQ or a demonstration of GobblinQ. If the Merchant responds in the affirmative to step 504, the GobblinQ website requests that the Merchant in step 508 identify company features to complete a registration process. In an example embodiment, registering the Merchant's company includes providing company identifying information (e.g., address, contact information, payment details). Following a successful registration process, the GobblinQ website in step 510 requests that the Merchant identify whether the Merchant's business has multiple locations. If the Merchant business has multiple locations the method proceeds according to step 512 and adds, in turn, each of the Merchant's different locations. Following adding the locations to the Merchant profile, the method proceeds according to step 514. If the Merchant business has a single location the method proceeds directly to step 514.

In step 514, GobblinQ website requests that the Merchant set the campaign parameters. In an example embodiment, the campaign parameters can be one of setting the campaign benefits for Gobble Users to one of a: Tier 1 Gobbles, Tier 2 Gobbles, and Tier 3 Gobbles. If the Merchant has added multiple locations to the Merchant profile, the Merchant is eligible during step 514 to select different Gobble campaigns for each of the individual locations, or on a global basis. Following selection of the campaign parameters, the Merchant is provided in step 516 with an option to target Gobble campaigns at specific groups of Users. If the Merchant elects to target specific groups, in step 518 the Merchant is able to setup campaign targets. In an example embodiment, campaign targets are identified by one of a gender, age, interest, occupation, region, or another User-identified or regional demographic. Following step 518, or in the event that the Merchant elected to not target Gobble campaigns, the method proceeds according to step 520. In step 520, GobblinQ publishes the campaign on behalf of the Merchant.

According to an example embodiment, the Merchant is provided with a final opportunity to review and make changes to the campaign prior to the publication of the campaign by GobblinQ. In an embodiment, the merchant has the ability to review, adjust, and/or change a Gobble™ campaign dynamically, manually, and at any time. In an embodiment, if a merchant changes the "rules" of the Gobbles in a specific campaign, any already issued Gobble of any tier will be honored.

Following publication of the campaign, the Merchant can at any point proceed according to step 522 and determine whether or not one of the campaign's Gobbles was used or according to step 524 and determine how the campaign is performing. If the Merchant proceeds according to step 524, the Merchant can view campaign reports in step 526. If the Merchant proceeds according to step 522, the Merchant is provided with an option to calculate the cashback amount based on the Gobble tier and the purchase amount by the Gobble User in step 528. Upon the Merchant executing the calculation option in step 528, the method then proceeds according to step 530 and charges the merchant the cashback amount plus a transaction fee. In step 532, the Merchant deposits an amount to the GobblinQ Account In an embodiment, any cash paid by merchant to GobblinQ shall take place immediately automatically upon each transaction, and yes I assume the amount shall include all cashback plus any transaction fee payable to GobblinQ. In step 534, the Gobble User's account is credited with a cashback amount.

In an embodiment, a merchant can determine how many Tier 1 Gobbles a campaign will be issuing, how many Tier 2 Gobbles and Tier 3 Gobbles each campaign will issue. Or, for example, the GobblinQ™ system will require a minimum amount of Gobbles of specific tiers. For example, in an embodiment, the GobblinQ™ requires a minimum of three Tier 2 Gobbles and one Tier 3 Gobble for each Tier 1 Gobble issued, and a maximum of five Tier 2 Gobbles and two Tier 3 Gobbles. A merchant can decide the cashback and discounts per Gobble for a specific campaign. In an embodiment, the merchant can decide how long a specific marketing campaign will last. For example the GobblinQ™ can override the merchant's decision and determine that a specific campaign will last at least 4 months. For example, the GobblinQ™ can override the merchant's decision and require a specific amount of Gobbles and determine the or a minimum number of Gobbles and/or cashback or discount percentages for each specific tier of Gobble. Gobble levels are described herein as different Tier 1, Tier 2, Tier 3 levels. In embodiments, the Gobble levels can be referred to differently, and/or there can be more or fewer Tier levels.

Figure 6:
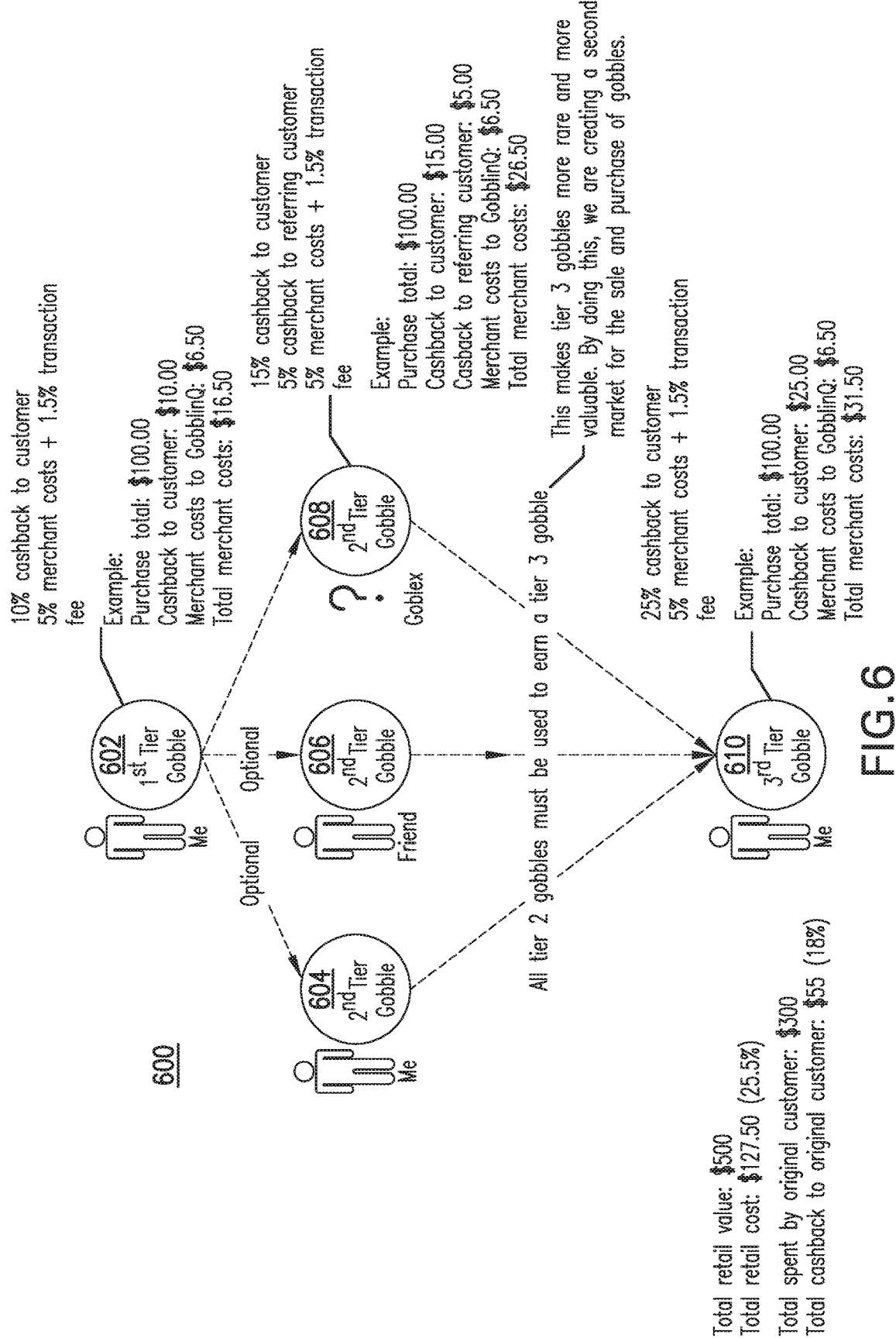
FIG. 6 illustrates the structural relationship 600 between the tiered Gobble System according to an example embodiment.

FIG. 6 illustrates the structural relationship 600 between the tiered Gobble System. A Merchant can subscribe to at least one of the depicted tiers, which include: $1^{st}$ Tier Gobble (602); $2^{nd}$ Tier Gobble (604, 606, & 608); and $3^{rd}$ Tier Gobble (610). The $1^{st}$ Tier Gobble, the $2^{nd}$ Tier Gobble, and the $3^{rd}$ Tier Gobble can be setup according to various tiered structures that provide varying benefits to the customer and transaction costs to the Merchant. According to an example embodiment, $1^{st}$ Tier Gobble 602 provides to the Gobble Customer 10% cashback and costs the Merchant 5% of the costs plus an additional 1.5% transaction fee. If therefore, the Gobble Customer purchases goods or services totaling $100.00, the Gobble Customer would receive $10.00 cashback ($100*0.10) and the Merchant would be charged $6.50 in costs to GobblinQ ($100.00*0.05+$100.00*0.015). Accordingly, the Merchant total costs are $16.50 ($10.00 cashback+$6.50 costs to GobblinQ).

Upon usage of the $1^{st}$ Tier Gobble, the Gobble Customer (604), or a Friend of the Gobble Customer (606), or upon implementation of a campaign via the GobblinQ community GobbleX (608), can then proceed to be eligible for $2^{nd}$ Tier Gobble campaigns. According to an example embodiment, $2^{nd}$ Tier Gobble (604, 606, & 608) provides to the Gobble Customer 15% cashback, provides 5% cashback to the referring Gobble Customer's referring Friend, and costs the Merchant 5% of the costs plus an additional 1.5% transaction fee. If therefore, the Gobble Customer sale results in a purchase of goods or services totaling $100.00, the Gobble Customer would receive $15.00 cashback ($100*0.15), the Gobble Customer's referring Friend would receive $5.00 ($100.00*0.05) and the Merchant would be charged $6.50 in costs to GobblinQ ($100.00*0.05+$100.00*0.015). Accordingly, the Merchant total costs are $26.50 ($15.00 cashback+$5.00 cashback+$6.50 costs to GobblinQ).

Upon usage of all of the $2^{nd}$ Tier Gobble, or upon usage of all of the $2^{nd}$ Tier Gobbles, the Gobble Customer/user is eligible for $3^{rd}$ Tier Gobble Campaigns. By in some cases, requiring usage of all $2^{nd}$ Tier Gobbles, the $3^{rd}$ Tier Gobbles are harder to achieve and are more rare. Gobble Customers accordingly would encounter the $3^{rd}$ Tier Gobble Campaigns (for example, any Tier 3 Gobbles are transferable to a Friend or Partner in the GobblinQ community subject to the Gobble user's approval.) and see greater value in these campaigns, thereby creating a secondary market for the sale and purchase of Gobbles. According to an example embodiment, $3^{rd}$ Tier Gobble 610 provides to the Gobble Customer 25% cashback and costs the Merchant 5% of the costs plus an additional 1.5% transaction fee. If therefore, the Gobble Customer purchases goods or services totaling $100.00, the Gobble Customer would receive $25.00 cashback ($100*0.25) and the Merchant would be charged $6.50 in costs to GobblinQ ($100.00*0.05+$100.00*0.015). Accordingly, the Merchant total costs are $31.50 ($25.00 cashback+$6.50 costs to GobblinQ).

In an embodiment, overall, as an extended example of the above Tiered examples, a Gobble Customer who has completed a purchase with a $3^{rd}$ Tier campaign has spent $300.00 ($100.00+$100.00+$100.00). However, that same Gobble Customer has received, in cashback, $50.00 ($10.00+$15.00+$25.00), and a referring Friend of the Gobble Customer has received, in cashback $5.00. Alternatively, the $2^{nd}$ Tier structure may result in the same Gobble Customer receiving all $55.00. The cashback returns to the customers, accordingly, is 18% ($55.00/$300.00*100). In order to provide the campaign incentives, the Merchant has overall invested $74.50 ($31.50+$26.50+$16.50).

Figure 7:
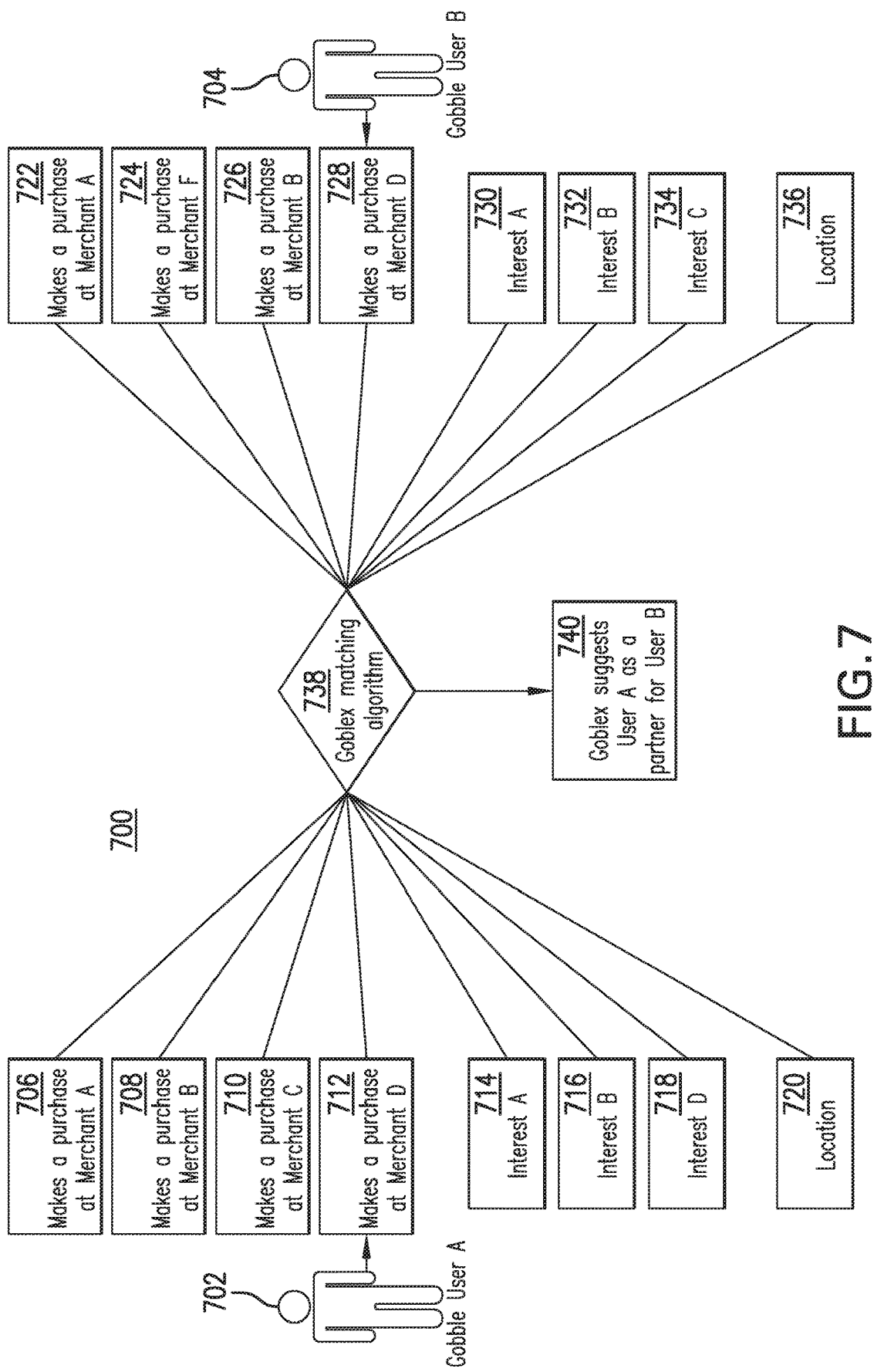
FIG. 7 illustrates an overview of the GobbleX matching algorithm 700 between multiple Gobble Users according to an example embodiment.

FIG. 7 illustrates an overview of the GobbleX matching algorithm 700 between multiple Gobble Users. According to an example embodiment, Gobble User A (702) and Gobble User B (704) are subject to a GobbleX matching algorithm (738). The GobbleX matching algorithm 738 considers the purchases of 702 (e.g., 706, 708, 710, & 712) and the purchases of 704 (e.g., 722, 724, 726, & 728). In an example embodiment, the GobbleX matching algorithm 738 considers the interests of 702 (e.g., 714, 716, 718) and the interests of 704 (e.g., 730, 732, 734), based on preferences of user lifestyle, requirements, requests, etc. In an example embodiment, the GobbleX matching algorithm 738 considers the location of 702 (e.g., 720) and the location of 704 (e.g., 736). The purchases (706-712 and 722-728) can be made by one of 702 and 704 at the same location or a variety of different locations. The interests (714-718 and 730-734) can be a variety of different interests. The locations (720 and 736) can be the same location or different locations. The location can also change over time according to the current determined location of one of 702 and 704. The purchases, interests, and locations of 702 and 704 can be, in an example embodiment, manually entered by the respective Gobble User. In an embodiment, a requirement for a specific type of purchase service or merchandise can be posted on the GobbleX™.

In an embodiment, the purchases, interests, and locations of 702 and 704 are determined automatically by information readily available, such as from a social media platform or through a GPS device. In an embodiment, interests are determined automatically by the GI, or determined by the GI based on the Gobble user's activity and/or the Gobble user's input regarding preferences. In an embodiment, a Gobble user profile includes a data field or other location space for a Gobble user's input regarding his/her preferences and/or requests. For example, a Gobble user's preference can be for a certain brand of clothing. For example, a Gobble user's request can be for a certain brand and type of clothing. In an embodiment, location can be a factor, in which case a GPS or other system or input by the user can provide the location. In an embodiment, a user informed the GI of his/her location schedule in order to request information on Gobbles and/or be on a list to receive Gobble. In an embodiment, GobblinQ™ provides the same service on all online purchases that are allowed in the store E. After analysis of the data related to 702 and 704 purchases, interests, and location, the GobbleX matching algorithm 738 produces a result 740 that suggests that User A 702 is set up as a partner for User B 704.

In an embodiment, a location can be requested by a Gobble™ user to the GI™. For example, Gobbler X intends to travel to location Y. Gobbler X can electronically alert the GI about the location cities and request Gobbles for those cities. Or, Gobbler X can request advance Gobbles for the intended location cities, provide they are not expired.

Figure 8:
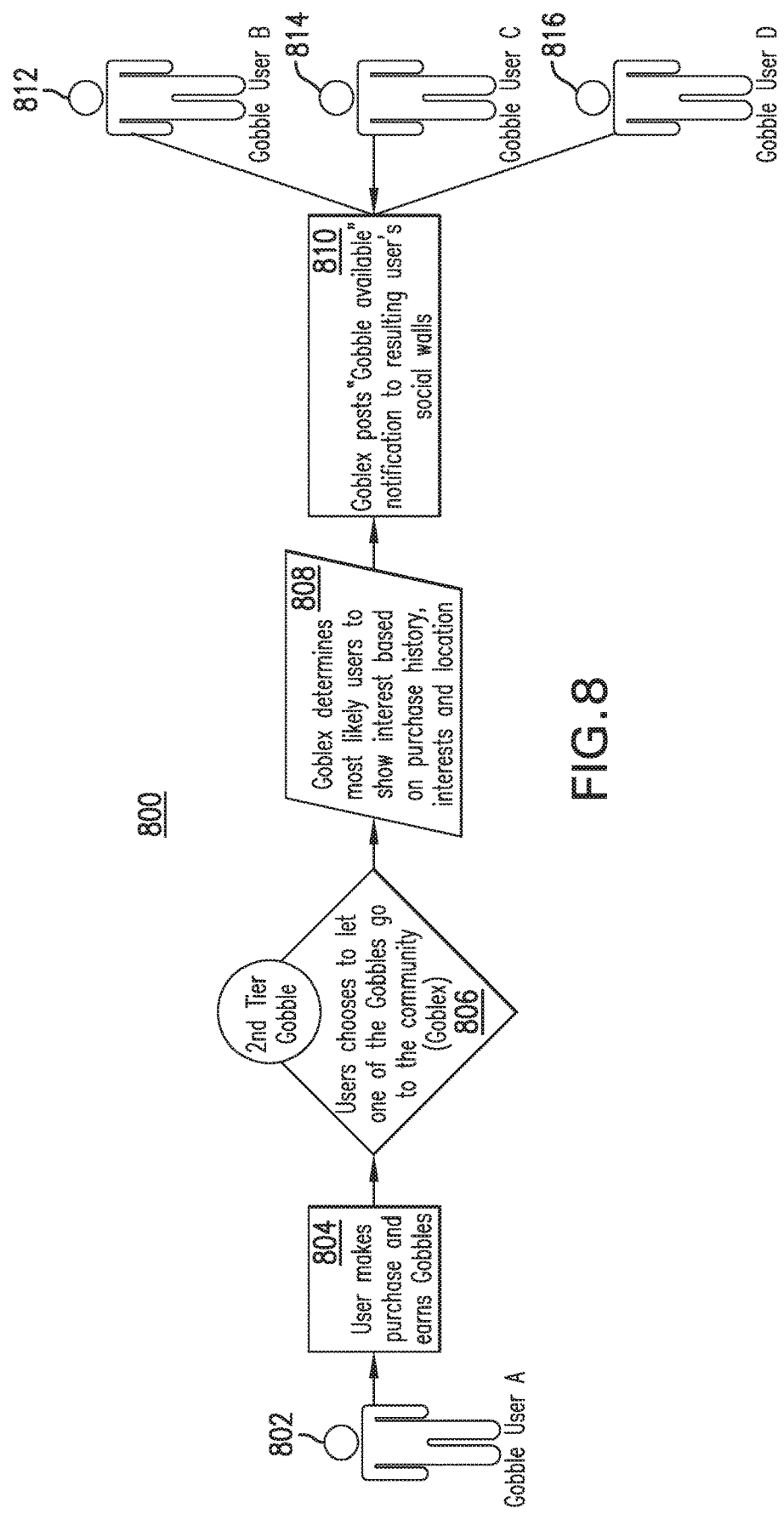
FIG. 8 illustrates a method of propagation 800 of a Gobble campaign to prospective Gobble Users according to an example embodiment.

FIG. 8 illustrates a method of propagation 800 of a Gobble campaign to prospective Gobble Users. Gobble User A (802) first makes a purchase using the Gobble Card OR BY phone and earns Gobbles as a result of the purchase in step 804. In an embodiment, a Gobble user retains (at user's option) one Tier 2 Gobble for personal use and sends the rest to partners/friends/GobbleX™. Those recipients of the Tier 2 Gobbles will have a specific amount of time to claim the Tier 2 Gobbles and to use them. Otherwise, there is a default setting that will push all Gobbles to the GI or other location for the user.

In an embodiment, only Tier 2 and Tier 3 Gobbles are shared by a user with a friend/partner/other in GobblinQ™. For example, if a Tier 2 Gobble is not used by a friend/partner/other within a predetermined timeframe, then the Tier 2 Gobble will be sent automatically to the GobbleX for sharing with other users or another task. In an embodiment, a timeframe to use a Gobble received can be a period of time between 24 hours and 6 months.

In an embodiment, Tier 2 Gobbles are available in a queue at the point of sale or placed/claimed by the GI to third parties. Even if a Tier 2 gobble is used at the POS by a third party, the GI can use such purchase to continue to build community with the original user. In an embodiment, if a Gobbler is in a queue for a Gobble regarding a specific brand of shoe at store Y. Then, the GobbleX™ can research and determine another location in the area that carries that specific day. Upon determining another location, which might also mean it is for a Gobble from a different Merchant, the GobbleX can offer that Gobble to the Gobbler. Upon accepting the auxiliary Gobble for a different merchant, the Gobbler can remain in the queue for a Gobble for the previously intended merchant. The queue is an electronic listing of Gobbler's unique identifiers. Upon release of a Gobble, then the first Gobbler entered in the queue receives the Gobble.

In an embodiment, the Gobble User A (or another User associated with the transaction from Gobble User A) chooses to let one (for example, can only keep one for his/her own personal user, or send them all to Friends/Partners/others, or allow automatic return of the Gobble to the GI management.

In FIG. 8, the Gobbles resulting from the purchase to go to the Gobble Community, GobbleX, according to step 806. After a Gobble has gone to GobbleX, GobbleX determines in step 808 the most likely Users to show interest in the Gobble based on a review of a plurality of Gobble User information, such as purchases history, lifestyle, interest, and location, and preferences as required "confidentially" by the Gobble user. In step 810, GobbleX posts to the determined interested Users that a Gobble is now available through a notification to those determined interested Users' social media walls and/or email. As such, determined interested Users (e.g., 812, 814, and 816) are able to view the notification and become aware of the Gobble campaign through the GobbleX community.

In an embodiment, merchants can at the push of a UI (user interface) button initiate campaigns to target users by sending invitation Gobbles (Tier 1, Tier 2, Tier 3, et al.) with a specified cashback and validity (minimum established by GobblinQ™ for a specific industry). In an embodiment, a merchant can preset an amount of time during which a Gobbler has not frequented the merchant or has not made a purchase, and the GobblinQ™ will send out a Tier 1 Gobble to the "absentee" Gobbler in an effort to encourage the Gobbler to purchase again. In an embodiment, instead of issuing a "new" Tier 1 Gobble, when a preset time is up and there are available Gobbles, the Gobbler can be offered one of the existing Gobbles for that merchant.

FIG. 9 illustrates an example form 900 that is populated by the Merchant when creating a Gobble campaign. The form can be filled by a Merchant over a webpage or a portal to the GobblinQ™ system and adjusted, reviewed, and/or changed daily, all Gobbles already issued being honored as campaigned when accepted. The form, in an example embodiment, includes default values or characters for portions not explicitly filled out by the Merchant. The form presents information in a variety of interactive formats, where the Merchant can interact with any one of a text input/text box, a radio button input, option buttons, submit buttons, and drop down bars. The form is, in an example embodiment, provided to the User in a User interface. Fields to be filled out in the User interface by the Merchant include in an example embodiment: "Title" (902); "$1^{st}$ Tier Cashback Amount" (904); "Description" (906); "Number of $1^{st}$ Tier Gobbles to Release" (908); "Start Date" (910); and "Expiration Date" (912). A Merchant would enter into the Title 902 field a desired title for the campaign. Any campaign decision chosen by merchant will be available for print and constantly updated and available by GobblinQ, providing status, on both PC and Mobile device of merchant.

A variety of profit sharing mechanisms are available. For example, as discussed herein, one mechanism includes the following.

Gobble user X uses one Tier 1 Gobble. The GI had a preset of three Tier 2 Gobbles for every Tier 1 Gobble. Here, Tier 1 Gobble provides a 10% discount on merchandise X. Tier 2 Gobble provides a 15% discount on merchandise for the user of the Tier 2 Gobble and a 5% cashback for the user of the Tier 1 Gobble that effectively spawned, or caused it to be released, the Tier 2 Gobble.

For example, Gobbler X uses Tier 1 Gobble™ and gets 10% discount on her $100 purchase. Effectively, Gobbler X gets $10 back (e.g., on GobblinQ™ account or other way). Three Tier 2 Gobbles are now available.

Gobbler™ X gives Gobbler™ Y a Tier 2 Gobble™ via GobblinQ™ Gobbler Y gets a discount of 15% using the Tier 2 Gobble™ on her purchase. For example, Gobbler Y spends $100 and gets effectively a $15 discount. Upon usage of the Tier 2 Gobble, Gobbler X benefited by getting 5% cashback, which is effectively $5. Further, Gobbler X can decide to keep one or more of the Tier 2 Gobbles and get both the discount and the cashback.

Accordingly, following the above example, Gobbler X could benefit:

Gobbler X spent $100, got $10 credit with Tier 1 Gobble.
Gobbler Y spent $100, got $15 credit with Tier 2 Gobble.
Gobbler X got $5 cashback.
Gobbler Z spent $100, got $15 credit with Tier 2 Gobble.
Gobbler X got $5 cashback.
Gobbler M spent $100, got $15 credit with Tier 2 Gobble.
Gobbler X got $5 cashback.

In tallying, Gobbler X received a $10 credit plus $15 cashback. Gobbler Y received a $15 credit. Gobbler Z received a $15 credit. Gobbler M received a $15 credit.

If Gobbler X kept one of the Tier 2 Gobbles to use, and spent $100 using the Tier 2 Gobble, then Gobbler X would have 15% discount ($15) and $5 cashback.

Then, in tallying, Gobbler X received $25 credit plus $10 cashback. Gobbler Y received a $15 credit. Gobbler X received a $15 credit.

In a further embodiment, once all three (or however many are released) of the Tier 2 Gobbles™ have been used, a Tier 3 Gobble™ is released to Gobbler X providing an additional discount and/or cashback available for Gobbler X.

In an embodiment, a Merchant enters into the $1^{st}$ Tier Cashback Amount 904 field a desired monetary value that the Gobble Customer would receive in cashback. According to an example embodiment, a minimum value can be set in the system such that the Gobble Customer receives at least a minimum monetary value in cashback, such as 10% of the purchase price. A Merchant would enter into the Description 906 field a description of the Gobble campaign to be generated. A Merchant would enter into the Number of $1^{st}$ Tier Gobbles to Release 908 field a numerical value representative of how many Gobble Customers can utilize the campaign before the campaign is no longer available to the Gobble public. A Merchant would enter into the Start Date 910 field a date on which the Gobble campaign is to begin. A Merchant would enter into the Expiration Date 912 field a date on which the Gobble campaign is to end. A Merchant can also select, for example, via radio buttons, how generation of a $1^{st}$ Tier Gobble campaign Gobble can further produce $2^{nd}$ Tier Gobbles. For example, by selection of 914, a Merchant can instruct that the usage of $1^{st}$ Tier Gobbles produces 3 $2^{nd}$ Tier Gobbles. For example, by selection of 916, a Merchant can instruct that the usage of $1^{st}$ Tier Gobbles produces 5 $2^{nd}$ Tier Gobbles. When a customer decides to see information on a specific merchant, such information is available on the information wall of the merchant. In an embodiment, the GobbleX™ pushes and receives information from a user via text/SMS/ When a customer decides to seek information on a specific merchant, such information shall be available on the information wall of such merchant for GobblinQ user to know before making a purchase. The GobblinQ mobile app provides for such assessments for both Gobble users and merchants 920.

According to an example embodiment, should the number of $1^{st}$ Tier Gobbles released not be used by Gobble Users, then the Merchant can elect to have the Gobbles expire after a period of time such as one year. The form provides exposure projections to the Merchant before the Merchant has populated the fields on the form based on a Merchant profile. In an example embodiment, the form provides exposure projections to the Merchant after (or while) the Merchant populates the fields on the form. Exposure projections include data of interest to the Merchant such as: Average Purchase Amount, $1^{st}$ Tier Revenue, $1^{st}$ Tier Cashback, $2^{nd}$ Tier Revenue, $2^{nd}$ Tier Cashback, Originator Earnings, $3^{rd}$ Tier Revenue, $3^{rd}$ Tier Cashback, Total Revenue, and Total Cost.

FIG. 10 illustrates an example form 1000 that is populated by a third party or a conglomerate when creating an offer that implements Gobble campaigns to target Gobble customers. The form can be filled by an operating party that is one of a Merchant, a Third Party, or a Conglomerate owner over a webpage or a portal to the GobblinQ™ system. The form, in an example embodiment, includes default values or characters for portions not explicitly filled out by the operating party. The form presents information in a variety of interactive formats, where the operating User can interact with any one of a text input/text box, a radio button input, option buttons, submit buttons, and drop down bars. The form is, in an example embodiment, provided to the operating party in a User interface.

Fields to be filled out in the User interface by the operating party include in an example embodiment: "Title" (1002); "$1^{st}$ Tier Cashback Amount" (1004); "Description" (1006); "Number of $1^{st}$ Tier Gobbles to Release" (1008); "Expiration Date" (1010); "Start Date" (1012); "Limit Audience" (1014); "Add Languages" (1016); "Demographics" (1018); "Add Merchants" (1020); "Interests" (1022); and "Connections" (1024). An operating party would enter into the Title 1002 field a desired title for the offer. An operating party would enter into the $1^{st}$ Tier Cashback Amount 1004 field a desired monetary value that the Gobble Customer would receive in cashback. According to an example embodiment, a minimum value can be set in the system such that the Gobble Customer receives at least a minimum monetary value in cashback, such as 5% of the purchase price. Each industry is different and GobblinQ will aim to be competitive but also acceptable by all merchants, especially in each industry. An operating party would enter into the Description 1006 field a description of the Gobble offer to be generated. An operating party would enter into the Number of $1^{st}$ Tier Gobbles to Release 1008 field a numerical value representative of how many Gobble Customers can utilize the offer before the offer is no longer available to the Gobble public. An operating party would enter into the Expiration Date 1010 field a date on which the Gobble offer is to end.

As part of the offer creation, an operating party further can specify a segment offer that is part of the offer creation. An operating party would enter into the Start Date 1012 field a date on which the segment campaign is to begin. An operating party would enter into the Limit Audience 1014 field a selection as to which Gobble Users are eligible to claim an offer. According to an example embodiment, the Gobble Users eligible to claim an offer can be limited according to one of a location (e.g., everywhere, by state, by city), a relationship with an operating party, an educational classification (e.g., class year, degree, institution), a work criteria (e.g., business, sector), financial criteria, and life events. An operating party would enter into the Add Languages 1016 field a selection as to what languages the Gobble offer will be marketed and described in. An operating party would enter into the Demographics 1018 field information regarding the demographics of the Gobble Users to whom the offer will be made available. According to an example embodiment, the demographics can be limited according to one of age (e.g., Gobble Users from ages 18 to 65 are eligible), gender (e.g., Male, Female, or Other), and another demographic criteria. An operating party would enter into the Add Merchants 1020 field criteria as to which Merchants have agreed to comply with the terms of the offer and will run campaigns consistent with the offer. An operating party would enter into the Interests 1022 field criteria regarding which Gobble Users will be eligible to claim an offer according to indicated interests either input manually by the Gobble User into a profile or through an indication on a social media platform. An operating party would enter into the Connections 1024 field information regarding how the offer would be limited based on connection to the operating party.

According to an example embodiment, the Connections field can be limited by an operating party's selection of one of: "only people connected to 'my brand'"; "only people NOT connected to 'my brand'"; and "only people who have not done business with 'my brand' for [a number of] months." According to an example embodiment, Gobble Users within the Segmented selections of the Offer will be marketed to via communications on their social media platforms. Merchants and or manufacturers, can directly at a push of a button initiate campaigns to target users by sending invitations Gobbles (Tier 1, or Tier 2, or Tier 3) with a specified cash back and validity (minimum established by GobblinQ for the specific industry). For example, as described herein, a Gobble (either a new one or an existing one) could be preset to be sent to specific "absentee" purchasers.

Example: Sending out the Gobble to a customer that has not been visiting the merchant for 1, 2, 3 months (depending on merchant's campaign) sending out Gobbles invitation to cross marketing opportunities determined and proposed by the "GI" based on "Intelligence" to create new customers and or more repeat customers to merchants or manufactures sending out Gobbles invitations for birthdays parties of users based on the "GI" proposed determination. All of the above will be provided to the merchant or manufacturer to determine its campaign over a period of time.

Figure 11:
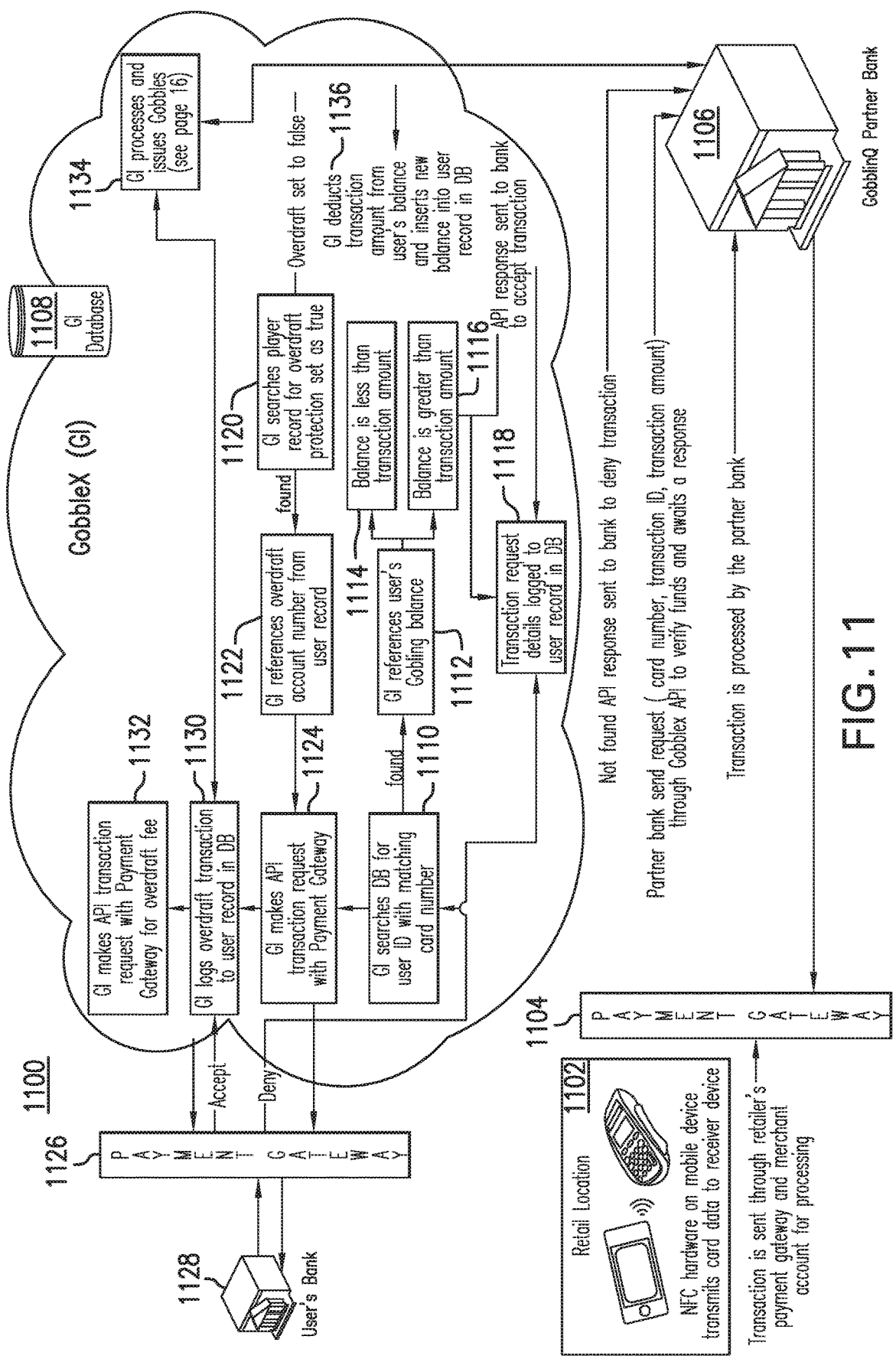
FIG. 11 illustrates a system 1100 level payments transaction as between a User at a Merchant Location, the User's Bank, the GobblinQ Partner, and the GobbleX Database according to an example embodiment.

FIG. 11 illustrates a system 1100 level payments transaction as between a User at a Merchant Location, the User's Bank, the GobblinQ Partner, and the GobbleX Database. A transaction for a sale of a good or service takes place at the merchant location 1102. According to an example embodiment NFC hardware on a mobile device transmits the Gobble Card number to a receiver device that is hosted by the merchant at the merchant location 1102. The receiver device of the merchant acknowledges the transaction locally as either a payment accepted or denied. Prior to the acknowledgement, the transaction is sent through the merchant's Payment Gateway 1104 so that the merchant can account for the processing of the payment. The transaction is first channeled through a Payment Gateway 1104. The Payment Gateway 1104 routes the transaction information to a GobblinQ Partner Bank 1106, which processes the transaction.

In order to complete the transaction, the GobblinQ Partner Bank 1106 sends a request with the requisite information related to the transaction through the GobbleX API to verify that there are sufficient funds in all accounts associated with the transaction. In the interim, the GobblinQ Partner Bank 1106 holds the transaction. Requisite information that is sent through the GobbleX API, which is associated with a GobbleX Database 1108, can include at least one of a Card Number (Gobble Card Number, a Card Number having an association with a Gobble Card Number, or an Electronic Representation of a Gobble Card Number), a Transaction Identification Number, and a Transaction amount. GobbleX, upon receipt of the request, searches the Database 1108 for User identification having a matching Card Number according to step 1110. If the matching card number is found, the transaction proceeds according to step 112. In step 1112, the GobbleX database references the Gobble User's GobblinQ balance. A comparison between the transaction amount and the balance of the User's GobblinQ account is then facilitated. If the balance of the User's GobblinQ account is greater than the transaction amount, then the GobbleX proceeds according to step 1116. Alternatively, if the balance of the User's GobblinQ account is less than the transaction amount, then GobbleX proceeds according to step 1114.

As a result of step 1116, the transaction request details are logged to the Gobble User in the GobbleX database 1108 in step 1118. Also as a result of step 1116, the API response is sent to the Bank to acknowledge that the Bank should accept the transaction. Accordingly, in step 1134, the GobbleX database 1108 processes and issues Gobbles, which are upon creation reported to the GobblinQ Partner Bank 1106. Also as a result of step 116, the GobbleX Database 1108 saves, in accordance, with step 1136, a new balance in the User record that accounts for deduction of the transaction amount from the User's previously reported balance. In addition to the foregoing, following step 110, GobbleX Database makes an API transaction request with second Payment Gateway 1126.

The Payment Gateway 1126 routes the transaction request at that time to the User's Bank 1128, which processes the request. If the User's Bank processes the request but there has been an overcharge to the User's Account, the transaction record is forwarded to the Payment Gateway 1126, which notes, in step 1130, that the GobbleX Database should include a log of the overdraft transaction to that particular User's transaction. Following step 1130, GobbleX proceeds to step 1132 in which GobbleX Database 1108 makes the API transaction request with Payment Gateway for the overdraft fee. In addition, following the logging of the overdraft transaction in step 1130, GobbleX further executes step 1134. In addition, a User's Bank can route through the Payment Gateway 1126 that the transaction is denied. In these particular situations, the API forwards the denial to the GobblinQ Partner Bank 1106 so that the transaction is denied. In addition in cases in which the transaction is denied by the User's Bank, the transaction request details are logged according to step 118. Any reporting to the GobblinQ Partner Bank 1106 is evaluated and can result in fulfillment or cancellation of the merchant transaction. The GobblinQ Partner Bank forwards a transaction status to the Payment Gateway 1104, which routes the result to the merchant location 1102. In embodiments of the present invention, GobblinQ™ will utilize an established bank, the bank issues the payment cards with the unique identifiers and communicates with the GobbleX™.

In a further example, when a user ID is not found by the GI in the database 1108, then the overdraft is set to "false" and the GI searched play record for overdraft protection set as true 1120, and when found the GI references the overdraft account number from the user record 1122 and the GI makes an API transaction request with payment gateway 1124.

Figure 12:
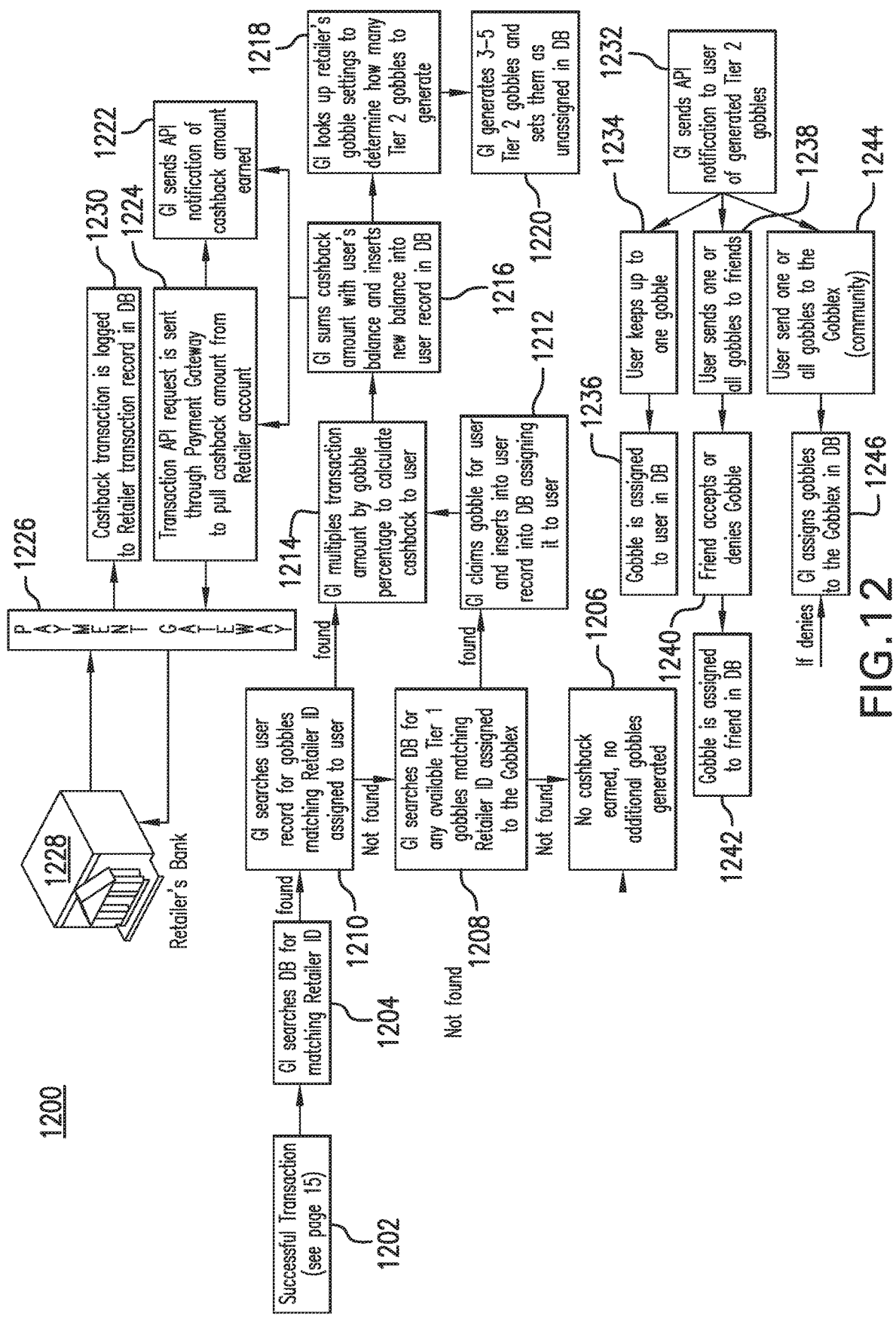
FIG. 12 illustrates a successful system level payments transaction as between a User at a Merchant Location, the Merchant's Bank, the GobblinQ Partner, and the GobbleX Database according to an example embodiment.

FIG. 12 illustrates a successful system level payments transaction as between a User at a Merchant Location, the Merchant's Bank, the GobblinQ Partner, and the GobbleX Database. Upon a successful transaction, 1202, GobbleX searches the GobbleX Database for a matching merchant identification number in accordance with 1204. If the matching merchant identification number is not found, then the method proceeds in accordance with 1206 and the Gobble User does not earn any cashback and no additional Gobbles are generated for the Gobble User. If instead, after 1204, the matching merchant identification number is found, GobbleX searches the Gobble User records for Gobbles matching the merchant identification number that are assigned to the Gobble User. If GobbleX does not find any Gobbles matching the merchant identification number that are assigned to the Gobble User, then GobbleX searches the GobbleX Database for any available Tier 1 Gobbles that match the merchant identification number that are assigned to the GobbleX community in 1208. If still, after 1208, no Gobbles are found that match the merchant identification number that are assigned to the GobbleX community, then in accordance with 1206 the Gobble User does not earn any cashback and no additional Gobbles are generated for the Gobble User. If after 1208, Gobbles are found that match the merchant identification number that are assigned to the GobbleX community, then in 1212 GobbleX claims the GobbleX community Gobble for the particular User and inserts the Gobble into the Gobble User record in the Database so that it is assigned to the Gobble User and no longer eligible to be claimed by another member of the GobbleX community.

Following 1212, or if a Gobble was found in 1210 that matched the merchant identification number that are assigned to the Gobble User, then in 1214 GobbleX multiplies the transaction amount by the Gobble cashback percentage to calculate how much cashback will be available to the Gobble User claiming the Gobble. Following calculation of the cashback percentage, GobbleX sums in 1216 the cashback amount with the User balance and inserts this summed value into a User record associated with the Gobble User in the Database. GobbleX looks up the merchant's Gobble settings to determine how many Tier 2 Gobbles should be generated as a result of this particular transaction in 1218. Following 1218, in 1220, GobbleX generates a number (e.g., 3 to 5) Tier 2 Gobbles and records them as being unassigned Gobbles in the Database. In 1232, GobbleX sends API notification to the Gobble User that these number of Tier 2 Gobbles have been generated and are available for consumption.

The Gobble User having the number of Tier 2 Gobbles may proceed in accordance with at least one of the following. In 1234, the Gobble User keeps at least one Gobble. Accordingly, the Gobble User's election to keep the Gobble is in 1236 assigned to the Gobble User in the Database. In 1238, the Gobble User elects to send one or all of the available Tier 2 Gobbles to Friends. Following 1238, in 1240, the Friend of the Gobble User accepts or denies the Gobble. According to the Friend's actions, the Gobble is reassigned in the Database to the Friend in 1242. If the Friend, instead of accepting the sent Gobble, denies the Gobble, GobbleX in 1246 assigns the Gobbles to the GobbleX in the Database. In an example embodiment, a Friend's failure to take action on a sent Gobble within a predetermined time period results in an automatic assignment of the Gobble to the GobbleX in 1246.

(Gobbler needs to do nothing, since GobbleX™ will manage everything. Gobbler can otherwise keep one Gobble for personal use and send all other Tier 2 and Tier 3 Gobbles to friends and or partners 1244. Following the summation of the cashback amount available to the Gobble User in 1216, GobbleX sends in 1222 an API notification of the cashback amount earned to the Gobble User. Also following the summation of the cashback amount available to the Gobble User in 1216, a transaction API request is sent through the Payment Gateway 1226, in accordance with 1224, to pull cashback amount from the Merchant account. The Payment Gateway 1226 routes the request to the Merchant's Bank 1228, which fulfills the request when possible, and provides a confirmation to the Payment Gateway 1226. The Payment Gateway 1226 confirms that the transaction has been fulfilled and accordingly in 1230 the cashback transaction is logged to the Merchant Transaction record in the Database.

Gobbler shall also receive available cash back notification in GobblinQ account, available Gobbles sent to friends or partners, and or managed by the "GI"

Figure 13A:
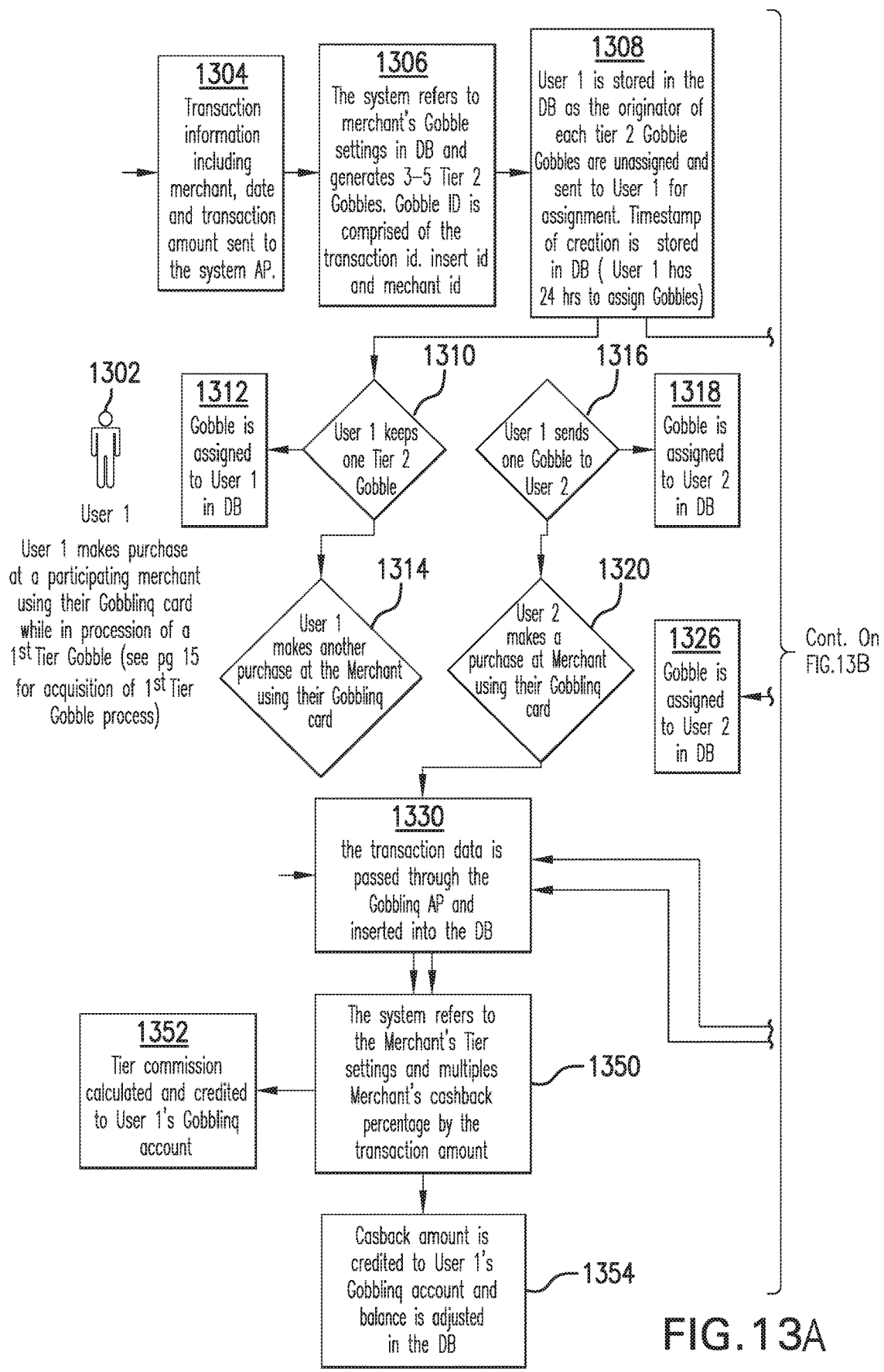
FIG. 13A illustrates an example method 1300 for implementation of a multiple tiered Gobble offer for a specific Merchant having multiple customers who are Gobble Users according to an example embodiment.

FIG. 13A illustrates a method 1300 for implementation of a multiple tiered Gobble offer for a particular Merchant having multiple customers who are Gobble Users.

User 1, identified by 1302, as an initiation of the method makes a purchase at a participating Merchant using his Gobble Card or by smartphone or other identification mode, while having (receiving automatically or possessing it already) a $1^{st}$ Tier Gobble. Following the purchase, at step 1304, the transaction information including the Merchant, the date of the transaction, and the transaction amount are sent over to the GobbleX™ API. In 1306, the GobbleX API system refers the Merchant associated with the merchant sales point where the purchase was made, and determines the Merchant's Gobble Settings from the Database. According to the Merchant's Gobble Settings, a number (e.g., 3-5) of Gobbles are generated. In an example embodiment, each Gobble has a Gobble identification number (ID number) that comprises fields that are assignable to a transaction identification number, a user identification number, and a Merchant identification number. In step 1308, the Gobble User is stored in the Database as the originator of Tier 2 Gobbles that were generated from the previous purchase. The Gobbles, however, remain unassigned (e.g., having no user identification number assigned in that particular field) and then they are sent to the Gobble User for assignment. A timestamp is recorded in the Database for the date and time of creation of the Gobble. Accordingly, in an example embodiment, the Gobble User assigned to the Gobbles has a specific time window (e.g., one day) to assign the Gobbles to other users.

The Gobble User having the number of Tier 2 Gobbles may proceed in accordance with at least one of the following. In 1310, the Gobble User keeps at least one Gobble. Accordingly, the Gobble User's election to keep the Gobble is in 1310 assigned to the Gobble User in the Database in 1312. Following the election to assign the Gobble to himself, the Gobble User makes another purchase at the Merchant using the Gobble Card in 1314. In 1316, the Gobble User elects to send one or all of the available Tier 2 Gobbles to a specific Friend. Following 1316, in 1318, the Friend of the Gobble User is assigned the Gobble. Following the assignment of the Gobble to the Friend, the Friend makes a purchase at a Merchant using his Gobble Card in 1320.

Figure 13B:
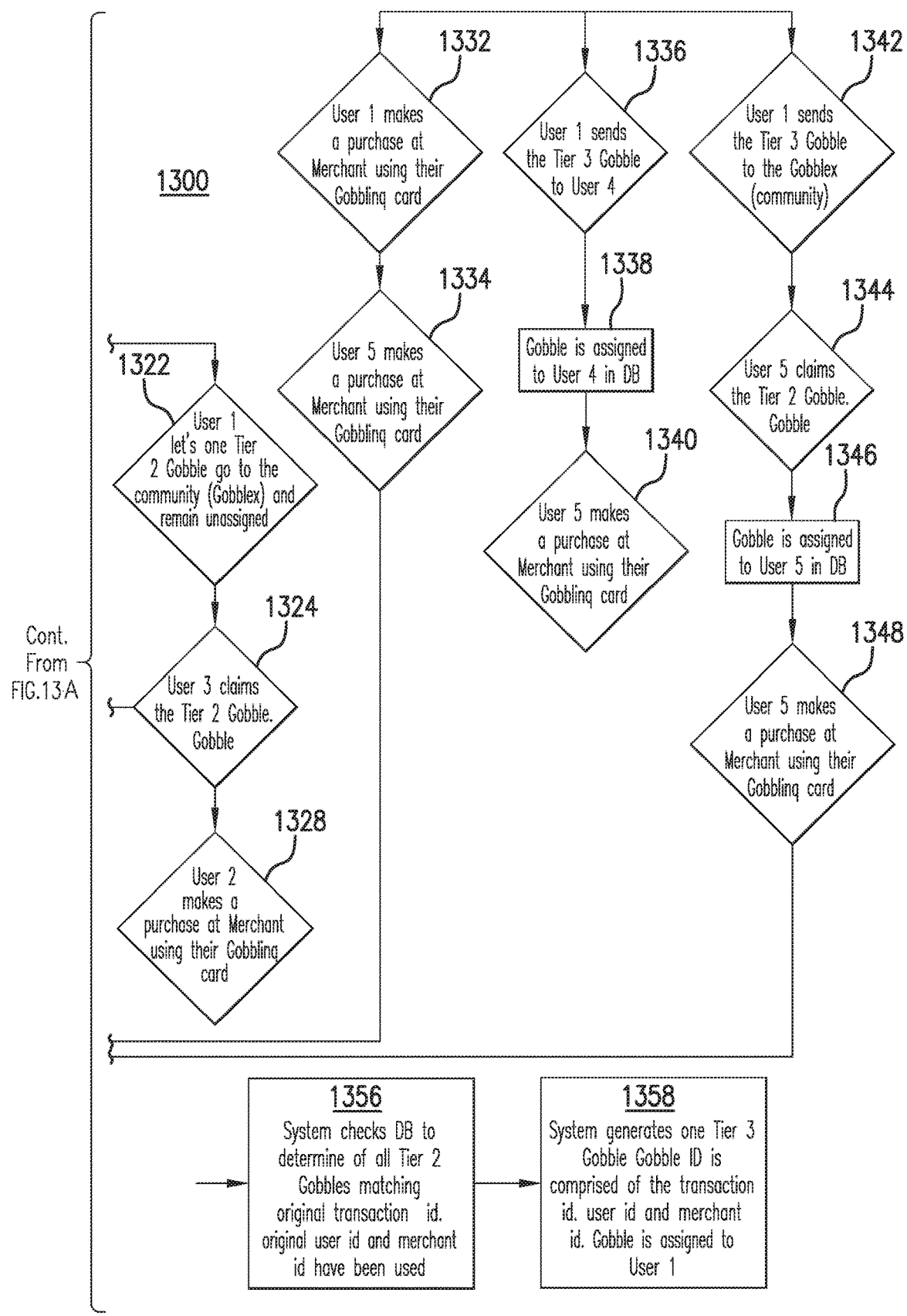
FIG. 13B illustrates a continuation of the example method 1300, presented in part in FIG. 13A, for implementation of a multiple tiered Gobble offer for a specific Merchant having multiple customers who are Gobble Users according to an example embodiment.

FIG. 13B illustrates a continuation of the example method 1300, presented in part in FIG. 13A, for implementation of a multiple tiered Gobble offer for a specific Merchant having multiple customers who are Gobble Users according to an example embodiment. Features described as part of method 1300 are, hereafter, included in either FIG. 13A or FIG. 13B.

In 1322, the Gobble User elects, or allows, at least one Tier 2 Gobble to go the GobbleX community and remain temporarily unassigned. Following the arrival of the Gobble in the GobbleX community, a new Gobble User (User 3) claims the Tier 2 Gobble in 1324. GobbleX then assigns the Gobble to the new User in the Database during 1326. Following 1324, in 1328, the new Gobble User makes a purchase at the Merchant using his Gobble Card.

At 1330, these purchases are processed and the transaction data is passed through the GobblinQ API and inserted into the Database. Following 1330, the GobbleX system refers to the Merchant's specific Tier settings and, for each purchase, determines the respective Gobble User's cashback percentage. The Gobble User's cashback percentage is calculated by multiplying the percentage from the Merchant's Settings associated with the Tier 2 Gobble by the amount of the transaction in 1350. In 1352, the Tier commission for the Gobble User (the initial Gobble User who sent the Gobble to a Friend or the GobbleX community) is calculated and credited to that particular Gobble User's GobblinQ account. In 1354, the calculated cashback amount is credited to the purchasing Gobble User's GobblinQ account.

In 1356, the GobbleX system checks the Database to determine if all of the Tier 2 Gobbles matching the original transaction identification number and the original user identification number have been used. If all of the original transaction Tier 2 Gobbles have been used, then GobbleX proceeds in accordance with 1358 and generates one Tier 3 Gobble 1360. The Gobble ID for the Tier 3 Gobble is comprised of the Transaction identification number, the user identification number of the original user, and the Merchant identification number. The Tier 3 Gobble is assigned to the original Gobble User.

Following assignment of the Tier 3 Gobble to the original Gobble User, the Gobble User proceeds according to one of the following. In an example embodiment, the Gobble User proceeds in accordance with 1332 and makes a purchase at the Merchant using his Gobble Card. Following the Gobble User's purchase, at 1334, an additional Gobble User makes a purchase at the Merchant using his Gobble Card. In an example embodiment, the Gobble User proceeds in accordance with 1336 and sends the Tier 3 Gobble to another Gobble User (4). Gobble User 4, in 1338, is assigned to the Tier 3 Gobble. Following the Gobble User's purchase, at 1340, an additional Gobble User makes a purchase at the Merchant using his Gobble Card. In an example embodiment, the Gobble User proceeds in accordance with 1342 and sends the Tier 3 Gobble to the GobbleX community. Gobble User (5), in 1344, claims the Tier 3 Gobble. Following the Gobble User 5 claiming procedure, at 1346, Gobble User (5) is assigned the Tier 3 Gobble. The Gobble User 5 then, in 1348, proceeds to make a purchase at the Merchant using his Gobble Card. The above transactions involving the assignment of the Tier 3 Gobble are then processed in accordance with the procedure described above regarding 1330.

Embodiments of the present invention provide for cross marketing of services, goods, and other. For example, the GobbleX Intelligence™ keeps track of a Gobble user's inputted preferences, lifestyle, and merchants, among other things, where the user has purchased something. For example, a Gobble user indicates a preference or request for brandX shoes in the user's profile stored by the GI. Then, the GI can send to the user available Gobbles and/or event opportunities for such brandX shoes at one or more locations. Or, for example, a Gobble user purchases brandX shoes at Department store A. Then, the GI queries the user and/or the Department store A for information of what was purchased. In an embodiment, the GI allows for photo/image posting to indicate purchase(s). The GI can then send to the user available Gobbles and/or event opportunities from a variety of merchants of varying types for that same type/brand item purchased or for similarly situated merchants. Or, for example, a Gobble user purchases serviceX from Service merchant A. Then, the GI queries the user and/or the Service merchant A for information regarding what service was purchased. The GI can then send to the user available Gobbles and/or event opportunities from one or more merchants (service or goods or other) for the same type of service, for the same Service brand services, for similar services and/or similarly situated merchants.

In embodiments of the present invention, upon a purchase by the Gobble user, the GI or other entity acting on behalf of the GI, will send to the Gobble user a request for information regarding the purchase. For example, the request is sent by at least one of a telephone call, an SMS, or simply via the app, which like Facebook and or Twitter is connected to Mobile phone and or computer of USER, an email, or other communication. For example, the request is requesting information on what was purchased and any other information concerning same, as well as any preferences stemming from such purchase. For example, the Gobble user purchases a tax service to do his taxes. The GI or other queries the Gobble user for information on the purchase. The Gobble user can then share that the purchase was for a tax service for a specific dollar amount at a specific merchant. The GI or other can then (or in the earlier query) request information regarding what further the Gobble user would prefer, e.g., a lower cost, a different tax service for comparison, etc. In response to any information provided by the Gobble user, the GI updates the data store of the Gobble user to reflect this new information. And, the GI can use that updated information of the Gobble user to send more directed and/or applicable marketing campaigns, Gobbles, Legion Buying Splash™ events, etc.

In an embodiment, the GI's intelligence capability will frequently or regularly contact the Gobbler in order to gain information and feedback to provide a better learning system.

In an embodiment, Gobble user A buys coffee from merchant A every weekday. Gobble user A either uses a Gobble to make the purchase (and thus, goes through the GI to accept the Gobble) or uses the GobblinQ™ account card.

In an embodiment, if users does not have a Gobble available user will know via GobblinQ™ that (i) such location offers GobblinQ™ (ii) the type of Gobbles available at such location "POS"(Tier 1 Tier 2) and (iii) what are the pay outs of each Gobble, established by the merchants in its campaign with GobblinQ™. so user does not need a Gobble to make a purchase at the POS. Gobbles are also issued automatically at the POS upon a purchase via GobblinQ™ subject to availability in a queue at the POS. user only need to use GobblinQ™ to pay.

In an embodiment, when Gobble user A uses either an account card whose activity is accessible by or associated with the G or uses a Gobble through the GI to make a purchase, then the GI has access to certain details of the purchase. For example, the GI notes that something (or, notes coffee if access to the merchant information is provided or if Gobble user A provides such information) is purchased, from only merchant A, at location X, at a time of day, and/or at a frequency of once a weekday. The GI's lifestyle module or algorithm can determine from that purchase and based on Gobble user A's stored preferences (as well as requests by the user posted by user directly to the "GI") that Gobble user A likes to get a morning coffee at a location near Gobble user A's office. Accordingly, the GI can use this information and subsequent information to learn the preferences, lifestyle, and habits of Gobble user A and then cross-market to Gobble user A other coffee shops, for example, near Gobble user A's office. This cross-marketing can be effected by providing a Gobble to Gobble user A for coffee or other item at a different merchant. Or, this cross-marketing can be ALSO effected by providing a Legion Buying Splash™ event opportunity to Gobble user A for coffee or other coffee shop item at a different merchant (For example, with Legion Buying Splash™ a user can launch "an event" or participate in an event which the GI will provide to user based on user's "request, need, preferences". The user will interact with the GI asking for help to seek deals.) Other embodiments are also possible. As the GI gets more data on the Gobble user—from indicated preferences and/or lifestyle and habit—the GI becomes more accurate in the outcome from its algorithms which parse for an optimal relationship between preferences, lifestyle, habit, and location. This way, for example, when a Gobble that concerns a similar preference, lifestyle, habit, and/or location of a Gobble user, is available in the GI, the GI has a function that can automatically send a notification to the Gobble user regarding that relevant Gobble, and or provide information to the user regarding merchants offering Gobbles™ taking GobblinQ™ for specific items or services required by the user/Gobbler™ based on preferences posted on GobblinQ™ by user, based on user's requests to the "GI", based on user's life style, user's past purchases with GobblinQ™, location of user, and information provided by user to the GI to better performance of the GI's services to make money for the user. The "GI" will interact with user after making any purchase, asking to user to explain what user has purchased to better serve user's needs in the future. User may elect not to answer but the "GI" will explain more information will provide better deals for user in the future. User may also request to the "GI" best deals available "Gobble" for specific purchases—this also will be part of the "GI" intelligence and will enable the "GI" to constantly update its data and intelligence based on the following: 1) user's requests, life style, preferences, purchases and 2) merchant's marketing, promotions, requirements (merchant's requirements may include: type of customer, spending capabilities, repeat business, genre, and more . . . )

In an embodiment, the user has the ability to post picture of purchase on GobblinQ™

To be shared by user with user's community of partners and or friends on Facebook™, Twitter™, Instagram™, Snapchat™, Pinterest™, Google™, and other social networks the GI will request user to provide information of each purchase and user may elect to provide info as well as picture of item to allow the GI to better perform his function and better service the needs of the user. This function will be optional but must be provided in order to enable the "GI" to better assemble data about user In embodiments of the present invention, merchant as used throughout this application is a manufacturer, merchant, store, a chain of stores, a service provider, a manufacturer, and/or a goods supplier.

In embodiments of the present invention, a Gobble can be a percentage or currency amount discount on services, goods, entertainment, or other matter. A Gobble can be a cashback percentage or currency amount on services, goods, entertainment, or other matter. A Gobble can be both a discount and a cashback. They are not mutually exclusive. A Gobble can be a benefit, e.g., a free good or service or other. A Gobble can be a unit of currency or points, which are then translatable into cashback, discount, or other benefit. For example, a Gobble user uses a Gobble issued by the Theater merchant (e.g., through the GI) which provides for a 5% cashback and a 5% discount for a purchase of $200 (before tax) theater tickets purchased from Theater merchant A. The Gobble user pays $190 (before tax), reflecting the 5% discount. The Gobble user receives $10 cashback through the user's GI account, GobblinQ™ account, credit card account, bank account, online service, or other specified way. The cashback can remain on the account as a useable $10 amount to be used towards future purchases (either at specific merchant(s) or anywhere). The cashback can be received as cash via a cash machine, bank, or other way. The cashback can be used to purchase benefits, e.g., a specific set of goods or "prizes" or services from specific supplier(s), or a magazine subscription, or other. In an embodiment, the cashback is readily available to be withdrawn as cash or used to purchase additional items. The payment card associated with the bank—that "talks" with the GI™—can be used in a cash machine to withdraw the cashbacks. Alternatively, a Gobbler can use the cashbacks in electronic form and apply them to purchase(s) online. The cashbacks are associated with the payment card and would be deducted first from the purchase total, and then any remaining purchase amount would be handled separately.

In an embodiment, the Gobble user uses a GobblinQ™ credit or check card. In using the GobblinQ™ card, any and all purchases made with that card are kept track of by the GI with respect to the Gobble user's lifestyle, and can be used in determining what directed Gobbles and/or events to alert or send to the Gobble user. The "GI" also builds up partner communities in GobblinQ™ by suggesting to users to partner and connect on GobblinQ™ with other users who share "similar profiles" (profile defined as: life styles, needs, preferences, "credibility factor" (see below) purchase history, locations, status, wealth among other things, or upon making a purchase. This can particularly be useful for businesses too. GobblinQ™ could be essential for businesses not only to share gobbles but become acquainted with and connect as partners in GobblinQ™). The GobblinQ™ card (payment can be made via the app with NFC technology as well) is associated with the GI and permissions for purchase information is provided to the GI or fetched by the GI in order to populate the database fields with the purchase information. In an embodiment, the Gobble user uses a non-GobblinQ™ credit card, debit card, check, cash, or other payment method. The purchase information made in these circumstances are known if the Gobble user uses a Gobble for the purchase, and thus, communicates through the GI, or if the Gobble user participates in a Legion Buying Splash™.

In embodiments of the present invention, a Gobble user receives a user quality index rating. In an embodiment, a user does not need to purchase only from one store. The rating or credibility factor is based on the user's credibility factor to be a valuable customer and reliable purchaser. A user can be rated across the board and can obtain extended payment option without interest over a specific period of time (e.g., 12 to 18 months) depending upon the merchant promotions. In a point of sale situation where a user purchases for the first time, upon making the purchase with the extended payment option with no interest, the user will still receive a Gobble, the tier for which is determined by the merchant based on its campaign on GobblinQ™. In an embodiment, cashbacks obtained from such Gobbles will be held by GobblinQ™ in favor of the merchant until a user has paid in full the extended payment option, after which the cashbacks will be credited to the user's GobblinQ™ account, and the merchant will rate the user via GobblinQ™ for future purchases with the extended payment option, the time for which can be determined based on the merchant and the credibility rating of the user. For example, if a Gobble user is recorded by the GI as completing purchases of a certain amount regularly or not regularly but based on preferences and/or requests posted by a user to the GI from any merchant, and/or other quality indicator, then the Gobble user is provided with a user quality index rating. If the user quality index rating is above a set threshold, then the Gobble user is made eligible for more discounts, cashback, merchant events, and/or extended payment options.

For example, Gobble user A purchases $1000 from Store X every month for a year, thus having a total purchase amount of $12,000 over 12 months. The credibility factor or rating does not need to be only based on repeat purchases by the user nor does it need to only be based on purchases at a specific store. The GI assembles the spending credibility and trend of user across the board for purchases made with all merchants in order to provide the intelligence to any new merchant that may not have met prior. This type of intelligence provides status and credibility information based on the financial behavior across the board and not only at a specific merchant. The credibility factor or rating will also be determined by the repeat business history of the Gobble user.

In an embodiment, the GI applies a user quality index rating on Gobble user A to determine whether the specific behavior over 12 months is reliable for a specific benefit level. For example, if the GI applies a user quality level of 8/10 to Gobble user A, then, according to stored preset information including a threshold number for the quality level, in the GI, a user quality level of 8/10 provides the Gobble user A with the option to do an extended payment plan with Store X of items totaling $x.

Each merchant provides parameters for the Gobbles release and use on the GobblinQ™ so that each user that wants to use the extended payment option with no interest, shall have the ability to compare the Gobbles percentages payouts, parameter, and amounts. Or, for example, based on the Gobble user A's quality level or another factor, Gobble user A is provided access to, e.g., an electronic/digital on the app concierge service which, e.g., makes reservations at specific restaurants based on Gobbles availability and user requests. In an embodiment, this can apply for any reservation including hotels, airlines, and in store appointments. In store appointments are when a merchant and a user make an appointment via GobblinQ for a potential or specific purchase. The specificity of the restaurant can be provided by the GI concierge based on the known location of the Gobble user, the Gobble user preferences and/or requests, the Gobble user's location(s), the Gobble user's lifestyle (e.g., purchase history indicates dining experiences only at Michelin star restaurants, etc.), or other information.

In an embodiment, merchants are provided intelligence on Gobble users as a whole, subset group (based on age, profession, location, lifestyle, requests, etc.), and independently. For example, Gobble user A uses a Gobble to purchase a flight with GobblinQ™ from New York City to Las Vegas. The GI automatically sends to Gobble user A information regarding Gobbles available for, e.g., restaurants of possible interest to Gobble user A based on Gobble user A's dining purchase history stored in the GI, and/or preferences, as well by providing a merchant's gobbles offering (tier type and cashback payouts in order for a user to better decide where to book a reservation. A user can request such information and/or gobbles for a specific purchase to the GI. The GI interacts with use, and improves in its determination of gobble deployment based on the further information feedback.

Alternatively, or in addition to, the GI sends this information to Gobble user A upon the user's request. Gobble user A sets a reservation at Steak restaurant A via the GI, or alerting the GI to the reservation by identifying a Gobble to be used or reserving with a guarantee via the GobblinQ™ account card or other means. The GI can then send, and/or the Steak restaurant A can request, the Gobble user A's preferences (e.g., how steak should be prepared, allergies information, wine preferences, etc.). This sharing of information can provide for a more enjoyable Gobble user experience and a subsequent good review for the Steak restaurant A for anticipating or preparing for the needs of the user. Intelligence of the user and the merchant information is needed in order to provide a better and more directed experience to both and retain business through GobblinQ™.

In an embodiment of the present invention, if a merchant stops the account with GobblinQ™ the data and intelligence associated with that merchant will be lost by the merchant and remain exclusively with GobblinQ™. If a merchant ends its relationship with GobblinQ™, but then rejoins within 12 months, all past data and intelligence associated with that merchant can be re-associated with the merchant. This timeframe can been adjusted by the GobblinQ system, and can differ based on industry etc.

In an embodiment, a merchant A is informed that Gobble user A has a preference for and is a frequent customer of merchant A's product B. Accordingly, merchant A can use that marketing information and send Gobble(s) for a discount, cashback or other benefit, on product B to Gobble user A, to increase sales and goodwill in a more directed manner. This directed marketing can save a merchant time, money, effort, and other, as well a save Gobble users not interested in merchant A's product B time and efforts in not having to wade through unwanted Gobble opportunities. In an embodiment, a merchant in addition, a merchant can set its parameters regarding its campaign with GobblinQ™, by establishing when to send to a user an invitation Gobble of which tier type and cash back percentages will be also determined by merchant in its campaign.

Example: user A. goes to merchant b, and user does not return to merchant b within a preset time of 3 months from his last visit (as preset by merchant in its campaign in GobblinQ™), so the "GI" manages to send an invitation Gobble (Tier 1 or Tier 2) to user valid for a period of time as define by GobblinQ™ parameters, in order to gain back user's business.

In an embodiment, Gobbles can be substantially more valuable based on merchant's campaign on GobblinQ™: "example": a restaurant offer tier 1 Gobbles paying cash backs of 10%, Tier 2 20% and Tier 3 25% but if party of minimum 5, then Tier 1 Gobbles will be paying cash backs of 15%, Tier 2 of 25%, and Tier 3 of 35%

EXAMPLE: In an embodiment, partner relationships are built by the GI. For example, Gobble user A spends $1000 on a high-end merchant(s) on a monthly or regular basis. This does not need to be only at a merchant and does not need to be on a regular basis. Gobble user B also spends similar amounts at high-end merchant(s) The GI runs a check on the Gobble users to determine similarities in (similarities can be a variety of things—not only amounts spent), type of merchants frequented, of such purchase activity. Based on a similarity of one or more of these or other factors, the GI sends an introduction to each of the Gobble users identifying a potential partner and requesting permission to connect the two via the app like on Facebook™ email/SMS/other digital method/through the GI interface only. Gobble user A and Gobble user B each agree to the GI to the partner connection. The GI updates the user profile for each Gobble user upon agreement to indicate they are partners. In the user profile database, for example, the indicator can be a "partners" field identifying the partner Gobble user unique identification (e.g., each Gobble user has a unique identification assigned to it by the GobbleX Intelligence registration module or app when registering to be a Gobble user). For example, in Gobble user A's profile having unique identification 1A2345678901011121314151617 there is a link or association with a partners' database, or there is a partner's field in the respective user profile database, which has a "yes" or "1" or other indicator to indicate that Gobble user A is a partner with Gobble user B, and has an associated partner identification field which has Gobble user B's unique identification.

In an embodiment, partners are also created by the GI as follows:

User purchases a pair of shoes for $150.00 and receives a tier 1 Gobbles with instant cash backs of 10% (or as preset by merchant according to the minimum percentages allowed by GobblinQ™)=to $15.00. As soon as the purchase is made, the user receives on the app a notification from the "GI™" that user received $15.00 cash back in addition to 3 Tier 2 gobbles and 1 Tier 3 Gobble (or as defined by merchant—it can be up to 5 Tier 2 Gobbles) which user can choose to send to a friend or a partner or if user does not act, the GI will handle for user.

An hour later or a day or a week later, user receives a notification on the app in which user is notified that a "Gobbler" named entity X has used one of user's Gobbles placed by the GI and generated for user 5% cask back on entity X purchase=to $10.00 available in cash in user GobblinQ™ account.

The "GI" informs simultaneously entity X that she received a Tier 2 gobble generated by user "TOM" at the POS providing entity X with a 20% cash back=to $40.00.

At this point the "GI™" suggests to both users to stay connected on GobblinQ™ and become partners. The GI shall ask the authorization to each user upon user's request to allow the GI to share each user's preferences and general profiles at which time users can accept or deny.

When Gobble users are associated by the GI as "partners," then a Gobble user can set preferences that available Gobbles of a type or certain Legion Buying Splash™ event(s) are sent to the applicable partner. The Legion Buying Splash™ event can be launched by user or be joined by user without having a partner community. Partnerships maybe then proposed by the GI as explained above, in addition but not limited to all other intelligence. For example, a partners' share module in the GI receives notification from the Gobble user A profile that Gobbles of a certain type or for a certain merchant type are available from the Gobble user A. The partners' share module then parses the partners' database or the respective partner's field to determine whether Gobble user A has a partner. If the partners' share module determines that Gobble user A and Gobble user B are partners, then the partners' share module parses at least one of: a partners' database indicating a common preference, lifestyle or other of the partners, and a Gobble user B profile database for preferences, lifestyle or other. Upon finding a common preference, for example, the partners' share module compares that common preference with the type of Gobble available to determine whether to automatically forward on the Gobble to the partner Gobble user B. If the comparison results in a yes or "1" or positive match, then the partners' share module effects the transmission of the Gobble to the partner Gobble user B. The transmission can be executed by the partners' share module or by a separate module or deployment function called. In an example embodiment, a Legion Buying Splash™ event or other is the opportunity to share instead of or in addition to the Gobble.

In an embodiment, Gobble user A can manually indicate that Gobble X or Legion Buying Splash™ event or other is forwarded or identified as available to partner Gobble user B.

Legion Buying Splash™ can be launched by users or also search and joined by user based on recommendations of the "GI" calculated by the "GI" based on the intelligence on user and or specific requests of user.

Example: user wants to launch a Legion Buying Splash™ event to rent a limousine in Las Vegas on Mar. 20, 2015.

The "GI" provides all limousine companies accepting GobblinQ™ in Las Vegas and having a Legion Buying Splash™ event, describing all the Gobbles and cash backs payable based on attendency within 72 hours period from the beginning of the event (events last 72 hours). User can choose to join an existing event in which case the "GI" provide the amount of users already joined to allow user to consider best cash backs potential, including time remaining to join and make a purchase in each specific event.

If user determines there are no events user wants to join than user can launch a new event promoted by the "GI" in which case the "GI" will keep informed user with amount of users joining the event and time remaining to make a purchase. The "GI" will perform the same notifications to all users joining or launching a Legion Buying Splash™ event. In an embodiment, purchases at a Legion Buying Splash™ event can be made online or in store across the United States, depending upon the merchant.

In an embodiment, a Gobble or Legion Buying Splash™ event or other are available for limited time. For example, a merchant or user who releases one or more Gobbles and/or Legion Buying Splash™ events can associate an availability period for the specific Gobble and/or Legion Buying Splash™ event. For example, merchant A releases five Gobbles for a 20% discount on typeX jewelry which become active or available the same day at. A Legion Buying Splash™ event will have a predetermined amount of time to market it by both the Gobble user and/or the GI™, and upon initiation will have a predetermined amount of time before it expires. (with minimum days and or amounts defined by GobblinQ™ while merchant setting the rest). For example, merchant a can decide or pre-decide that the gobbles, sent to a specific user for invitation upon expiration at 10 p.m., are re-released to the GI or another with a new availability (Gobbles have a minimum time expiration as determined by GobblinQ™)

For example, Gobble user A purchases item A from merchant A. Gobble user A gets five Gobbles to share with partners, friends, others. Gobble user A alerts Gobble partner B that a Gobble for merchant A is available. Gobble user A manually assigns (or, pre-assigns, dynamically assigns, etc.) a time limit of 48 hours for Gobble partner A to respond and/or make a purchase. Or, the GI can pre-assign or dynamically assign a time limit for such response and/or purchase before the Gobble (e.g., does not expire) or is made available again to Gobble user A to be marketed and/or placed by the GI in a queue at the POS. Such other location can be a database of available Gobbles for any Gobble user to parse via the GI search function and then use upon finding useful Gobble(s). In an embodiment, any and all Gobbles have a minimum expiration date defined by GobblinQ™ and a maximum expiration date will be present by the merchant according to its marketing campaign on GobblinQ™.

In an embodiment, when a Gobble made available by Gobble user A is either used or the time to use by a partner and or by the GI or other is expired, Gobble user A is alerted, e.g., by digital communication method and on the app like on Twitter™ or Facebook™, such as an SMS or email or electronic voicemail or update to an online accessible database. In an embodiment, when a Gobble is made available, used, and/or expired, the merchant who originally allowed for the issuance of the Gobble is alerted, e.g., by digital communication method such as an SMS or email or electronic voicemail or update to an online accessible database.

In an embodiment, the Legion Buying Splash™ or Legion Buying Splash™ or other sales event at one or more merchants, s initiated by at least one of the GI, GI administrator, merchant(s), and Gobble user(s). In an embodiment, Gobble user A sends, e.g., an SMS or email, to Gobble user B a notification of a Legion Buying Splash™ event in New York City. In an embodiment of the present invention, users do not waste time communicating with few partners in order to launch an event—instead, the GI can handle this with the public at large based on other Gobble users' requests and preferences. in addition, a Gobble user can launch or join an existing event. The notification on the app like on Facebook and or Twitter which is connected to a mobile phone and or email can be a simple text message, in which case if Gobble user B wants to join, Gobble user B needs to contact the GI to parse Gobble user A events or events in New York City. The notification can be a link to the Legion Buying Splash™ event in New York City, which links to information regarding the event (e.g., time, date, location, number of participants, etc.) and/or links to a web browser that, upon activating, associates a unique Legion Buying Splash™ identifier to the session for the Gobble user B. The notification can be a user interface or a link to a user interface or an SMS or communication method which queries the participation of Gobble user B, e.g., queries "Do you want to join Legion Buying Splash™ eventX at Merchant A in New York City by Gobble user A" for a "yes" or "no" response which then effects a generation (if yes) of a link for purchase or information for an in-person purchase, effects a generation (if no) of a response (e.g., "Thank you. Maybe next time.") to Gobble user B, and/or effects a generation of notification to Gobble user A and/or Merchant A of the acceptance/decline of Gobble user B. In an embodiment, purchases can be made in store or online at the specific merchant which may have and allow several of its stores to participate in the Legion Buying Splash™ event. Gobble user B can participate in the event online and make qualifying purchases via the web browser. Or, Gobble user B can then participate in the event online via an app or application on the Gobble user B's networked or WiFi device. Or, Gobble user B can go to the merchant(s) involved in the Legion Buying Splash™ event in New York City, and make a qualifying purchase in person for that event. The in person qualifying purchase can be affected by the merchant who scans or inputs the unique Legion Buying Splash™ identifier at the point of sale.

In an embodiment, GI administrator contacts via email, SMS, online shared database, electronic voice call, or other communication means, various merchants requesting participation in a Legion Buying Splash™ event. Each merchant can decide when to participate in the Legion Buying Splash™ event and notify the GI by setting merchants cashbacks tier type gobbles, days, and stores in various locations. Or, for example, merchants can identify their participation in one or more Legion Buying Splash™ events. Upon receiving one or more merchants' agreed participation, the GI administrator alerts either a subset of Gobble users based on their preferences, lifestyle, gender, geographical location, other, or all Gobble users about the "Black Friday" or other Legion Buying Splash™ event. Each merchant participating is assigned a unique identifier which associates the merchant to the Legion Buying Splash™ event offering. A time period of availability is identified in the database associated with the unique identifier which associates the merchant to the Legion Buying Splash™. For example, Gobble user A receives an SMS about a Legion Buying Splash™ "Black Friday" event. A user can request to the GI for a specific type of merchant or store or service or items when researching where to launch or find a Legion Buying Splash™ event in a city/state/country. Gobble user A activates the received link in the SMS to obtain information about the Legion Buying Splash™ event. Gobble user A is informed that the Legion Buying Splash™ event is valid for purchases of X at a 20% discount at merchant A for the following 72 hours. If Gobble user A makes a qualifying purchase of X at merchant A during that 72 hours, then that Gobble user A's purchase qualifies for the 20% discount.

In an embodiment, each Gobble has a specific cashback based on the attendance of the Legion Buying Splash™ event, which will be notified within 24 hours after expiration. In an embodiment, a Legion Buying Splash™ can be set to last whatever time period, e.g., 72 hours. For example, with 10 attendees, maybe 20% cashbacks are provided. In this same scenario, 1000 attendees can provide 57% cashback to the Gobble user. Upon notification to user of the amount of attendees, the user is notified by GobblinQ™ of the cashback amount paid to the user. The amount of attendees will be available live on the app for user review at any time. The terms of the Gobbles to be issued upon a purchase in such an event, and percentages of cashbacks payable will be provided to the user before joining or launching such an event. In an embodiment, Gobble user A's purchase also effects the release of a specific number of Gobbles (Tier 1, 2, and/or 3). In an embodiment, if Gobble user B set up the Legion Buying Splash™ event, Gobble user B can allow for the Legion Buying Splash™ event to be listed on an events listing or searchable (e.g., by other Gobble users) database in the GI. In an embodiment, if Gobble user B set up the Legion Buying Splash™ event, then for each qualifying purchase by a Gobble user, Gobble user B get points, credits, increasing discount and/or cashback.

Figure 14:
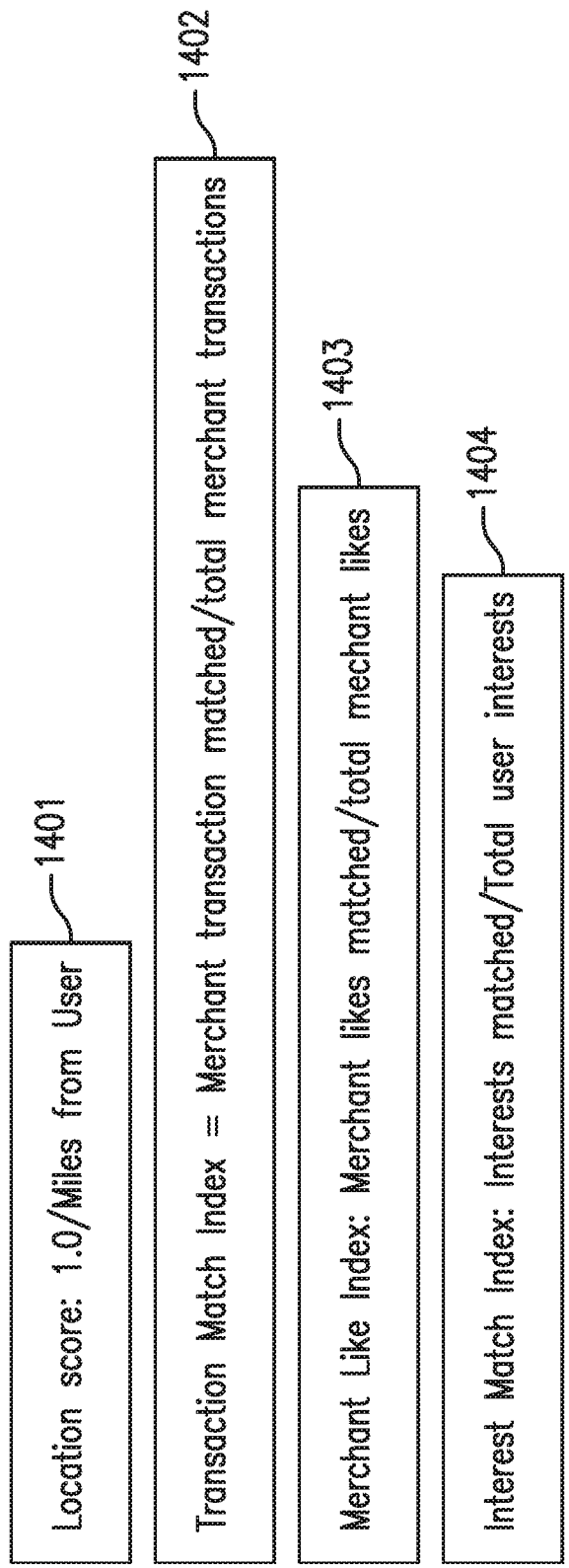
FIG. 14 illustrates an embodiment of the present invention.

FIG. 14 shows different calculations for the system. A location score can be determined by dividing 1 by the distance of the user, for example, by the number of miles or kilometers, from a user, as shown in box 1401. Box 1402 describes a transaction match index, which can be calculated by dividing a number of merchant transactions matched by the total number of merchant transactions. Box 1403 describes a merchant like index, which can be calculated by dividing a number of merchant likes matched by the total number of merchant likes. Box 1404 describes an interest match index, which can be calculated by dividing the interests matched by the total user interests.

Figure 15:
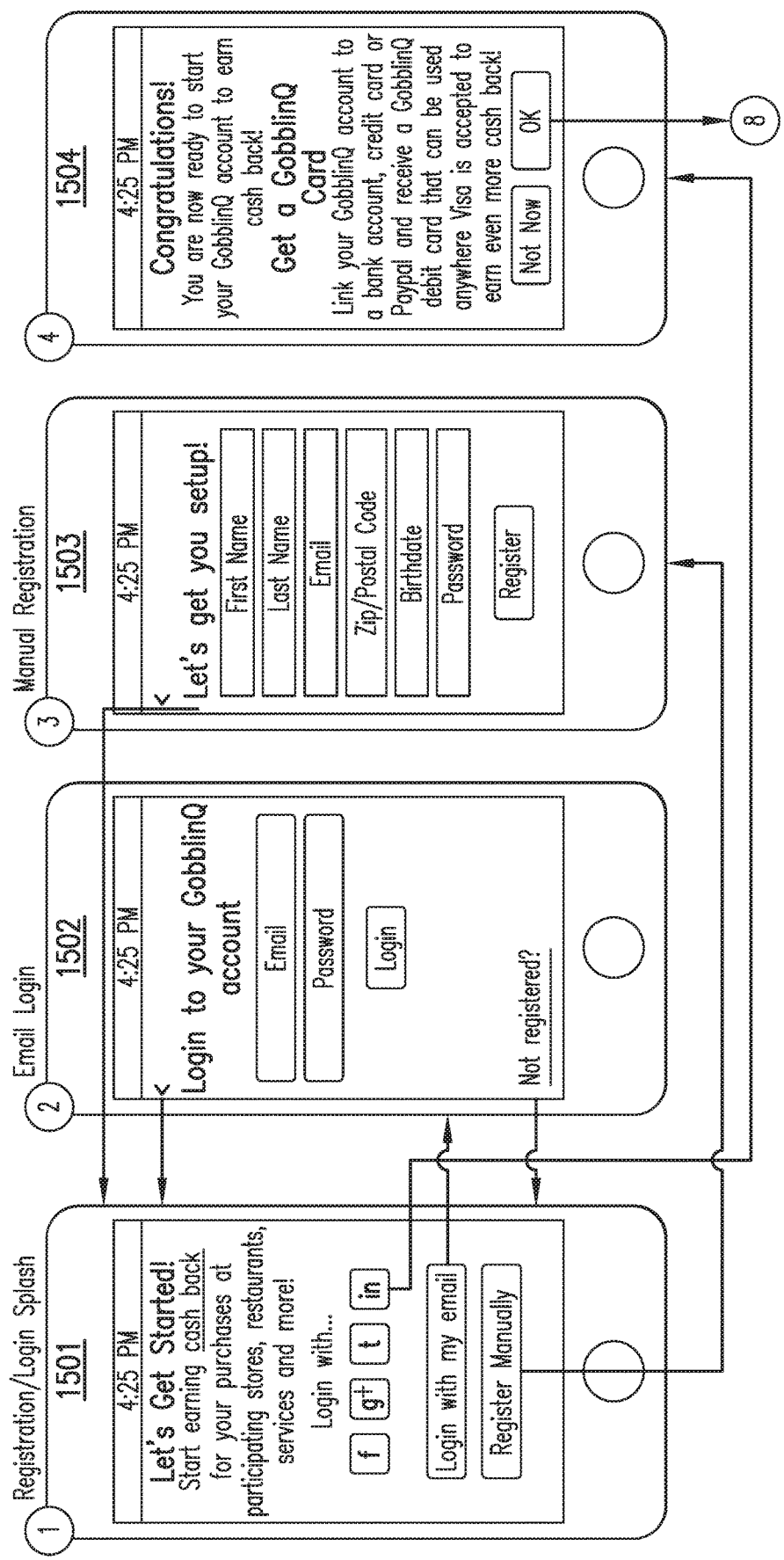
FIG. 15 illustrates an embodiment of the present invention.

FIG. 15 shows an embodiment of a user interface which can be used on a mobile device, such as a mobile telephone, tablet, or mobile computer. Box 1501 shows an initial screen for a user to begin interaction with the system. A user can log in using pre-existing credentials from other social media accounts, for example, Facebook, Google, twitter, and LinkedIn. A user can log in using an existing email account the user has registered. A user can register for a new account. The system can be accessed via online and via mobile (e.g., smartphone).

A user may log in using their pre-registered email account and password. The user mobile device displays screen 1502, which allows the user to enter their log in information. The user enters their pre-registered email address and password. If the user has not pre-registered, the user can select a 'not registered?' option, which returns to display 1501. Display 1502 can also include an arrow key which allows the user to return to display 1501.

When a user selects to register manually, the display shown in 1503 is displayed on the user mobile device. The user can enter in their personal information, including but not limited to a first name, last name, email address, zip code and/or postal code, birth date, and password. When the personal information is entered, the user can select to register an account with GobblinQ. After registering, the screen returns to display 1501, which the user can then log in to their GobblinQ account described above.

When a user selects to log in using a pre-existing social media account, display 1504 is shown on the user mobile device. The display informs the user that a GobblinQ account has been created, and the user can begin using their account to earn cash back. The user can select to enter payment information to link the GobblinQ account. When the payment information is entered, the user can receive a GobblinQ debit card and/or credit card to earn more credit.

Figure 16:
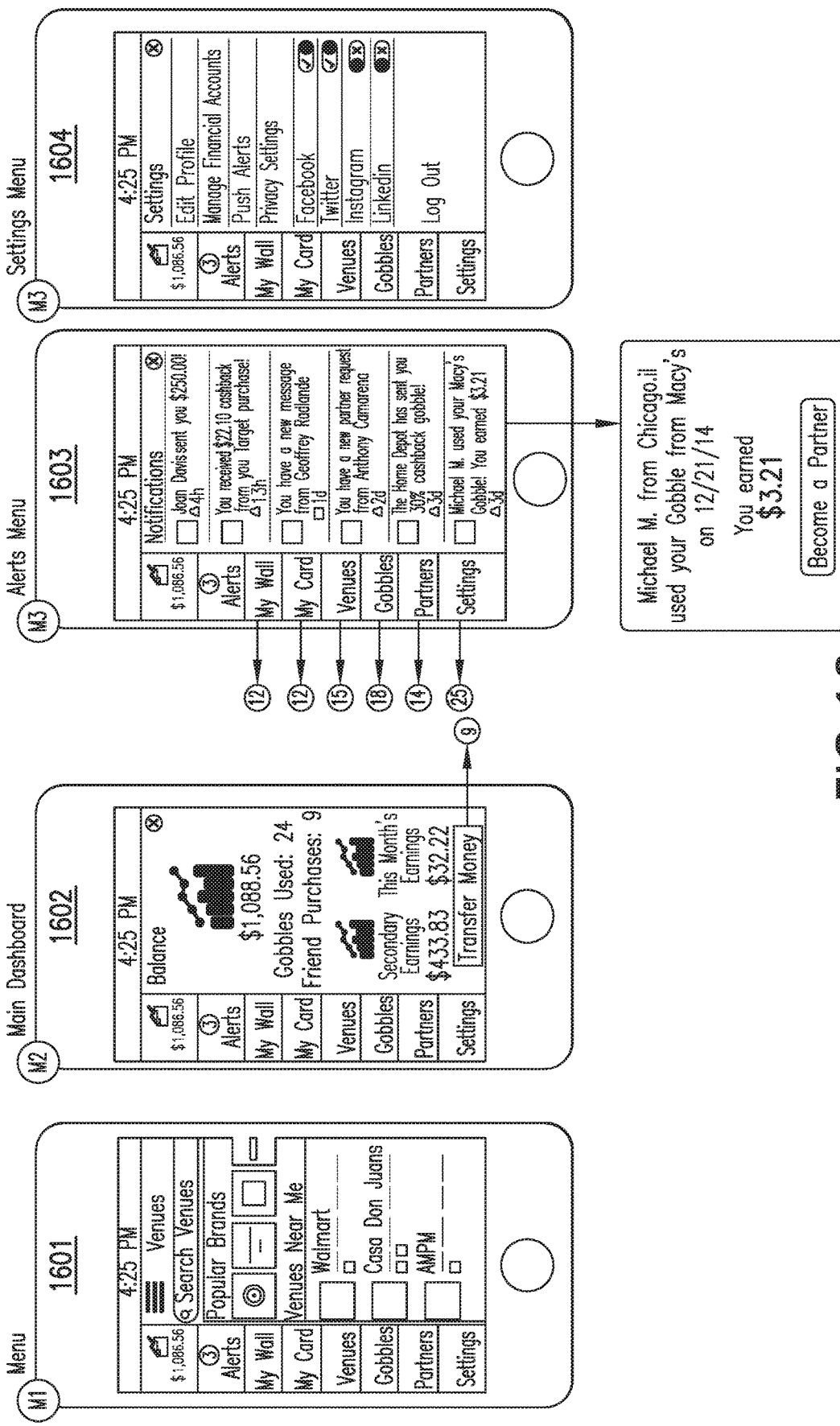
FIG. 16 illustrates an embodiment of the present invention.

FIG. 16 shows display 1601, which shows the menu screen of GobblinQ account. For example, the display can include a search bar, to allow users to search for a particular venue. The display can include popular brands and/or venues in use. The display can include venues determined to be nearby the user mobile device by GPS information on the mobile device. The display can include tabs for viewing user account information. User account information can include balance information, alerts and/or notifications to new savings and deals, payment information, venue information, Gobbles deals and information, partners and/or suggested users to connect with, and user settings.

Display 1602 shows a user balance information. Balance information can include total expenditures, the number of Gobbles deals used, the number of friends who have made purchases from received Gobbles deals, secondary earnings, and monthly earnings. The user can select to transfer earnings.

Display 1603 shows alerts and/or notifications for deals. The user can receive notifications when other users connected to the user sends or transfers money. The user can receive notifications of cash back received from purchases made at a venue. The user can receive notifications of messages from other connected users. Other connected users are additional users who the user has connected to in their account. The user can decide which other users to connect to, and remain unconnected to. The user can receive notifications of connection requests from other users. The user can receive notifications of offers from venues. The user can receive notifications when other connected users use an offer.

The notifications can be displayed in list form with basic information about the notification. The user can select a notification to display a screen including all of the information. For example, the list can display a notification that a user receives a message from another user. When the user selects that notification, the display can show the message from the user, allowing the user to send a message in response.

Display 1604 shows settings for the user account. The user can edit their profile information. The user can manage their financial account information. The user can select the settings receive notifications. The user can edit privacy settings. The user can select other social media accounts to interact with. The user can also log out.

In an embodiment, the GobblinQ™ account can be linked to a credit card of a Gobble user and/or checking account. In an embodiment, information from a GobblinQ™ system Gobble user account can be transferred to and from the Gobble user's checking and/or credit card account. In an embodiment, information and/or money can be transferred electronically between a Gobble user to a Gobble user GobblinQ™ account via a mobile text and/or via email and/or via the software app.

Figure 17:
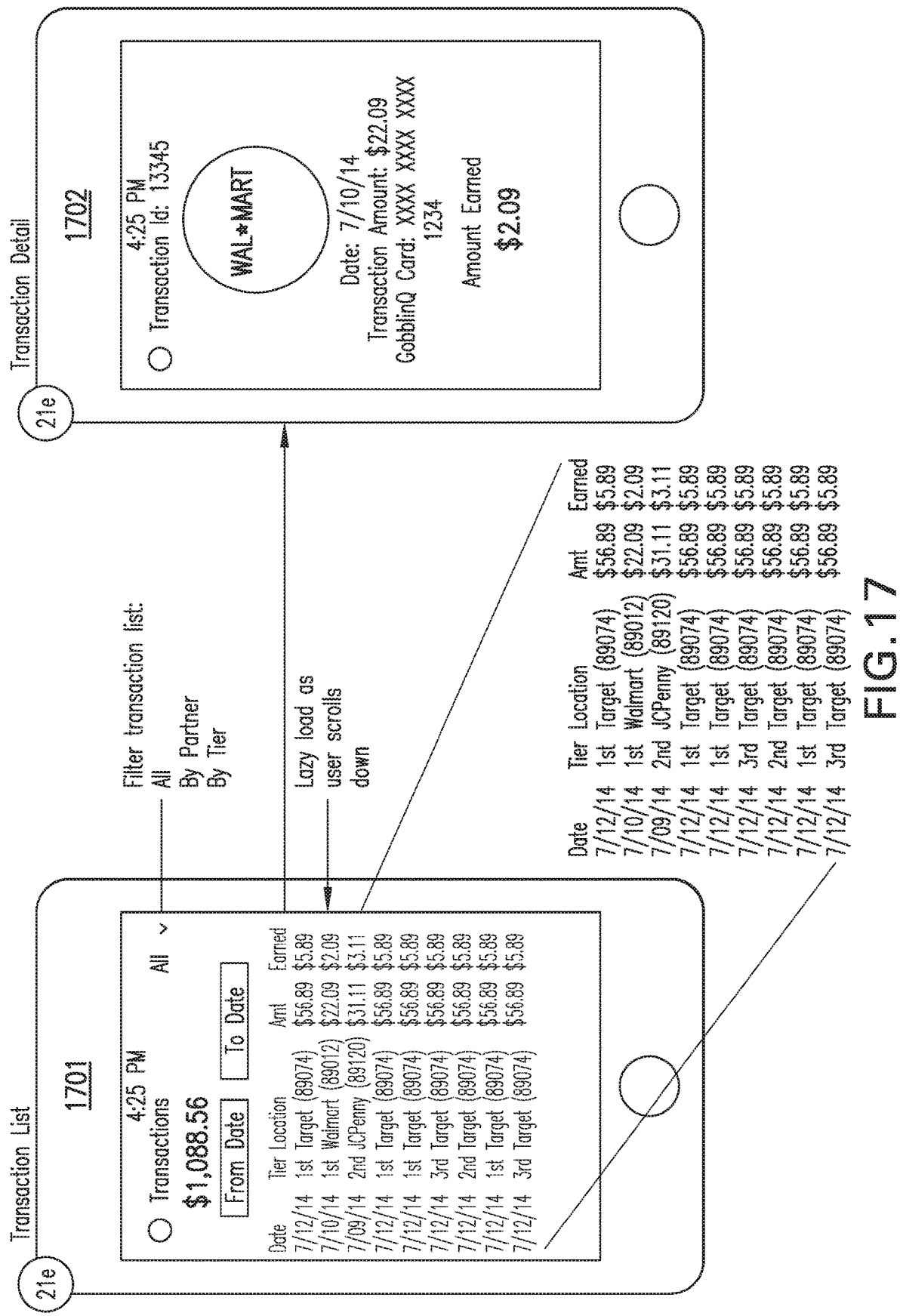
FIG. 17 illustrates an embodiment of the present invention.

FIG. 17 shows a transactions display on a user mobile device. The transactions display 1701 can include the date of the transaction, an identification number associated with the transaction, a tier category of the transaction, the location of the transaction, the amount of the transaction, and earned amount to the user of the transaction. This information can be displayed in list form, and the user can scroll through the list for an overview of the transactions. A user can select a date range on display 1701, to show only transactions for selected dates. The transactions list can be filtered and/or sorted by selected categories on display 1701. For example, these categories can include showing all transactions, showing transactions by partner, and by tier category. A user can select a transaction on the list of transactions. Display 1702 shows a detail view of the selected transaction. For example, the selected transaction can display graphic or text information of the venue where the transaction occurred. The display can include the date of the transaction, the transaction amount, the associated account number (for example, the GobblinQ Card number), and any amount earned for the user from the transaction. The account information can be shown securely, so that only end card information is visible. The user can select to return to display 1701 to view additional transactions.

Figure 18:
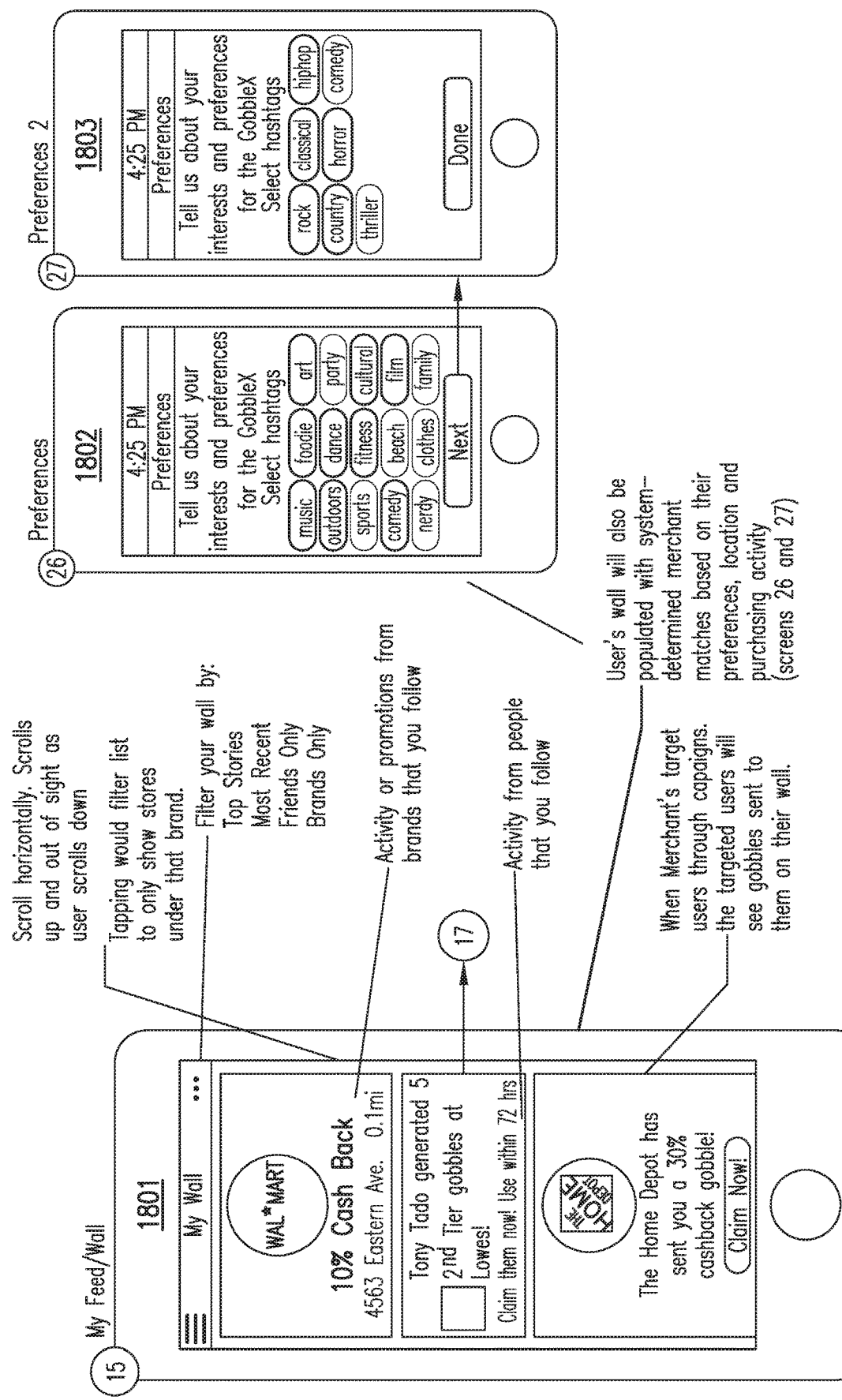
FIG. 18 illustrates an embodiment of the present invention.

FIG. 18 shows a wall display on a mobile user device. Display 1801 shows wall information, which can include activity and/or promotions of venues. A user can select venues of interest, so that only those venues show information on the wall display. The wall display can show activity of other connected users. The wall display can show that when a merchant and/or venue targets users for campaigns or promotions, the targeted user will receive the offer on their wall. The user can scroll through the wall display to view the information. The wall display can be sorted and/or filtered. Filtering can include, but is not limited to, top stories, most recent, friends only, brands only. Filtering shows only the selected categories. For example, if a user selected friends only, the user will only see information of other connected users.

A wall display can be also be populated with system-determined merchant matched based on selected preferences, locations, and purchasing activity. Display 1802 allows a user to select preferences and interests. For example, hashtags can include music, foodie, art, outdoors, dance, party, sports, cultural, comedy, beauty, film, clothes, and family. The hashtags can extend beyond display 1802, which includes a button to allow the user to select a 'next' display 1803. Display 1803 can include additional hashtag options. Display 1803 can include more detailed hashtag information. For example, if a user selects 'music' in display 1802, display 1803 can show genres of music, including rock, classical, hiphop, and country. Additional displays can be shown to accommodate the hashtags of interest to a user.

Figure 19:
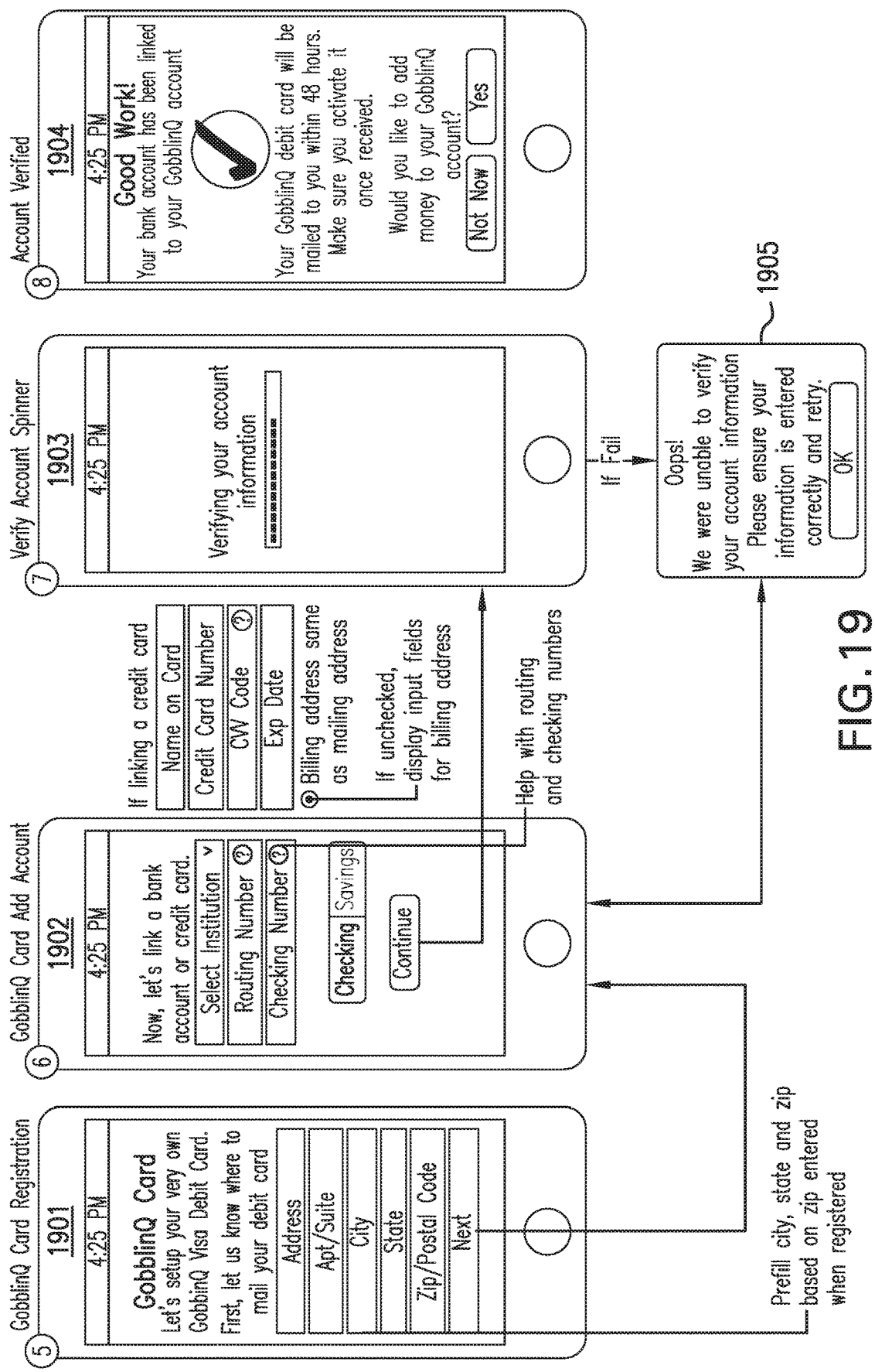
FIG. 19 illustrates an embodiment of the present invention.

As described above, a user can enter payment information, or GobblinQ debit card. In FIG. 19, display 1901 shows user information to mail the debit card, including a user's address, apartment/suite, city, state, zip/postal code. The city, state, and zip/postal code can be pre-filled based on the user's entered zip/postal code information at the time of registering the GobblinQ account. The user can select a next button.

Display 1902 is shown on the user mobile device, so that a user can link existing bank and/or credit card account information to the GobblinQ account. The user can select the bank and/or credit card institution from a drop down menu. The user can enter bank routing information and bank checking account information if linking to a bank checking account. If a user does not having routing and/or checking account information, a help option can be displayed with a question mark. The user can select the help option to receive help with routing and checking numbers. A bank savings account could also be used. A user can return to display 1901 by selecting an arrow button on display 1902.

A user can select to enter a credit card. A user will enter the name of the person on the credit card, credit card number, security CVV code, and expiration date. The user can select that the billing address is the same as the previously entered mailing address. The user can also manually enter different billing address information. A help option displayed as a question mark can help users find the security CVV code on their credit card.

When the information is entered for banking and/or credit card of the user, the user can select the continue button. The system then verifies payment information by connecting to a remote database or server. Display 1903 shows verification of account information. If a user has entered incorrect and/or incomplete information, an error message can be displayed. The error message can state that "we were unable to verify your account information. Please ensure your information is entered correctly and retry." The user is returned to display 1902 to reenter information.

When the account information is successfully verified, display 1904 is shown. Display 1904 confirms that the user GobblinQ account is linked to the entered payment account information. The user can also be informed that a GobblinQ debit card will be mailed out in a specified time period (e.g., 48 hours). The user can be informed to activate the card when received. When verification is successful, the user can then add money to their GobblinQ account.

Figure 20:
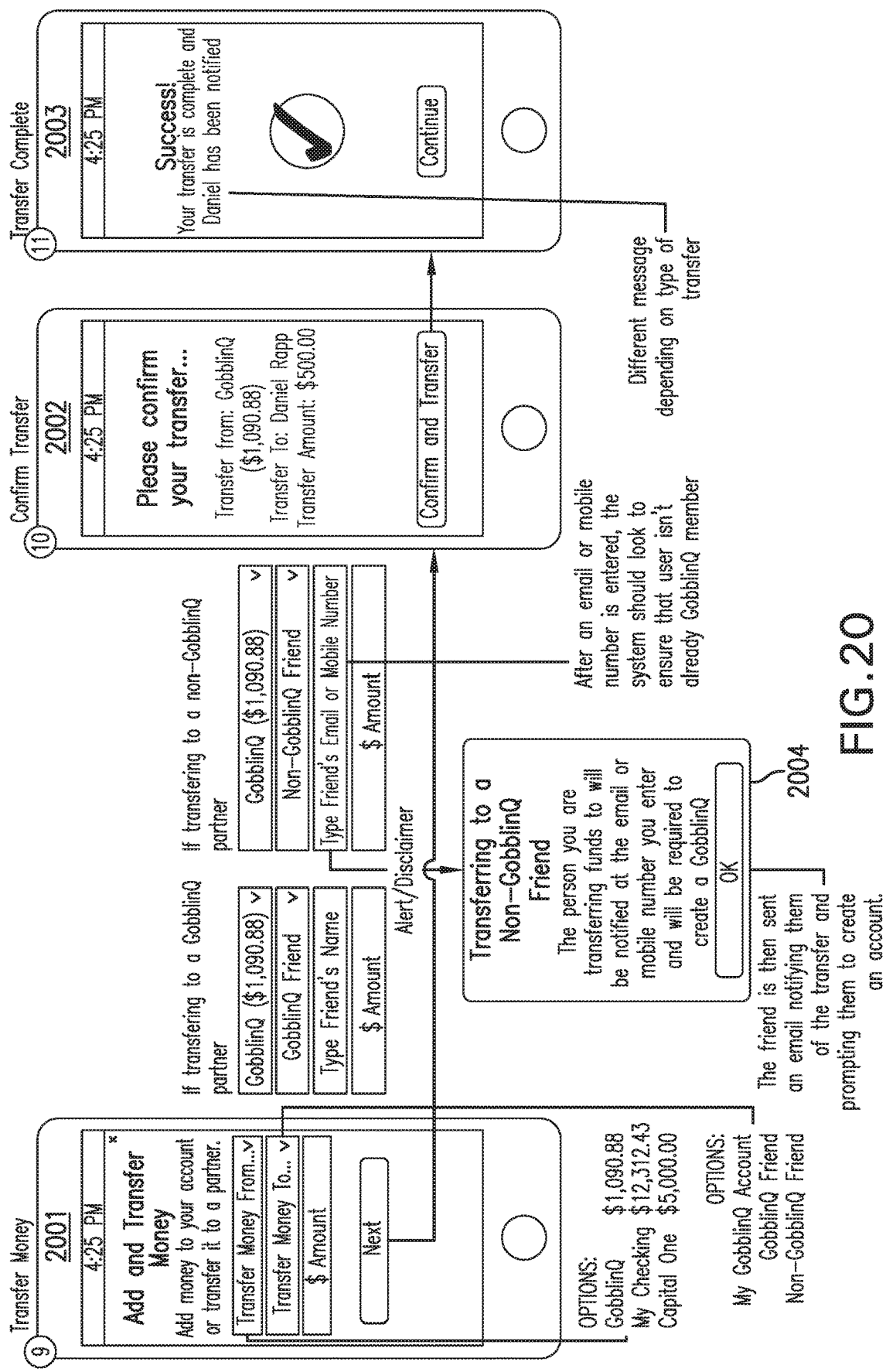
FIG. 20 illustrates an embodiment of the present invention.

FIG. 20 shows how a user can add monetary value to their account. When selecting "yes" from display 1904, display 2001 shows an option for the user to add and/or transfer money to a GobblinQ account. For example, money can be transferred from the user GobblinQ account, a user bank checking account, and/or a credit card account. Money can be transferred to a user GobblinQ account, a user GobblinQ friend (for example, another connected user), or a non-GobblinQ friend (for example, a non-connected user).

If the user transfers money to another connected user, e.g., a GobblinQ friend/partner, the user can select to transfer money from the user GobblinQ account to a GobblinQ friend. When the user selects this option, a box can be displayed to allow the user to type in the friend name. The user can also enter in the amount to be transferred. The friend can receive a notification that monetary value has been transferred to their account.

If the user transfers money to a non-GobblinQ user, a box can be displayed to allow the user to type in the email address and/or mobile telephone number of the person. The system can determine whether the email address/telephone number is associated with an existing GobblinQ user. The user can also enter in the amount to be transferred. When a user selects this option, an alert or confirmation box can be displayed in display 2004 to inform the user that transferring of funds to a non-GobblinQ user will result in a notification sent to the email address/telephone number. The notification can include that requires the non-GobblinQ user to create a GobblinQ account to receive the transfer of funds.

When the user enters in the transfer information, display 2002 shows a confirmation of the transfer. The information shown can include the account to be transferred from, the account to transfer to, and the monetary amount to transfer. The user can confirm the transfer. The user can also cancel out of the transfer.

When the user confirms the transfer, display 2003 confirms that the transfer was successful, and a notification to the other user has been sent.

Figure 21:
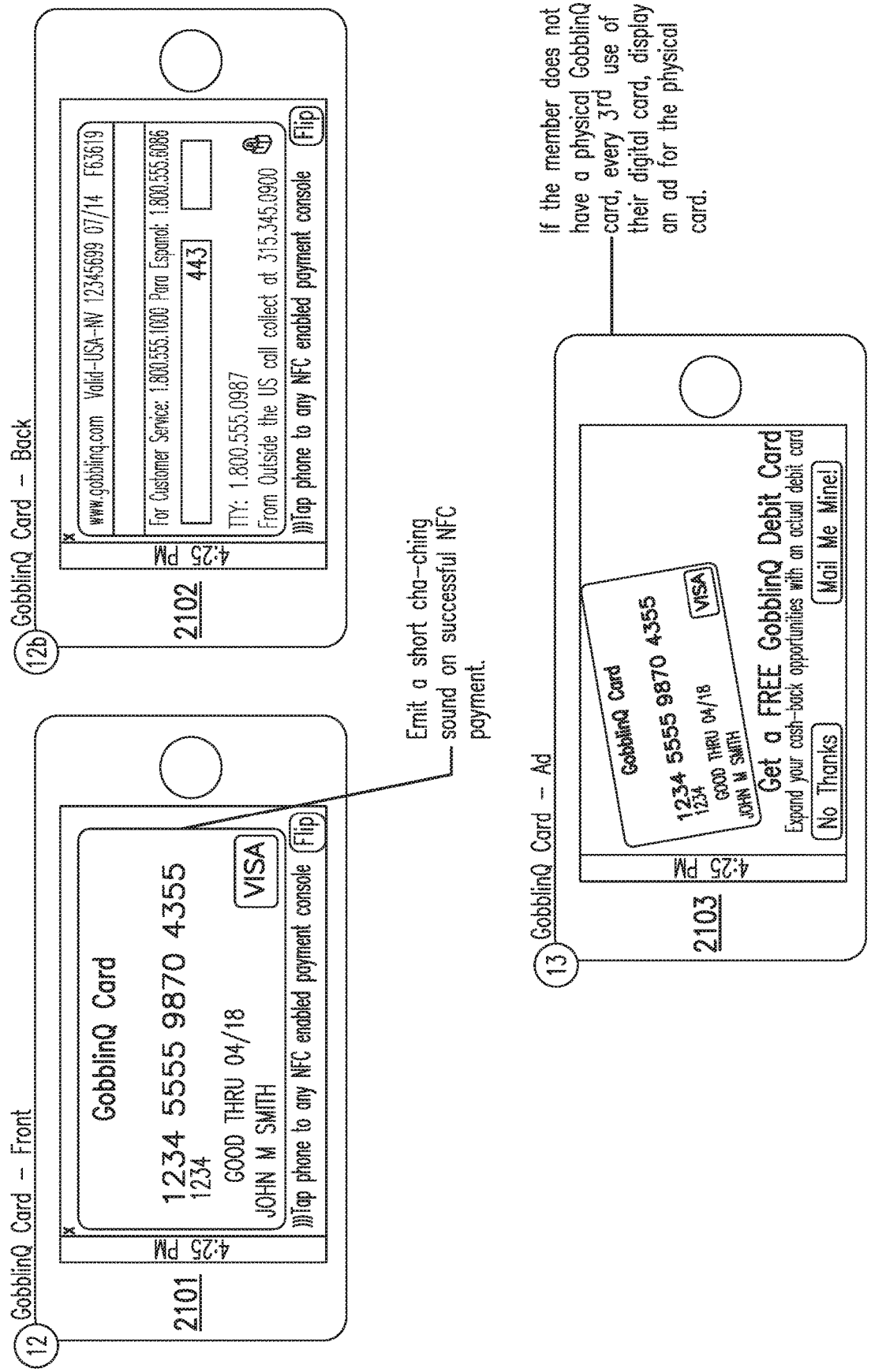
FIG. 21 illustrates an embodiment of the present invention.

FIG. 21 shows display screens including payment account information. Display 2101 can show a front of a credit card, which includes the name on the credit card, the credit card type, the expiration date, and the credit card number. The user can flip the card to display 2102, which shows the back of the credit card, which can include the security CVV code. The card can be used from the display 2101, 2102, for payment at venues by electronically transferring payment information to NFC enabled payment consoles. When payment is successful, an audio and/or visual confirmation can be displayed. For example, a cash register sound can be emitted when payment is successfully received electronically.

Display 2103 can show an advertisement for a GobblinQ debit card. A user can select to receive a debit card, which can be linked to additional offers. If a user does not have a GobblinQ debit card, an advertisement to receive a card can be displayed after a pre-set number of purchases using the digital card display 2101, 2102. For example, display 2103 can be shown to a user after every third purchase using stored user payment information.

Figure 22:
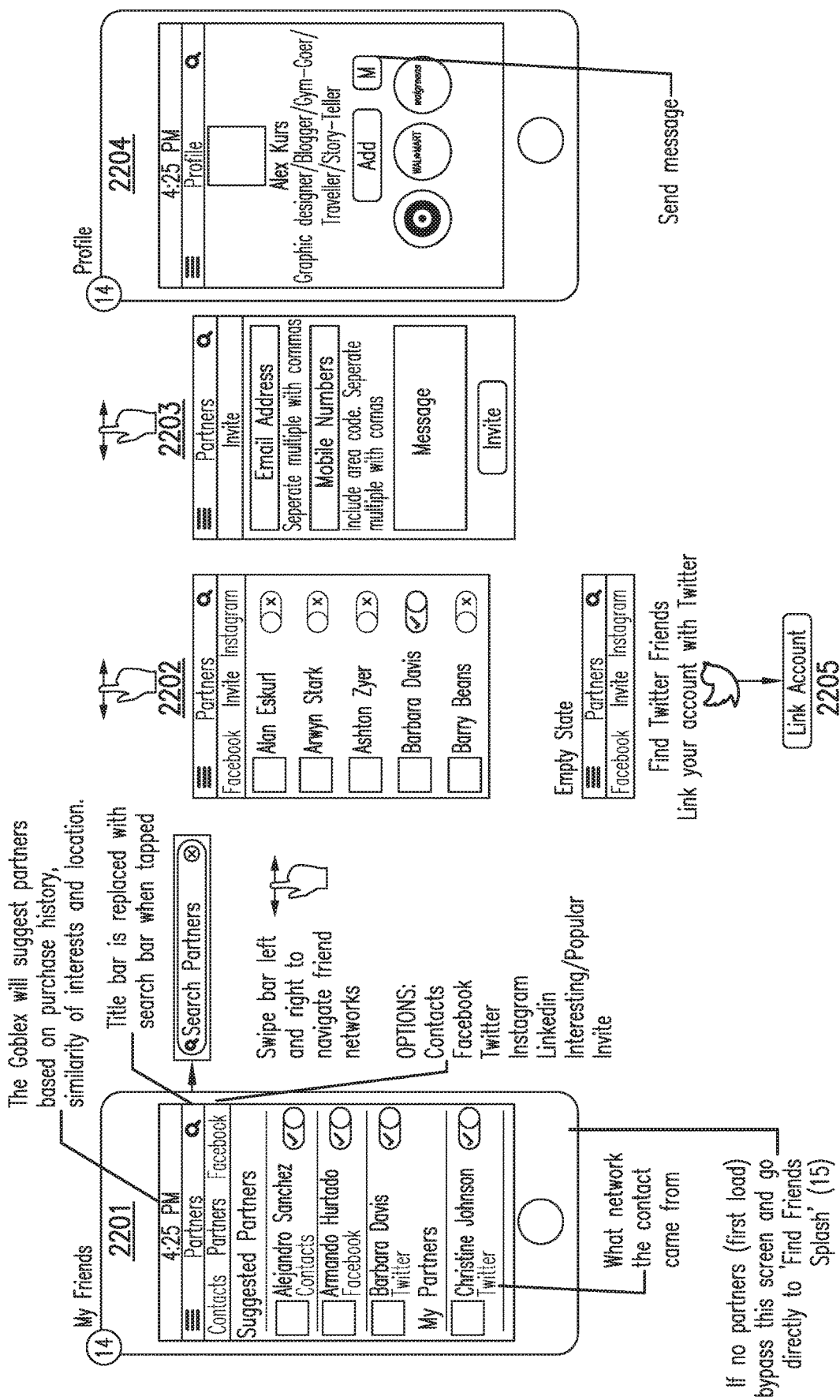
FIG. 22 illustrates an embodiment of the present invention.
Figure 23:
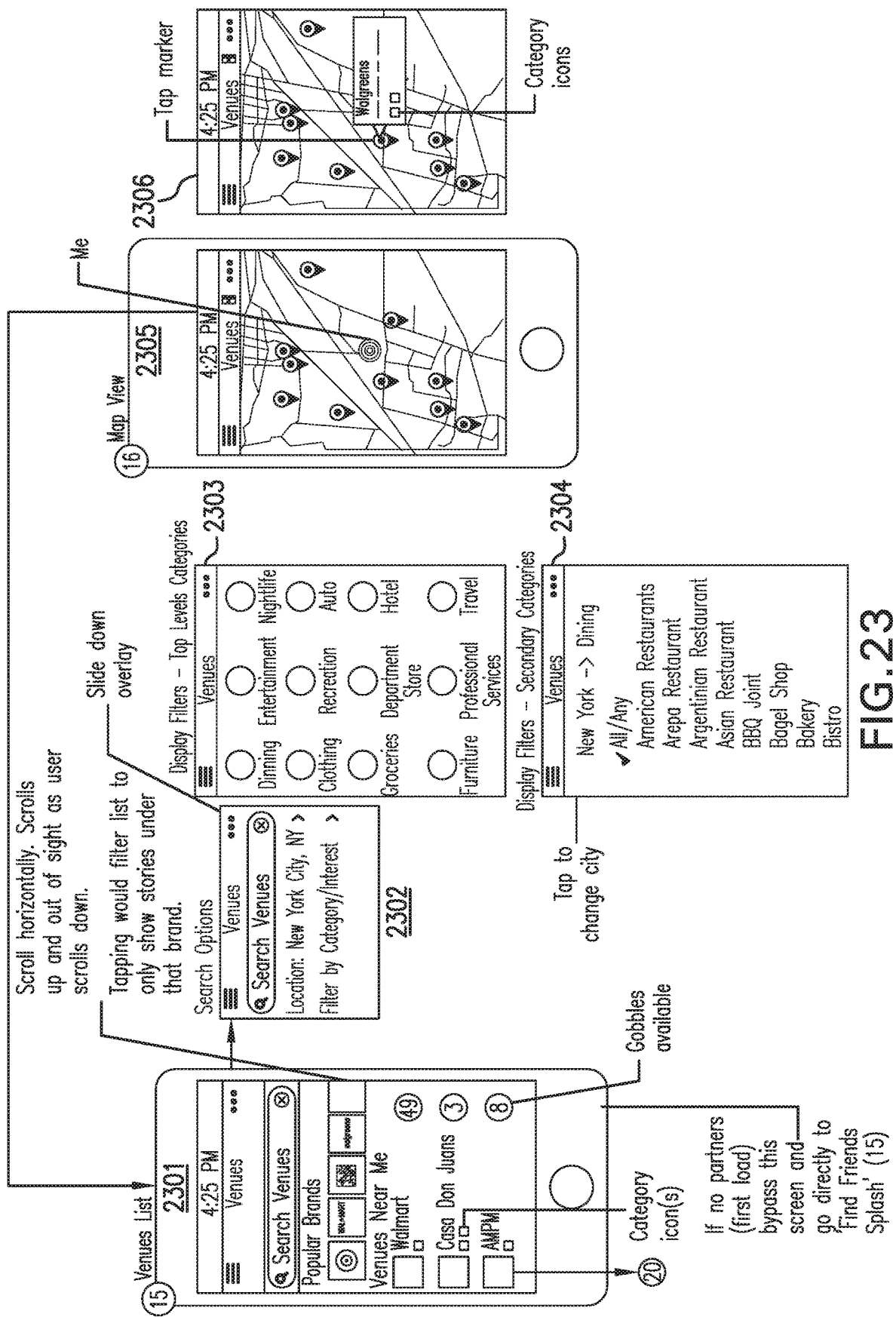
FIG. 23 illustrates an embodiment of the present invention.

As described above, the menu can include a partners tab, to connect with other users. FIG. 22 shows a partners list of the user, of other connected users. The user will receive notifications of these other connected users. The list of display 2201 can also show suggested partners. Suggested partners can be people who the user can be connected with on other social media accounts, such as Facebook, so that they can also connect. The list of connected partners can also show through which other social media account they connected from. For example, a user can be connected with another user on twitter. When the users are connected on GobblinQ, the connection can indicate that contact initiated via twitter. The GobbleX can also suggest partners based on purchase history, similarity of interests, and location.

Display 2201 can also include a title bar so that the user can visually see the partners information. A search bar can be minimized and shown with a graphic. If the user selects the graphic, the search bar can be expanded to replace the title bar.

Partners can be sorted by social media connections, including mobile device contacts, Facebook, twitter, Instagram, and LinkedIn. Suggested partners can be sorted by interesting and/or popular, and invite. For example, a user can swipe the screen of the user mobile device left to right, to shift the display 2201 to show partners from the different social media accounts. For example, display 2202 shows connections with a user twitter account. The user can decide which users to connect with by selecting a switch button next to the user name. For example, "Barbara Davis" is connected with the user, but "Barry Beans" is not. If a user has not connected other social media accounts, display 2205 gives the user the option to link their account.

Display 2203 shows an invite, to allow a user to enter in email address and/or telephone number information to another, inviting to connect with them. The user can also type in a personalized message to be sent with the invitation.

A user can also view another user's profile information before requesting to connect. Display 2204 shows another user profile. The user profile can include a graphic selected by the user. The user profile can include the user name, personal information, interests, and favorite venues. The user viewing the profile can request to connect by selecting an "add" button. The user can also select to send a private message to the other user by selecting an "M" or message button. The user can then type a personalized message to the other user. The other user will receive notification of the personalized message.

As described above, the menu can include a venues tab, to connect with retail/merchant and/or commercial venues. Display 2301 can include a search bar so that a user can type in a selected venue to connect. Display 2301 can include a list of popular venues and/or brands. This can be displayed in list form, and/or graphic form. The list of popular venues and/or brands can be scrolled through by a user left to right. A user can select a popular venue and/or brand, which displays only stores under that brand. Display 2301 can also include venues which are geographically within a specified distance. This can be determined by GPS on a user mobile device with pre-existing venue location information. The user can scroll vertically to view the nearby venues on the user mobile device. The displayed venues can include a number of Gobbles available, which are deals and/or promotions available to the user. The displayed venues can include category icons. Categories can include dining, entertaining, clothing groceries, furniture, recreation, department store, professional services, nightlife, auto, hotel, and travel.

Display 2302 shows how a user can select types of venues and/or brands to view. Display 2302 shows a city/state location based on the user mobile device GPS information. City/state information can be changed by entering in another city/state. Display 2302 shows a filtering button to select one or more categories of venues. When the user selects the filtering button, display 2303 shows top level categories. As described above, the user can select these categories, which are shown via icons on the venues and/or brands on display 2301. A user can select a category, for example, dining. When the category is selected, display 2304 can show secondary categories, for example, additional dining options. For example, the user can select one or more types of restaurants in the selected city/state. The city/state can also be changed by selection on display 2304.

Display 2301 can also include a graphic which when selected, displays a map. Display 2305 is a map view of venues/brands nearby, based on the GPS location of the user mobile device. Nearby venues/brands are displayed on the map with markers. A location of the user mobile device can be displayed with a marker different then the venue marker(s). Display 2306 shows a selected venue marker. A venue marker can be selected to show a pop-up box displaying the venue name, address, distance from the user, and category icons.

Figure 24:
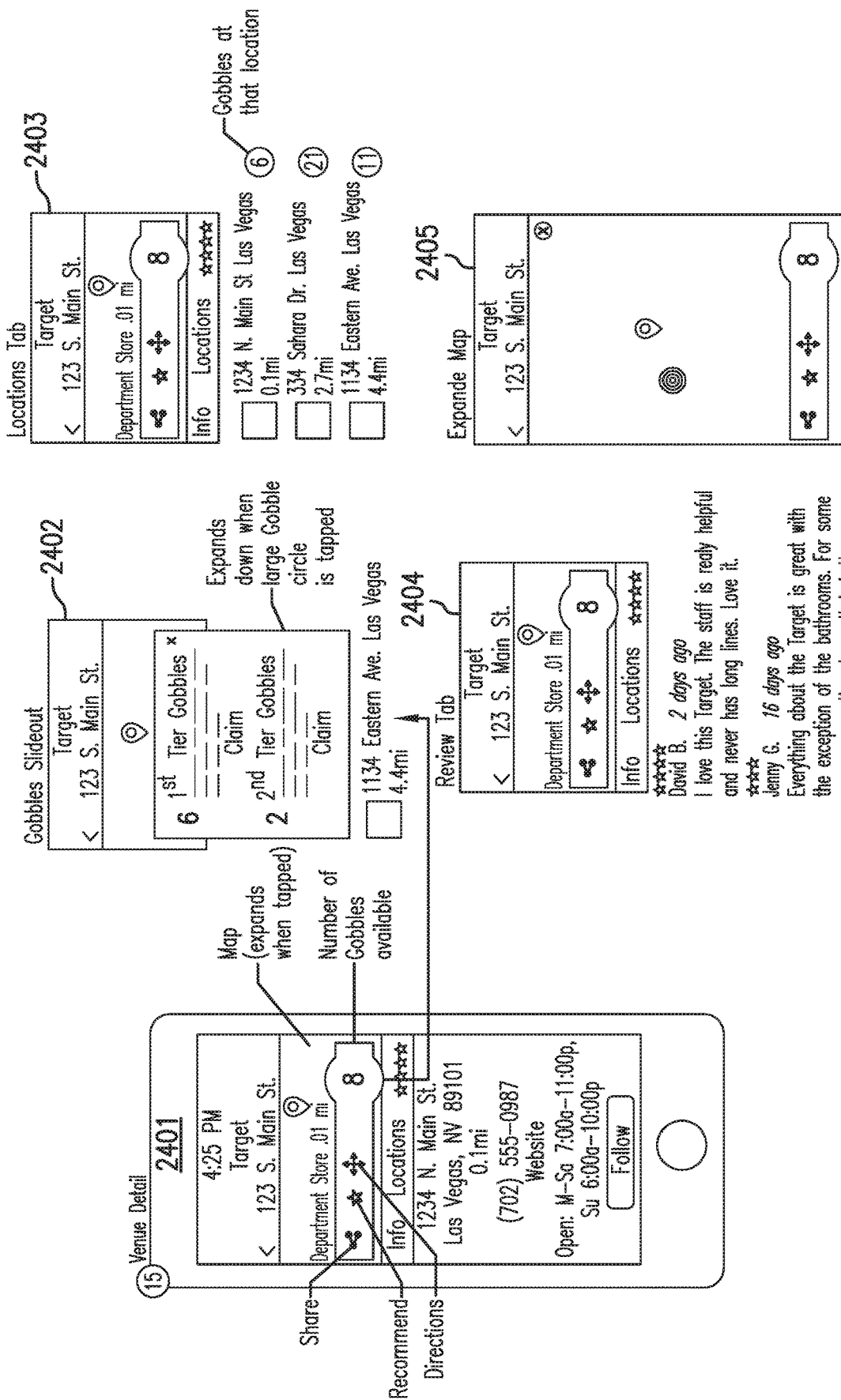
FIG. 24 illustrates an embodiment of the present invention.
Figure 25:
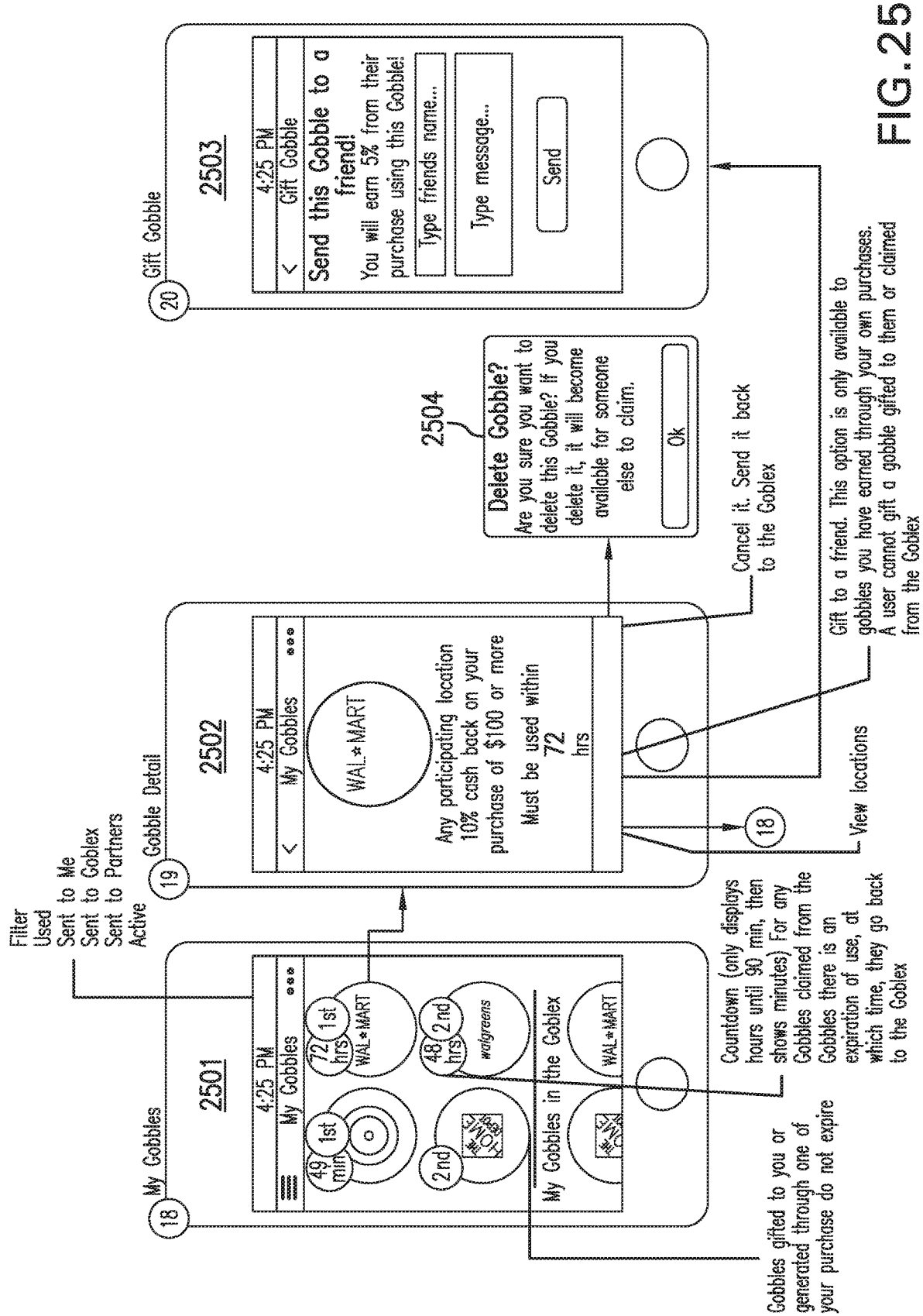
FIG. 25 illustrates an embodiment of the present invention.

FIG. 24 shows detail venue information. For example, display 2401 includes a selected venue, the name and address at the top of the display. The address, phone number, website, opening hours, and additional information can be displayed as well. A user can select to follow the venue, which would allow notifications of the venue to be displayed on a user wall. The location on a map can also be provided, along with a distance from a user mobile device based on the user mobile device GPS location system. The map can be shown partially, and expandable upon selection, as shown in display 2405. Additional information of the venue can be displayed, including an option to share the venue with other users. A user may also recommend the selected venue, by selecting a 'recommend' button, which can be shown by a graphic icon. A user can also receive detailed directions to the venue from the current location as determined by the user mobile device GPS location. When a user selects to receive directions, GobblinQ can interface with the user mobile device existing map applications to show step by step directions.

Display 2401 also includes a number of Gobbles of the venue. When a user selects the number displayed, display 2402 shows details of the Gobbles offers. Gobbles offers can categorized into one or more tiers. For example, a first tier Gobbles includes a discount and/or offer to a user. For example, a user can receive a percentage of the purchase amount back as award. The cash back can be added to the user GobblinQ account. The Gobbles offer can include a time limit in which the offer must be redeemed. A user can claim the Gobbles offer by selecting the offer.

A user can also view additional Gobbles offers from the same brand at a different venue. For example, display 2402 shows expanded Gobbles offers for a first store location. A user can switch from display 2401 to display 2402/2403 by swiping left and right, so the selected screen title is underlined. For example, display 2401 shows that "info" is underlined, whereas display 2403 shows that "locations" is underlined. A user can select a second store location, which may include the same or different Gobbles offers from the first store location. When a user selects a store location, the Gobbles offers for the selected store location are shown. Display 2403 shows, for example, multiple store locations for the same venue, each having Gobbles offers.

A user can also display user reviews of venues, as shown in display 2404. A user can switch between displays 2401, 2402/2403, and 2404 by swiping left and right, so the selected screen title is underlined. For example, display 2404 shows that the star graphic, indicating user reviews, is underlined. Display 2404 shows user reviews with a star rating system. Users can also include personalized review information. The date of the review is also displayed. The reviews can be shown fully and/or partially. A user can view additional review information by selecting a review.

Display 2401 can be shown, for example, when a user selects a notification of a Gobbles offer. The notification can be displayed on the user wall.

As described above, the menu can include a Gobbles tab. When a user selects the Gobbles tab from display 1604, display 2501 is shown. The Gobbles tab can show a user's Gobbles offers, titled "My Gobbles." For example, Gobbles offers can be shown in graphic form of the venues. The tier category of the Gobbles offer can be displayed on the graphic of the venue. A time limit can also be displayed with the graphic of the venue. For example, a first venue can be shown, indicating that it is a first tier category. A countdown timer can also be shown. The countdown displays in hours until reaching 90 minutes. The countdown timer then shows the countdown in minutes. For any Gobbles claimed from the GobbleX, there is an expiration of use, at which time, they go back to the GobbleX. The GobbleX is a remote server or controller, where the user can receive Gobbles offers from. Offers can be generated by the GobbleX based on agreements with venues and/or brands for targeted users.

A second tier Gobbles offer can be a Gobbles offer gifted to the user from a partner, another connected user. When a partner user claims a Gobbles offer, a second tier Gobbles offer can be generated. The partner user can send the second tier Gobbles offer to the user. A second tier Gobbles offer can also be generated when the user claims a Gobbles offer. In embodiments, second tier Gobbles offers do not have a time limit to be claimed. In embodiments, second tier Gobbles offers received from the GobbleX can include a time limit to be claimed.

When a user selects a Gobbles offer graphic icon in display 2501, display 2502 shows detail information of the selected Gobbles offer. The venue is shown, and any limitations to store locations related to the offer are shown. The Gobbles offer, for example, a percentage of total amount spent, is included in display 2502. A time limit, if one applies to the selected Gobbles offer, is also included in display 2502. A user bar can be included in display 2502. The user bar can include a graphic icon to show locations of the selected Gobbles offer. The user can select the icon to display locations. In an embodiment, the user can select the icon to show the locations on a map.

The user bar can include a graphic icon to gift the selected Gobbles offer to a partner (another connected user). A Gobbles offer can be gifted to a partner when the Gobbles offer was earned through a user purchase. A user can be limited from gifting a Gobbles offer gifted to the user, or claimed from the GobbleX. The user bar can include a graphic icon to delete the selected Gobbles offer. When the user selects the trash icon to delete the selected Gobbles offer, a confirmation box can be displayed. Display 2504 asks the user to confirm that the selected Gobbles offer should be deleted. When the user confirms the deletion of the selected Gobbles offer, the Gobbles offer returns to the GobbleX. The Gobbles offer can now be available for another user to claim.

When a Gobbles offer can be gifted to a partner/friend, display 2503 includes information for the user to enter. For example, the user can provide the partner/friend's name, and include a personalized message. As an incentive, when a user sends a Gobbles offer as a gift, and the partner user claims the Gobbles offer, the user can receive a percentage of the purchase amount back. When the user has entered the partner/friend information, the user can send the gift. The partner/friend user receives a notification of the gift.

Figure 26:
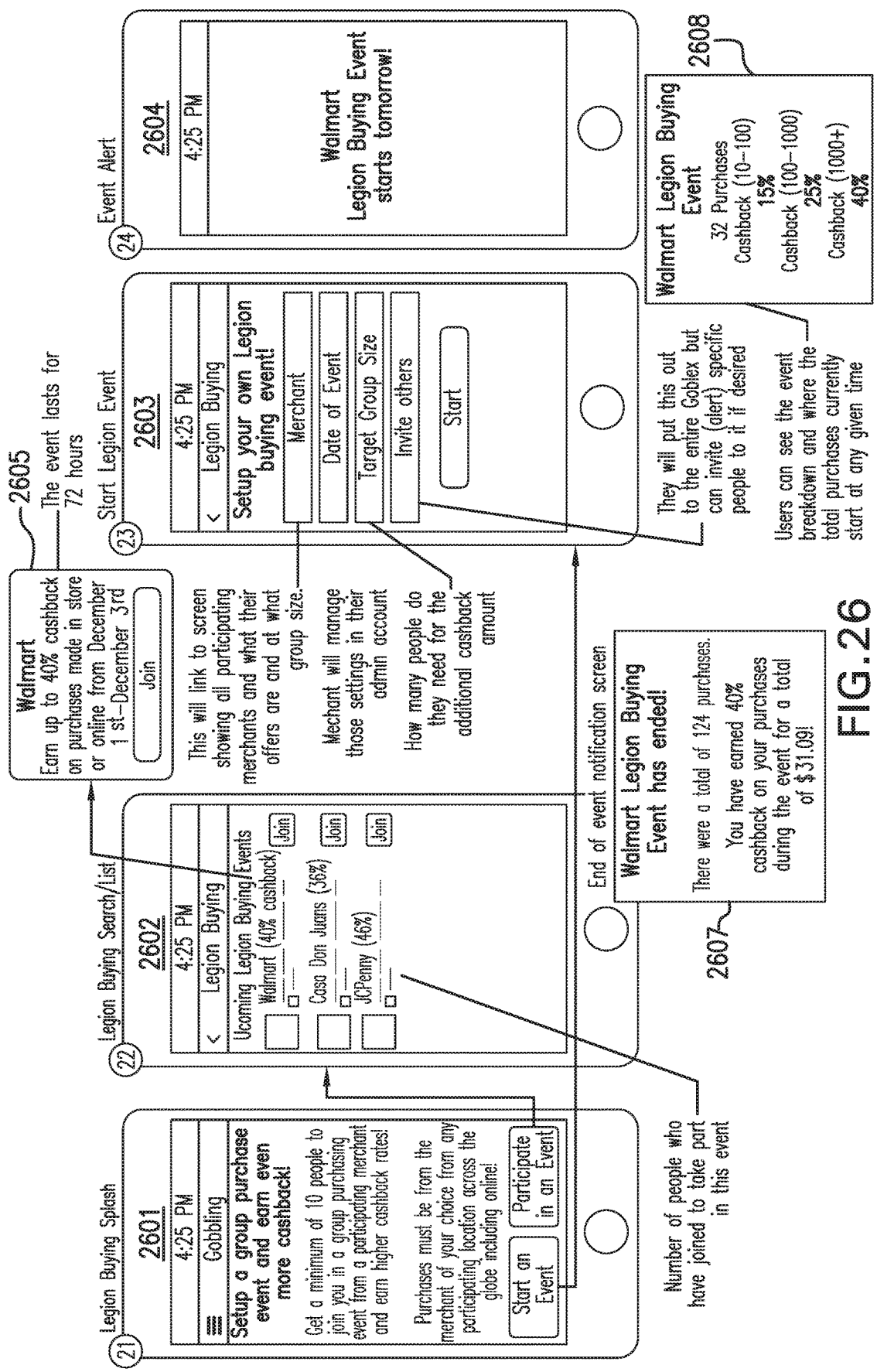
FIG. 26 illustrates an embodiment of the present invention.

FIG. 26 shows an embodiment of Gobbles offers. Display 2601 includes an option for a user to setup group purchases in a group purchase event. A group purchase event can provide cashback bonus offers for the user participants. For example, when a minimum amount of people (e.g., 10) join together in a group for purchases from a participating venue, the percentage received back from the amount purchased can be higher than from an individual Gobbles offer.

For example, when a user selects to participate in an event, display 2602 shows existing group events. For example, a list of venue(s) can be shown, including the percentage back offer, the date range of the event, and the number of people participating in the event. There can be a button to join the group event. When the user selects the group event to join, display 2605 includes the details of the offer. For example, the venue is described, as well as the percentage cashback offer on purchases. Any limitations to the offer can be shown as well. Limitations can also be described on another display. When a group event has ended, display 2607 notifies the user. For example, the display 2607 can include a notification that the group buying event has ended. The display 2607 can include the total number of purchases made by all participants. The display 2607 can include the cashback offer the user received from joining the group. The display 2607 can include the total amount received by the user from the cashback offer.

When a user selects to start an event on display 2601, display 2603 is shown. The user can enter information, including but not limited to merchant/venue information, the date of the event, the target group size, and inviting other users to join the group. For example, merchant/venue information can be linked to a screen showing all participating merchants and what their offers are and any limits to group size. The user can enter the desired date of the event. The target group size can be the number of people needed for the additional cashback offer. Invitations to other users of the created group event can be sent to the GobbleX for all users. Invitations to other users of the created group event can be sent to individual users to alert specified people. When a user receives an invitation, an alert as shown in display 2604 can be received, informing the user of the group event, and the starting date and time of the group event.

At any given time, a user can view additional information of the group event. For example, when a user selects an offer from display 2602, display 2608 can show the name of the event, and the purchases made to date. The cashback offer can also be tiered, so that the percentage received increases with the number of people in the group, and/or the number of purchases made.

Figure 27:
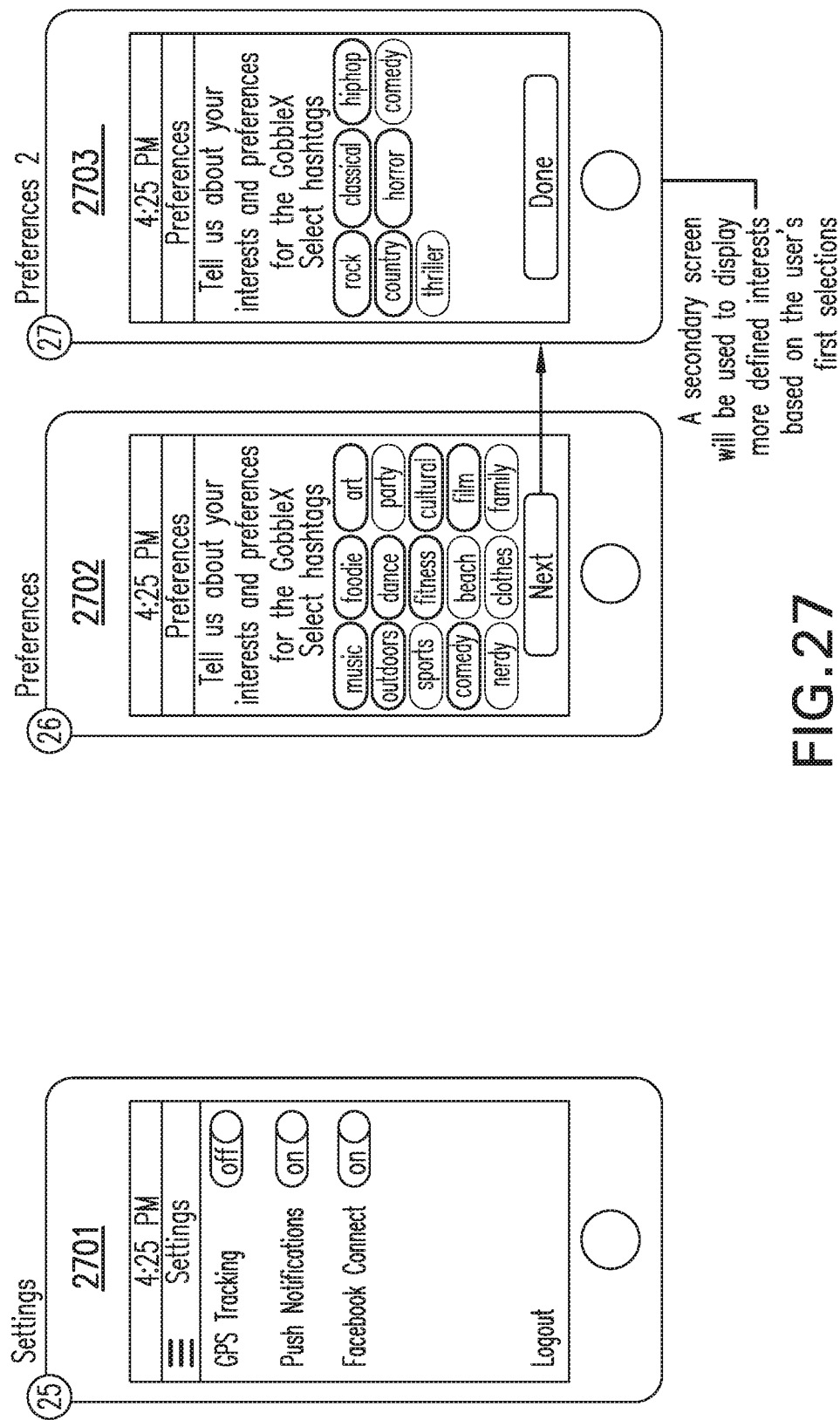
FIG. 27 illustrates an embodiment of the present invention.

As described above in FIG. 16, the display 1604 can show a settings tab for a user. Additionally, display 2701 of FIG. 27 can show settings. For example, a user can decide whether to connect the GobblinQ account to the GPS location on the user mobile device. The user can select to receive push notifications. The user can select to connect to other social media accounts, such as Facebook. If the user is connected to a social media account, the user can select to display information relating to the GobblinQ account.

As described above with respect to FIG. 18, display 2702 shows one or more interests for a user to select. Selecting interests allows the GobbleX to send Gobbles offers related to the selected interests. For example, interests such as music, comedy, film, beach, nerdy, and art can be selected by the user to receive offers related to the selected interests. The display 2702 can extend to additional displays, for example, 2703, and others, to accommodate the interests provided to a user for selection. A secondary display 2703 can be provided to show more defined interests based on the user's first selections.

Figure 28:
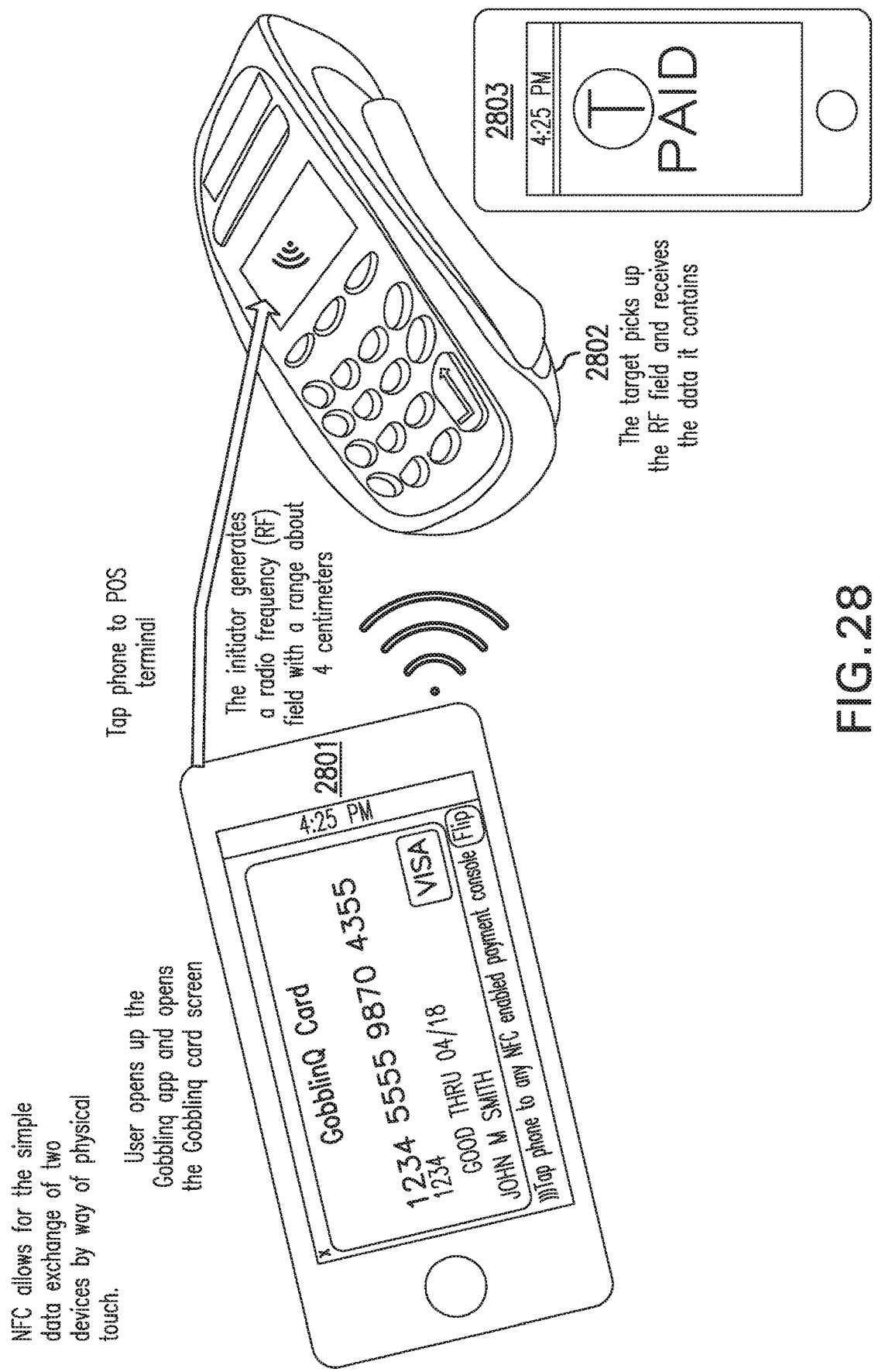
FIG. 28 illustrates an embodiment of the present invention.

As described in FIG. 21, FIG. 28 shows a payment process. Near field communication (NFC) allows for data exchange of two devices by way of touching or being within a close proximity to each other. For example, a user can use the GobblinQ account, which has stored payment account information. Display 2801 shows an image of a credit card, including the necessary information described in FIG. 21. When the user makes a purchase, the user mobile device can be brought to touch or nearly touch a payment console or point of sale (POS) terminal 2802. A radio frequency (RF) field having a narrow range can be generated from the user mobile device, which the terminal receives the data from the RF signal. When payment has been successfully made, a display 2803 can be shown on the user mobile device.

Figure 29:
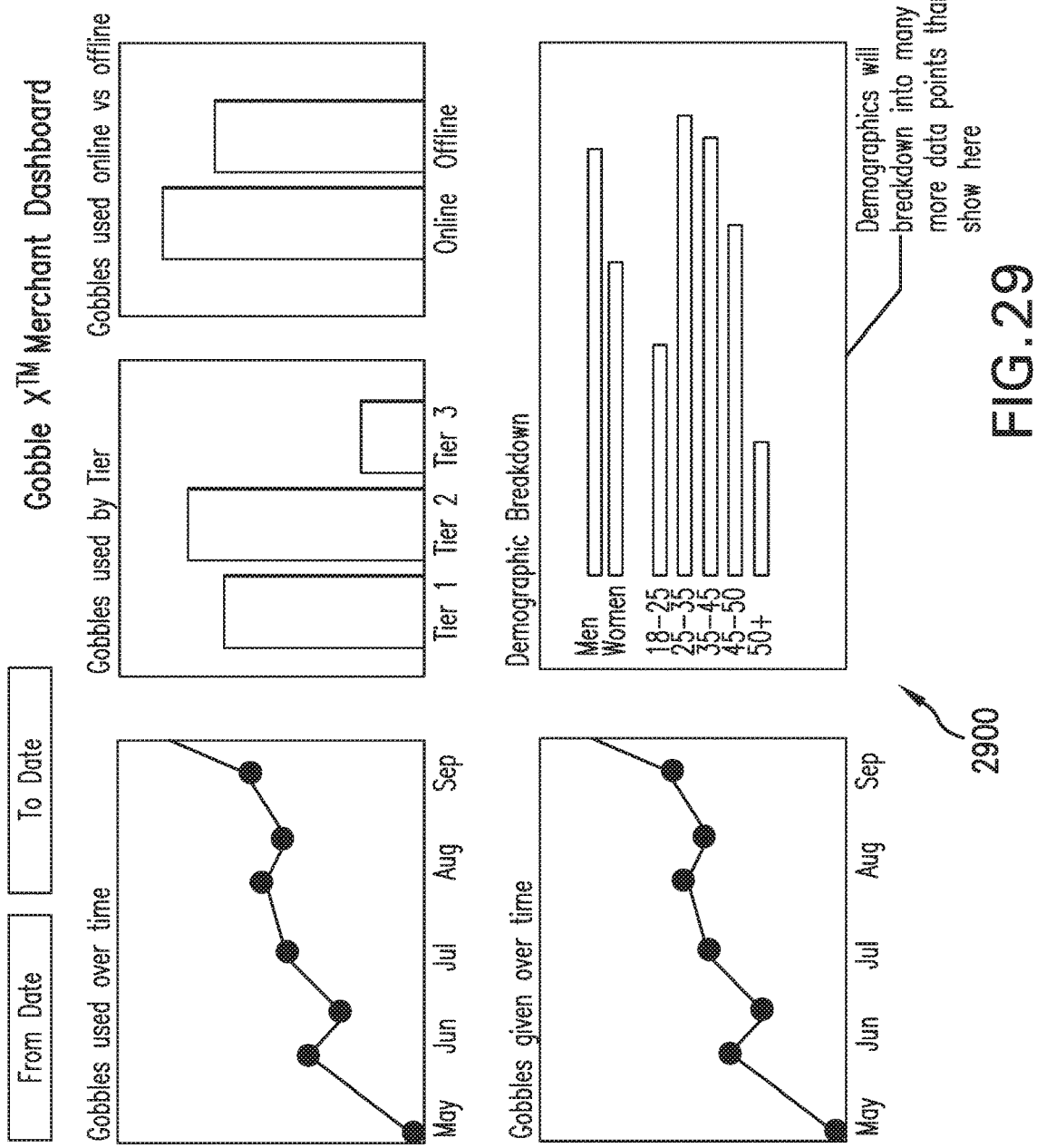
FIG. 29 illustrates an embodiment of the present invention.

FIG. 29 shows a dashboard view of a venue/merchant. Venues can monitor through the GobbleX Merchant Dashboard offers made to users to monitor marketing efforts. The merchant dashboard can include one or more charts and/or tables for a variety of data points. For example, display 2900 can show a dashboard including various information. A venue can limit data to view by entering a date range. For example, a venue can view in chart form Gobbles offers used over time. A venue can view in chart form cashback rewards given to users over time. A venue can view the amount of Gobbles offers used by tiers. A venue can view whether the Gobbles offers used were claimed online or offline. Marketing data can also be shown, including demographic information of the users of the Gobbles offers. Demographic data can include, for example, sex, and age categories. Demographics can include additional information, including but not limited to geographic location, store locations, and types of goods/services purchased. A venue can view information as to claimed Gobbles offers from new customers, and claimed Gobbles offers from returning customers.

It should be appreciated that the present invention can be implemented in numerous ways, including as a process, an apparatus, a system, a computer processor executing software instructions, or a computer readable medium such as a non-transitory computer readable storage medium, or a computer network wherein program instructions are sent over optical or electronic communication or non-transitory links. It should be noted that the order of the steps of disclosed processes can be altered within the scope of the invention, as noted in the appended claims and in the description herein.

Although the foregoing invention has been described in some detail for purposes of clarity of understanding, it will be apparent that certain changes and modifications can be practiced within the scope of the appended claims. The present invention can be practiced according to the claims and/or the embodiments without some or all of these specific details. Portions of the embodiments described herein can be used with or without each other and can be practiced in conjunction with a subset of all of the described embodiments. For the purpose of clarity, technical material that is known in the technical fields related to the invention has not been described in detail so that the present invention is not unnecessarily obscured. It should be noted that there are many alternative ways of implementing both the process and apparatus of the present invention. Accordingly, the present embodiments are to be considered as illustrative and not restrictive, and the invention is not to be limited to the details given herein, but can be modified within the scope and equivalents of the appended claims.

The computer processor and algorithm for conducting aspects of the methods of the present invention may be housed in devices that include desktop computers, scientific instruments, hand-held devices, personal digital assistants, phones, a non-transitory computer readable medium, and the like. The methods need not be carried out on a single processor. For example, one or more steps may be conducted on a first processor, while other steps are conducted on a second processor. The processors may be located in the same physical space or may be located distantly. In some such embodiments, multiple processors are linked over an electronic communications network, such as the Internet. Preferred embodiments include processors associated with a display device for showing the results of the methods to a user or users, outputting results as a video image and the processors may be directly or indirectly associated with information databases. As used herein, the terms processor, central processing unit, and CPU are used interchangeably and refer to a device that is able to read a program from a computer memory, e.g. ROM or other computer memory, and perform a set of steps according to the program. The terms computer memory and computer memory device refer to any storage media readable by a computer processor. Examples of computer memory include, but are not limited to, RAM, ROM, computer chips, digital video discs, compact discs, hard disk drives and magnetic tape. Also, computer readable medium refers to any device or system for storing and providing information, e.g., data and instructions, to a computer processor, DVDs, CDs, hard disk drives, magnetic tape and servers for streaming media over networks.

Embodiments of the present invention provide for accessing data obtained via a user's smartphone, smart device, tablet, iPad®, iWatch®, or other device and transmit that information via a telecommunications, WiFi, or other network option to a location, or other device, processor, or computer which can capture or receive information and transmit that information to a location. In an embodiment, the device is a portable device with connectivity to a network or a device or a processor. Embodiments of the present invention provide for a computer software application (or "app") or other method or device which operates on a device such as a portable device having connectivity to a communications system to interface with a user to obtain specific data, push or allow for a pull, of that specific data by a device such as a processor, server, or storage location. In embodiments, the server runs a computer software program to determine which data to use, and then transforms and/or interprets that data in a meaningful way.

Although the foregoing invention has been described in some detail for purposes of clarity of understanding, it will be apparent that certain changes and modifications can be practiced within the scope of the appended claims. The present invention can be practiced according to the claims and/or the embodiments without some or all of these specific details. Portions of the embodiments described herein can be used with or without each other and can be practiced in conjunction with a subset of all of the described embodiments. The various features of embodiments described can be used with and without each other, in various combinations. For the purpose of clarity, technical material that is known in the technical fields related to the invention has not been described in detail so that the present invention is not unnecessarily obscured. It should be noted that there are many alternative ways of implementing both the process and apparatus of the present invention. Accordingly, the present embodiments are to be considered as illustrative and not restrictive, and the invention is not to be limited to the details given herein, but can be modified within the scope and equivalents of the appended claims.

What is claimed is:

1. A computer-implemented method comprising:
receiving, at a central controller processor of a central controller computer, profile information for each of a plurality of users, wherein the profile information for each user includes:
location data indicative of a location associated with the user;
demographic data associated with the user; and user product data associated with the user, wherein the user product data associated with the user is indicative of at least one selected from a group consisting of a purchasing history for the user and a product preference for the user;

receiving, at the central controller processor from a merchant computer associated with a merchant, merchant information;

receiving, at the central controller processor, an indication from the merchant computer issuing a first promotion from the merchant specific to a first user of the plurality of users;

storing in a database of the central controller computer, a first unique identifier for the first promotion, wherein the first unique identifier is associated with first promotion information about the first promotion for the merchant, wherein the first promotion information includes a first cashback amount and a second cashback amount;

determining, by the central controller processor, a second promotion associated with the first promotion;

storing, in the database of the central controller computer, a second unique identifier for the second promotion, wherein the second unique identifier is associated with second promotion information about the second promotion for the merchant, wherein the second promotion information includes a third cashback amount;

transmitting the first unique identifier of the first promotion to a first user computer associated with the first user;

receiving, at the central controller processor from the merchant computer, the first unique identifier, wherein receiving the first unique identifier indicates the first user has claimed the first promotion from the merchant;

in response to receiving the first unique identifier from the merchant computer, crediting to a first account associated with the first user, using the central controller processor, a first amount of money based on the first cashback amount associated with the first unique identifier;

applying, by the central controller processor of the central controller computer, a profile matching algorithm to profile information for the plurality of users stored on the central controller computer, wherein the profile matching algorithm automatically identifies a second user based on similarities between the profile information for the first user and the profile information for the second user,
wherein applying the profile matching algorithm includes applying a machine-learning model to the user profile information for the plurality of users, wherein the machine-learning model is trained to receive the user profile information as input and to produce as output an indication of profile similarity between the user profile information for the first user and the user profile information for each other user of the plurality of users;

in response to receiving the first unique identifier from the merchant computer, transmitting the second unique identifier to a second user computer associated with the second user;

receiving, at the central controller processor from the merchant computer, the second unique identifier, wherein receiving the second unique identifier indicates the second user has claimed the second promotion;

in response to receiving the second unique identifier from the merchant computer, crediting to the first account, using the central controller processor, a second amount of money based on the second cashback amount; and in response to receiving the second unique identifier from the merchant computer, crediting to a second account associated with the second user, using the central controller processor, a third amount of money based on the third cashback amount.

2. The method of claim 1, further comprising:
receiving, from the first user computer, an identification of a specific user of the plurality of users and a request to transmit the second unique identifier to the identified specific user; and
in response to receiving the request, transmitting the second unique identifier to a computer associated with the identified specific user.

3. The method of claim 1, further comprising:
in response to receiving, at the central controller processor from the merchant computer, the second unique identifier:
generating, at the central controller processor, a third unique identifier associated with a third promotion from the merchant; and
transmitting to the first user computer, from the central controller processor, the third unique identifier for the third promotion.

4. The method of claim 1, wherein receiving, at the central controller processor from the merchant computer, the first unique identifier includes receiving by the central controller processor from the merchant computer at least one transmission selected from a group consisting of a text message, a telephone call, and an email, wherein the at least one transmission includes the first unique identifier.

5. The method of claim 1, wherein applying the profile matching algorithm further includes:
executing a first algorithmic relationship between the merchant target information, the first promotion information, and the first profile;
executing a second algorithmic relationship between the merchant target information, the second promotion information, and the profile information for each of the plurality of users; and
ranking the plurality of users based on the output of the second algorithmic relationship.

6. The method of claim 1, wherein the first promotion includes a discount amount and is claimed when the discount amount associated with the first unique identifier is applied to a purchase by the first user from the merchant, and wherein the merchant computer transmits a notification to the central controller processor in response to the discount amount being applied to the purchase.

7. The method of claim 1, further comprising calculating, by the central controller computer, a probability of purchase for the second user and the merchant, wherein the probability of purchase is calculated based on a similarity between:
the user product data associated with the second user and purchaser profile information associated with a previous purchaser of a certain product sold by the merchant, and
wherein the profile matching algorithm automatically identifies a second user to receive the second promotion based at least in part on the calculated probability of purchase.

8. The method of claim 1, wherein the central controller processor is at least one selected from a group consisting of a mobile device, a smartphone, a computer, and a tablet.

9. The method of claim 1, further comprising:
receiving, at the central controller processor, an event request from the first user computer; and
in response to receiving the event request, setting up an event in which the merchant computer specifies:
the first promotion;
the second promotion;
the first cashback amount; and
the second cashback amount.

10. The method of claim 9, wherein receiving the first unique identifier indicates the first user has claimed the first promotion from the merchant during the event.

11. The method of claim 9, wherein:
crediting to the first account the first amount of money includes crediting the first amount of money to the first account in response to a conclusion of the event, and
wherein the first amount of money is further based on an attendance at the event attributable to the first user.

12. The method of claim 1, transmitting a prompt to the merchant computer identifying the first user as a potential recipient of the first promotion based at least in part on the profile information for the first user, wherein the profile information for the first user includes the product preference for the user, and wherein the product preference for the user includes at least one selected from a group consisting of a request for a promotion received from the user and an indication of a location and a timing of a desired product to be purchased by the first user.

13. The method of claim 1, further comprising retraining the machine-learning model based on whether the identified second user claims the second promotion.

14. A computer-implemented method for issuing and tracking merchant promotions based on stored user profile information, the method comprising:
storing, by a central controller computer, user profile information for each of a plurality of users, wherein the user profile information for each user includes user product data associated with the user, wherein the user product data is indicative of at least one selected from a group consisting of a purchasing history for the user and a product preference for the user;
storing, by the central controller computer, merchant profile information for each of a plurality of merchants;
generating, by the central controller computer, a first promotion for a first merchant of the plurality of merchants specific to a first user of the plurality of users, wherein the first promotion includes a first unique identifier associated with the first promotion, a first discount amount associated with the first promotion, a second discount amount associated with a second promotion, and a third discount amount associated with a third promotion;
transmitting the first unique identifier of the first promotion to a first user computer associated with the first user;
receiving, by the central controller computer from a merchant computer associated with the first merchant, the first unique identifier, wherein receiving the first unique identifier from the merchant computer indicates that the first user has claimed the first promotion from the merchant;
applying, by the central controller computer, a profile matching algorithm to the stored user profile information for the plurality of users, wherein the profile matching algorithm automatically identifies a second user based on similarities between the user profile information for the first user and the user profile information for the second user,
wherein applying the profile matching algorithm includes applying a machine-learning model to the user profile information for the plurality of users, wherein the machine-learning model is trained to receive the user profile information as input and to produce as output an indication of profile similarity between the user profile information for the first user and the user profile information for each other user of the plurality of users;
transmitting a defined number of unique identifiers associated with the second promotion to different users of the plurality of users, wherein at least one unique identifier associated with the second promotion is transmitted to the second user identified by the profile matching algorithm;
receiving, by the central controller computer from the merchant computer, at least one unique identifier associated with the second promotion, wherein each unique identifier associated with the second promotion received from the merchant computer indicates a different instance of a user claiming the second promotion; and
in response to receiving, from the merchant computer, at least a threshold number of unique identifiers associated with the second promotion, transmitting a third unique identifier associated with the third promotion to the first user.

15. The method of claim 14, further comprising calculating a probability of purchase for the first user and the first merchant, wherein the probability of purchase is calculated based at least in part on the user product data associated with the first user, and wherein generating the first promotion from the first merchant specific to the first user includes generating the first promotion based at least in part on the calculated probability of purchase.

16. The method of claim 15, wherein calculating the probability of purchase includes calculating the probability of purchase for the first user based on a similarity between the user profile information for the first user and purchaser profile information associated with a previous purchaser of a certain product sold by the first merchant.

17. The method of claim 15, wherein calculating the probability of purchase for the first user includes applying a machine-learning model trained to receive as input user profile information and merchant profile information and to produce as output an indication of the probability of purchase, and the method further comprising retraining the machine-learning model based on whether the first promotion is claimed by the first user.

18. The method of claim 14, wherein applying the profile matching algorithm includes applying a profile matching algorithm configured to generate an output indicative of a similarity between the user profile information for the second user and at least one selected from a group consisting of the user profile information for the first user and purchaser profile information associated with a previous purchaser of a certain product sold by the first merchant.

19. The method of claim 14, wherein applying the profile matching algorithm includes applying a machine-learning model to the stored user profile information, and the method further comprising retraining the machine-learning model based at least in part on whether the automatically identified second user claims the second promotion.

* * * * *